US009280670B2

(12) United States Patent
Conte

(10) Patent No.: US 9,280,670 B2
(45) Date of Patent: Mar. 8, 2016

(54) SIFTSORT

(71) Applicant: Darren Conte, New York, NY (US)

(72) Inventor: Darren Conte, New York, NY (US)

(*) Notice: Subject to any disclaimer, the term of this patent is extended or adjusted under 35 U.S.C. 154(b) by 0 days.

(21) Appl. No.: 13/950,194

(22) Filed: Jul. 24, 2013

(65) Prior Publication Data

US 2014/0033327 A1 Jan. 30, 2014

Related U.S. Application Data

(60) Provisional application No. 61/741,701, filed on Jul. 26, 2012.

(51) Int. Cl.
*G06F 21/60* (2013.01)
*G06F 21/62* (2013.01)

(52) U.S. Cl.
CPC ............ *G06F 21/60* (2013.01); *G06F 21/6245* (2013.01)

(58) Field of Classification Search
CPC ..... G06F 21/10; G06F 21/6218; G06F 21/62; G06F 21/31; H04L 63/10
USPC .......................................................... 726/28
See application file for complete search history.

(56) References Cited

U.S. PATENT DOCUMENTS

| 8,707,035 | B2* | 4/2014 | Hartley | G06F 21/602 713/165 |
| 2002/0046188 | A1* | 4/2002 | Burges | G06Q 20/3674 705/67 |
| 2002/0111946 | A1* | 8/2002 | Fallon | G06Q 10/10 |
| 2005/0183142 | A1* | 8/2005 | Podanoffsky | G06F 21/31 726/18 |
| 2005/0203885 | A1* | 9/2005 | Chenevich | G06Q 20/02 |
| 2007/0220614 | A1* | 9/2007 | Ellis | G06F 21/6245 726/27 |
| 2007/0276754 | A1* | 11/2007 | Parmelee | G06Q 20/108 705/43 |
| 2008/0082821 | A1* | 4/2008 | Pritikin | G06F 17/243 713/169 |
| 2008/0235043 | A1* | 9/2008 | Goulandris | G06F 21/33 705/1.1 |
| 2011/0154508 | A1* | 6/2011 | Lorsch | G06F 19/322 726/28 |
| 2011/0231645 | A1* | 9/2011 | Thomas | H04L 9/321 713/150 |
| 2012/0180111 | A1* | 7/2012 | Velasco | G06F 21/62 726/4 |
| 2013/0198521 | A1* | 8/2013 | Wu | G06F 21/6209 713/175 |

* cited by examiner

*Primary Examiner* — Yonas Bayou
(74) *Attorney, Agent, or Firm* — Jura C. Zibas; Robert P. Feinland; Gregory N. Brescia

(57) ABSTRACT

The present invention relates generally to information processing, and more particularly to techniques for securely organizing, sharing, accessing and storing valuable information related to a family or individual in conjunction with a computer-based platform. Users will have the ability to organize, share, access, send and receive information online using a plurality of personal devices. A computer web browser, mobile device web browser, facsimile machine, scanning device can send and receive information over a communication link with the system using standard software applications such as email, mobile messaging, scanning software and facsimile software. The present invention provides a user friendly web based platform that allows individuals to instantly setup a secure account and store important information, as well as, establish a seamless and effective contingency plan to organizing highly sensitive and personal information.

19 Claims, 61 Drawing Sheets

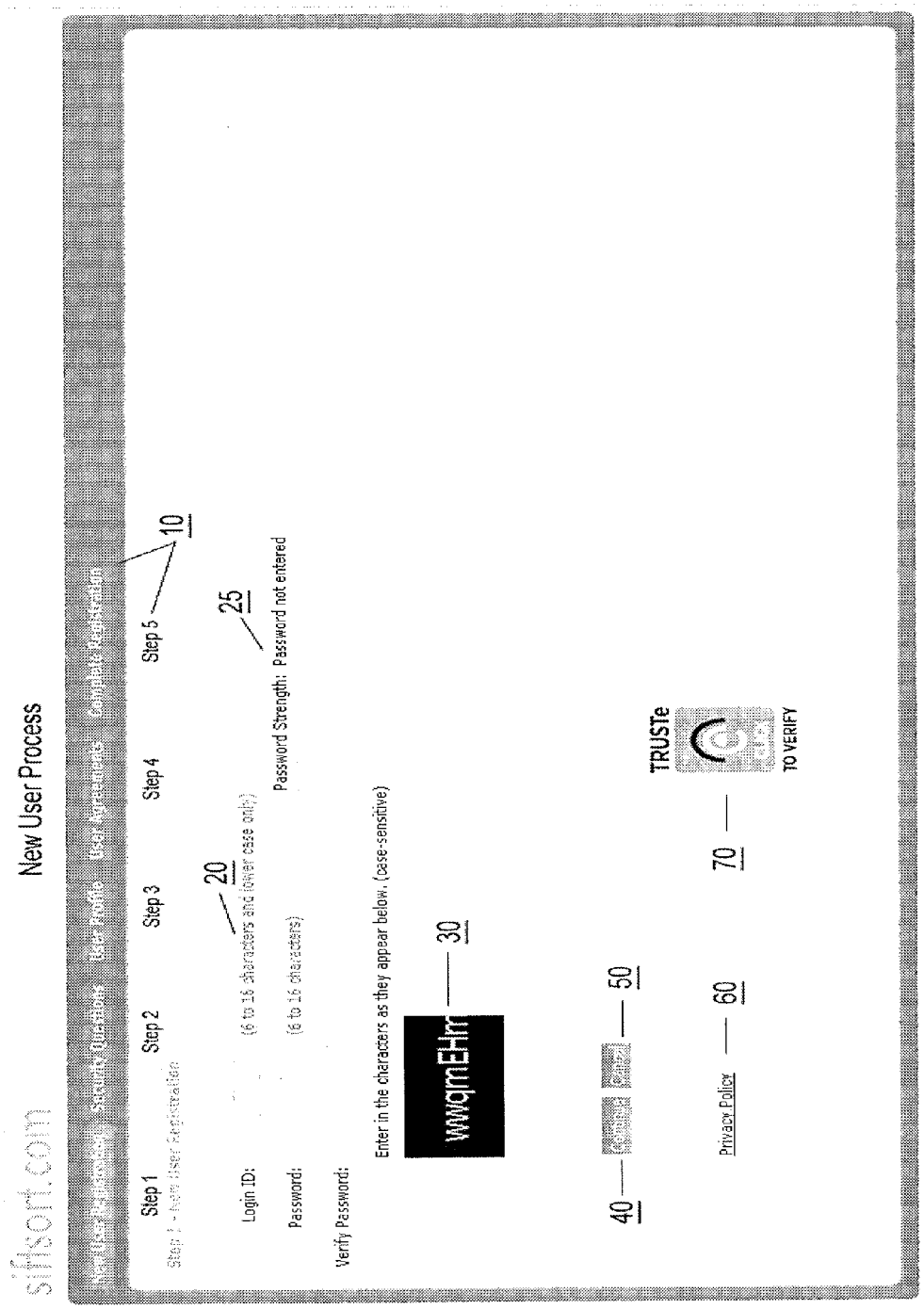
FIG.2B1

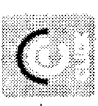
FIG.2B2

FIG.2B3

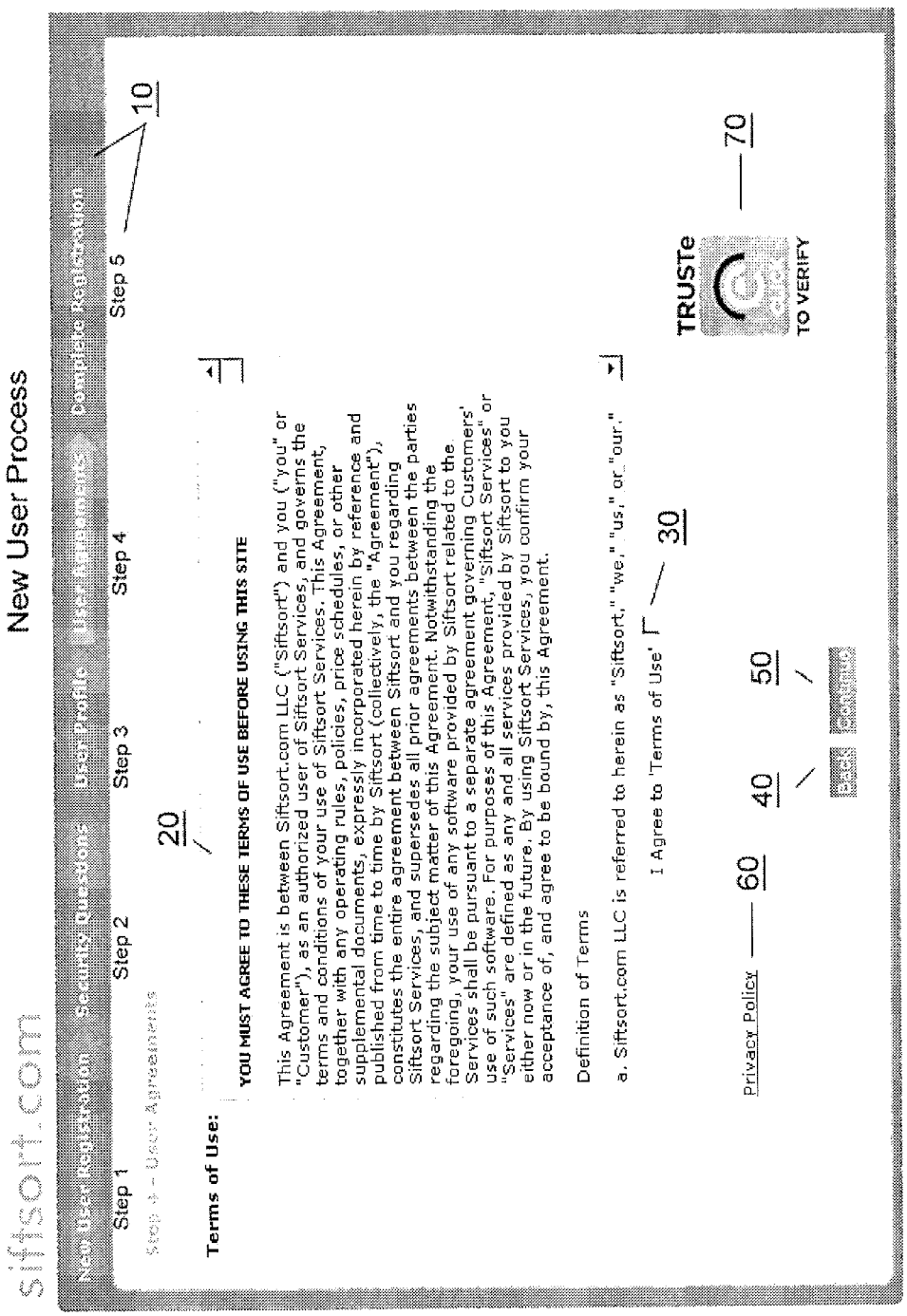
FIG.2B4

FIG.2B5

User Authentication Level 2 siftsort.com

Please provide the answers to the following security challenge questions. Answers are case-sensitive.

What is your favorite sport?

What is the name of your first school?

My relative in Vero Beach?

10

Continue

20

FIG.2C siftsort.com

| 48 | 50 | 52 | 54 | 56 | 58 | 60 | 64 |
|---|---|---|---|---|---|---|---|
| Home | Life | Medical | Financial | Contacts | Sharing | Planning | Logout |

User Web Pages 100a

Help (Manuals and Videos)  Invite a Friend  Feedback  Browser Support  12

Category Databases as shown in FIG. 1  10

48a  48b  48c

Databases (3)  Category Sub-Databases as shown in FIG. 1  20

Get Organized – It's Easy

| | 33 Items Needed | 64 Items Saved | 30 | 35 Status |
|---|---|---|---|---|
| Life<br>Identification documents such as driver license, passport, social security card, birth certificate, marriage license, citizenship papers and more. | 15 | 15 | | Completed |
| Medical<br>Medical history information, emergency contacts, doctors and providers, insurance policies, ID cards and prescriptions. | 25 | 15 | | ! |
| Financial<br>Financial statements, legal papers, motor vehicle documents, real estate deeds, personal property, insurance policies, estate plans such as wills, trusts, health-care proxy and power of attorney. | 35 | 0 | | ⚠ Action Required |

25  ▇▇▇▇▇░░░░  57% Complete

Alerts! Set a Reminder  40

Gail Blanke
Author of Throw Out Fifty Things - Clear the Clutter, Find Your Life After you sign.

Upload, email or fax a copy to your siftsort.com account for safekeeping.

HELPFUL HINT
FAX important documents into your account using a DEDICATED FAX NUMBER.

14

© Siftsort.com LLC (32◊.6.3)   Troubleshooting   Contact Us   Privacy Policy   Terms of Use

FIG. 2D siftsort.com

User Web Pages 100a

Help (Manuals and Videos)   Invite a Friend   Feedback   Browser Support

| Home | Dashboard | My Siftsort | Messages (1) | Financial | Contacts | Sharing | Planning | Logout |
|------|-----------|-------------|--------------|-----------|----------|---------|----------|--------|

- Profile Account — 25
- Change Password — 30
- Change Security Question — 35
- Billing Information — 40
- Cancel Account — 45

20

First Name: Darren
Last Name: Conte
Address: 162 Mimosa Circle
Ridgefield CT UNITED STATES 06877
Home Phone: 212-737-4132
Work Phone: 212-381-1053 x1200
Cell Phone: 646-831-3688
Personal Email: darren.conte@siftsort.com
Fax Number: 516-896-9000
Business Email: darren.conte@gmail.com
Emergency Contact Information:
   Boxhill, David : Doctor : 212-635-2000
   Altcheck, David : Doctor : 212-606-1909
   Conte, Victor : Father : 203-438-3538
   Conte, Doris : Mother : 203-438-3538

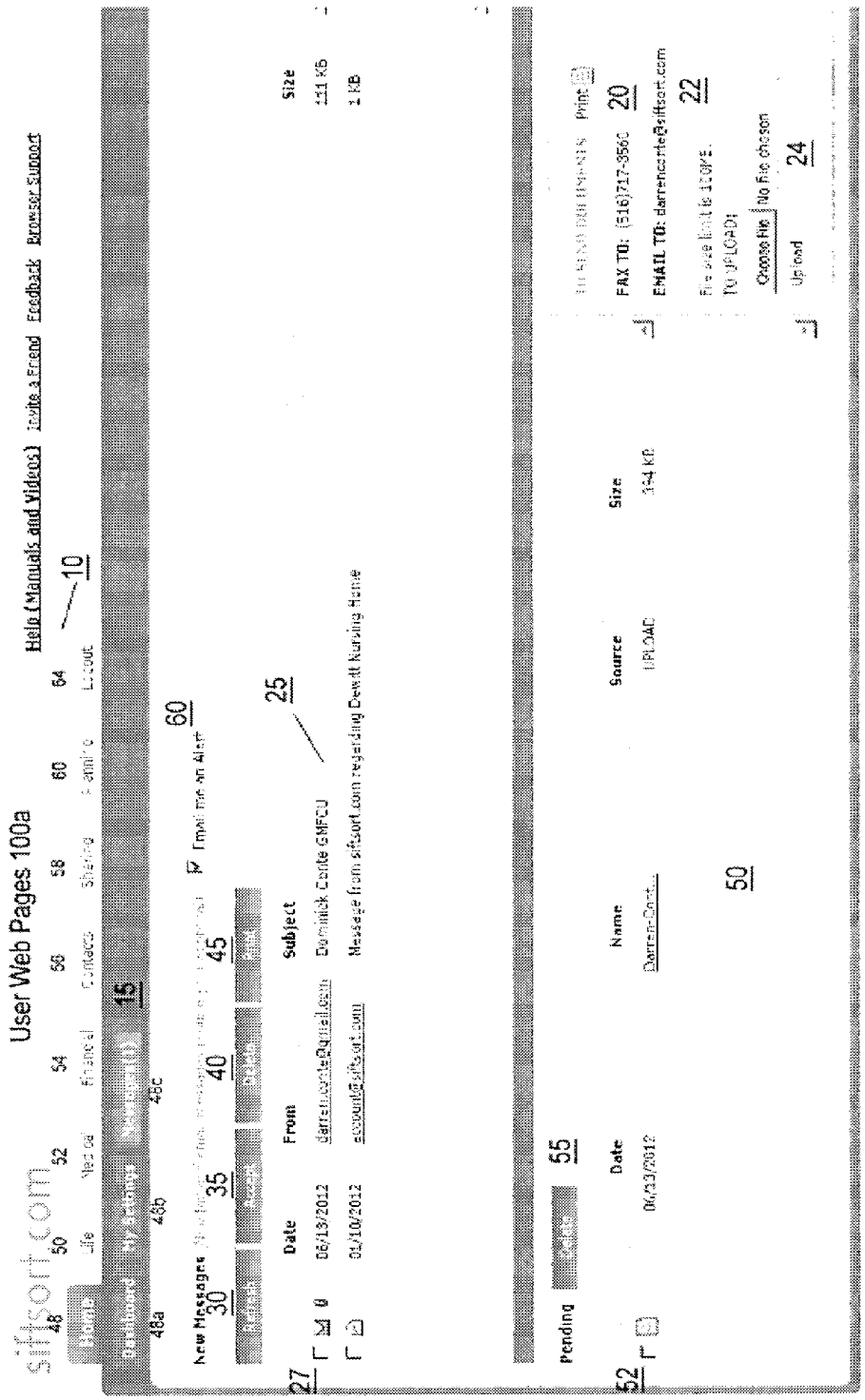
FIG.2D2 siftsort.com

| 48 | 50 | 52 | 54 | 56 | 58 | 60 |
|---|---|---|---|---|---|---|
| Home | Life | Medical | Financial | Contacts | Sharing | Planning |

User Web Pages 100a

Help (Manuals and Videos)  Invite a Friend  Feedback  Browser Support
— 10
64 Logout 48a
48b  My Settings  Messages (1)  48c

New Messages (New fax and email messages require your approval)   ☑ Email me an Alert — 60

30 — Archive   35 — Restore   40 — Delete   45 — Print

27

| | | Date | From | Subject |
|---|---|---|---|---|
| ☐ | ☑ 0 | 06/13/2012 | darren.conte@gmail.com | Dominick Conte GMFCU |
| ☐ | 📄 | 01/10/2012 | account@siftsort.com | Message from siftsort.com regarding Dewitt Nursing Home |

25

Pending   55 — E-Sign

| | | Date | Name | Source | Size |
|---|---|---|---|---|---|
| ☐ | 📄 | 06/13/2012 | Darren-Cont... | UPLOAD | 394 KB |

50

TO SEND DOCUMENTS   Print 🖨 20
FAX TO: (516)717-3560
EMAIL TO: darrenconte@siftsort.com — 22
File size limit is 100MB.
TO UPLOAD:
Choose File | No file chosen
Upload   24

| | | | Size |
|---|---|---|---|
| | | | 111 KB |
| | | | 1 KB |

© Siftsort.com LLC (320.6.3)   Troubleshooting   Contact Us   Privacy Policy   Terms of Use

User Web Pages 100a siftsort.com

| Home | Life | Medical | Financial | Shortcut Setup | Contacts | Sharing | Planning | Identity |
| 48 | 50 | 52 | 54 | | 56 | 58 | 60 | 64 |

Help (Manuals and Videos)  Invite a Friend  Feedback  Browser Support

Search 100a  100b  100c

Darren Conte

User Web Pages as shown in FIG. 1
20

Address: 162 Mimosa Circle Ridgefield CT UNITED STATES 06877
Home Phone: 212-737-4132
Work Phone: 212-381-1053 x1200
Cell Phone: 646-831-3688
Personal Email: darren.conte@siftsort.com
Fax Number: 516-896-9000
Business Email: darren.conte@gmail.com
Emergency Contact Information:
Conte, Doris : Mother : 203-438-35
Conte, Victor : Father : 203-438-35
Boxhill, David : Doctor : 212-635-2
Altcheck, David : Doctor : 212-606-

Employers        Education        Identification

Pending

| | | Date | Name | Source | Size |
|---|---|---|---|---|---|
| ☐ | | 04/12/2012 | Burial Plot... | UPLOADED | 425KB |
| ☐ | | 04/12/2012 | Passport.jpg | UPLOADED | 312KB |
| ☐ | | 04/12/2012 | 2005 CONTE... | UPLOADED | 94KB |

(Drag and Drop these items into a Folder)

TO SEND DOCUMENTS                Print
FAX TO: Assign me a fax number
EMAIL TO: darrenconte@siftsort.com
File size limit is 100MB.
TO UPLOAD:
Choose File | No file chosen
Upload © Siftsort.com LLC (320.6.3)  Troubleshooting  Contact Us  Privacy Policy  Terms of Use

Assign a Contact Record to a New Note in a Category Sub-Database

FIG. 3C

10 Category Sub-Database (Folder) 50c as shown in FIG. 2E

FIG.3D

Records | Documents

20

10

15 Print

Filed As | Location

Don"s Social Security Administration | Life: Don Conte: Identification

Genworth Financial | Life: Darren Conte: Employers

Goldman Sachs  30 | Life: Darren Conte: Employers

Hofstra University | Life: Laurie Conte: Education

Hofstra University | Life: Darren Conte: Identification — 40

Ridgefield Town Hall | Life: Clyde (our dog): Identification

Social Security Administration | Life: Darren Conte: Identification

Social Security Administration | Life: Laurie Conte: Identification

Troy's Social Security Administration | Life: Don Conte: Identification

Westport Preschool | Life: Shannon Conte: Identification — 42

| Documents 20 | | |
|---|---|---|
| Document Name | Document Type | Location |
| 2011 intl driving permit.jpg | Drivers License | Life: Darren Conte: Identification |
| BirthCertificate.jpg | Birth Certificate | Life: Darren Conte: Identification |
| CT Drivers License.JPG | Drivers License | Life: Darren Conte: Identification |
| Goldman_Sachs_ID.jpg | Other | Life: Laurie Conte: Identification |
| Laurie Carlo Drivers.pdf | Drivers License | Life: Laurie Conte: Identification |
| Laurie Carlo Passport.jpg | Passport | |
| Medical Card.jpg | Student Photo ID | Life: Shannon Conte: Identification |

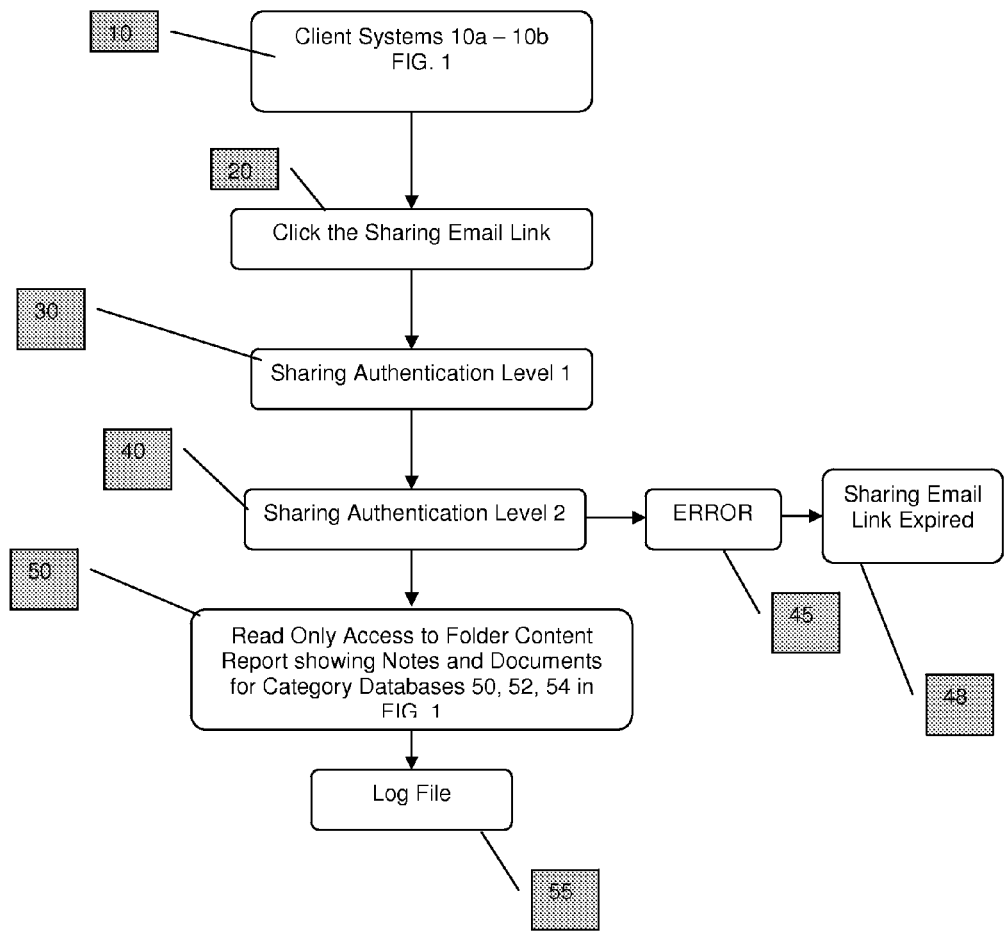
FIG. 6.1

From: darrenconte@siftsort.com [mailto:darrenconte@siftsort.com]
Sent: Tuesday, July 15, 2011 4:51 PM _____ 10
To: David Boxhill

Subject: Message from Darren Conte regarding siftsort.com

Hello David Boxhill,

Darren Conte has granted you secure sharing privileges to view his/her vital documents and records that are electronically stored with siftsort.com.

Siftsort.com helps people to organize and securely store their critical family information so that they can easily share and access it when they need it most.

Darren Conte thought that it would be important to share his/her information with you in case of an emergency. Please click on the following link to view the shared information. Only you will be allowed to access this information on behalf of Darren Conte so please file this email in a safe place. This link will expire if not activated within 30 days.  _20_ https://www.siftsort.com/zooley/advContactLogin.do?contactId=89uUzAAC3Kk%3D&accountId=uo1mOwzDvYQ%3D

NOTE: You may have received multiple email notices if you have been selected to view different types of information for Darren Conte.

Regards,
siftsort.com

To find out how you can securely store and share important family information, emergency contacts, medical records and financial documents, visit http://www.siftsort.com

FIG.6A sittsort.com    Accessing Shared Notes and Documents

Welcome to the sharing access portal for siltsort.com. To view the shared information, you will need to correctly answer the following security questions.

Please select the Mailing Address of the person who sent you this link?
10
[158 Mimosa Circle Ridgefield CT 06869 ▼]

Please select the Phone Number of the person who sent you this link?
20
[218-737-4130 ▼]

30
[View Details]

Below are the documents and notes that have been shared by Darren Conte.

Notes | Documents

| Filed As | Location | Shared Date |
|---|---|---|
| Goldman Sachs | Darren Conte\LIFE\Employers | 03/29/2012 10:52 |
| Genworth Financial | Darren Conte\LIFE\Employers | 03/29/2012 10:52 |
| Social Security Administration | Darren Conte\LIFE\Identification | 03/29/2012 10:52 |
| Hofstra University | Darren Conte\LIFE\Identification | 03/29/2012 10:52 |
| Levin, Lawrence MD FACC | Darren Conte\MEDICAL\Doctors and Providers | 03/29/2012 10:52 |
| Altcheck, David | Darren Conte\MEDICAL\Doctors and Providers | 03/29/2012 10:52 |
| Helfet, David | Darren Conte\MEDICAL\Doctors and Providers | 03/29/2012 10:52 |
| Sandler MD, Jeffrey | Darren Conte\MEDICAL\Doctors and Providers | 03/29/2012 10:52 |
| Lutz, Gregory | Darren Conte\MEDICAL\Doctors and Providers | 03/29/2012 10:52 |
| Trident Co. | Darren Conte\MEDICAL\Doctors and Providers | 03/29/2012 10:52 |

Customer Assistance Information

Operator Name : David John
Login Date: 06/05/2012
Login Time: 01:25 PM

Logoff System

50

10 Last Name: [____] Search 20

Search Results

| Last Name | First Name | Address | City | State | Postal Code |
|---|---|---|---|---|---|
| ☐ Conte | Darren | 612 East 55th Street | New York | NY | 10016 |
| ☐ Conte | Darren | 132 Main Street | New York | NY | 10021 |
| ☐ Conte | Damon | Mill Road | Westport | CT | 08888 |
| ☐ Conte | Tom | 123 Tuttle Drive | New York | NY | 10022 |
| ☑ Conte | Darren | 162 Mimosa Circle | Ridgefield | CT | 06877 |

FIG. 7C siftsort.com

Currently accessing account of : Darren Conte

Product: [LIFE ▼] __10__

__15__ [Notes] [Documents]

Filed As                              Location

☐ Don's Social Security Administration    Life: Don Conte: Identification
☐ Genworth Financial                      Life: Darren Conte: Employers
☐ Goldman Sachs    __20__                 Life: Darren Conte: Employers
☐ Hofstra University                      Life: Laurie Conte: Education
☐ Hofstra University                      Life: Darren Conte: Identification
☐ Ridgefield Town Hall                    Life: Clyde (our dog): Identification
☐ Social Security Administration          Life: Laurie Conte: Identification
__25__
☐ Social Security Administration          Life: Darren Conte: Identification
☐ Troy's Social Security Administration   Life: Don Conte: Identification
☐ Westport Preschool                      Life: Shannon Conte: Identification

__30__

Security Questions to accurate viewing option

--Select-- ▼   Answer: [_____]  __40__   __50__

[Caller Verified]   __55__
*Caller Authorization Required

[Upload Document]   __60__

Customer Assistance Information
Operator Name : David John
Login Date: 06/05/2012
Login Time: 02:04 PM
[Logoff System]   __90__

User Account Lockout   __80__
[_____]

Click here to send an Alert Message.   __70__
[_____]

FIG.7D

Subject: Message from siftsort.com
From: account@siftsort.com
Date: 7/26/2011 1:53 PM ———— 10
To: gree@anyemail.com Dear Thomas Mesquita, Your account has been unlocked as per your request. For your protection, we have reset your logon password and all the answers to the security challenge questions in your account.

Your temporary logon password is: hKC7gXE ———— 15
The temporary answer to all security challenge questions is: ZG9FSwv5tY ———— 25

Logon to your account and when prompted, use the temporary information mentioned above.

IMPORTANT:
You must change your password and security challenge question answers after you have logged into your account.

HOW TO CHANGE MY PASSWORD
1. After you logon, click MY SETTINGS and then select CHANGE PASSWORD
2. Enter the temporary password provided to you in this email
3. Enter in your new password and confirm your new password
4. Click OK

HOW TO CHANGE MY SECURITY CHALLENGE QUESTIONS AND ANSWERS
1. After you logon, click MY SETTINGS and then select CHANGE SECURITY QUESTIONS
2. Update each challenge question answer by replacing the temporary answer for all questions with your new answers. If you prefer, you may also choose new questions and answers
3. Click OK We recommend that you do not share your passwords or security challenge questions with anyone.

If you did not request to have your account unlocked, please contact our Customer Assistance Center immediately at (877) 4siftsort (877-474-3876) or email us at customer.care@siftsort.com Thank you for using siftsort.com – a better way to protect what's important.
The siftsort Team

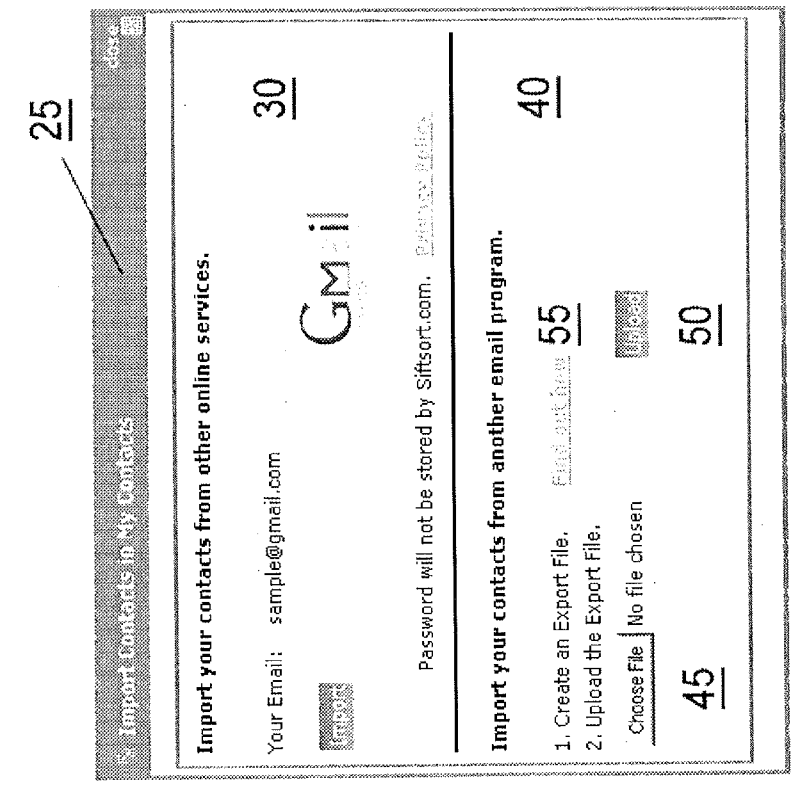
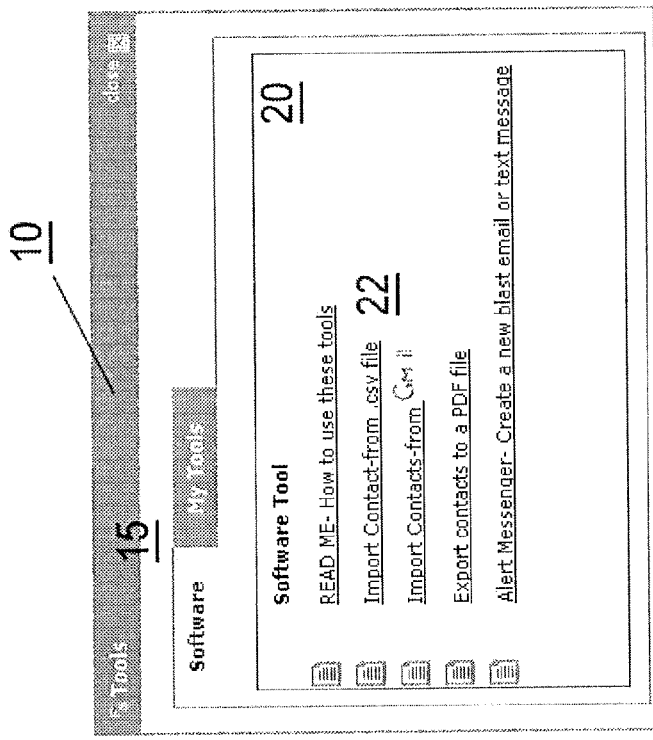
FIG. 8B

FIG.8D

| Date | Document Name |
|---|---|
| 02/05/2008 05:47 | Passport.jpg |
| 02/05/2008 05:46 | social security card.jpg |
| 04/02/2009 06:49 | CT Drivers License.JPG |
| 10/05/2009 12:23 | NYS License Back.jpg |
| 10/07/2009 03:08 | NYS License Front.jpg |
| 02/10/2010 11:37 | BirthCertificate.jpg |
| 09/16/2011 06:20 | 2011 intl driving permit.jpg |

FIG.9A eNotary Wizard...  close

Send

File Name  
BirthCertificate.jpg  20

File Type  
Identification

You have chosen to e-Notarize the following document.

Click 'Next' to continue.

30 Cancel    40 Next

FIG. 9F e-Notary Wizard — 10

Step 3 - Review Billing Information and Submit Request.

1. You are ready to e-Notarize the following document.

| Date | Name | Source | Size |
|---|---|---|---|
| 02/12/2012 | BirthCertificate.jpg | UPLOAD | 158K |

Cost:* $15 per document     Total Cost: $15.00 — 25
(Plus sales tax for NY residents only)

2. Verify your Billing Information.

Credit Card Number* (no dashes)
Expiration Date (MM/YY)*
CVC (3 or 4 digit code)*
How to Find Code 3. Verify your Billing Address.

Street Address 1*   123 Main Street
Street Address 2
City*   Anywhere
State*   MA
Zip Code*   76777

AUTHORIZATION FAILED! Please verify the billing information and try again.

* Required Field

[Cancel] — 50    [Submit Request] — 60

20, 30, 40, 45

SIFTSORT

CROSS-REFERENCE TO RELATED APPLICATION

The present application claims the priority of U.S. Provisional Patent Application Ser. No. 61/741,701, filed Jul. 26, 2012 and entitled "Siftsort," which is incorporated by reference herein.

FIELD OF THE INVENTION

The present invention relates generally to the field of information processing, and more particularly to techniques for securely organizing, sharing, accessing and storing valuable information related to a family or individual in conjunction with a computer-based platform.

BACKGROUND

In the aftermath of Hurricane Katrina and Rita, families and businesses had lost not only their material and personal belongings, but important items such as wallets, purses, social security cards, driver's licenses, passports, military identification cards, medical insurance records, homeowner's policies, mortgage papers, checkbooks, land deeds, financial records and more.

May people were asking themselves, "how could we have better prepared ourselves for such an event?" and "how can we leverage technology to help us digitally store and retrieve vital family information?"

Electronic data processing provides users with myriad advantages. Examples of these advantages include the ability to store, analyze and utilize vast amounts of data with ease. However, such data becomes subject to security threats (e.g., Trojan virus, "inside" jobs, malicious data manipulation, accidental data manipulation, and/or any other attacks appreciated by those with ordinary skill in the art). As a result, there is a need for a database that incorporates optimal security measures by safeguarding a users account with a multi-tier authentication process and by restricting a party's, other than the authorized user, ability to access the user's account.

SUMMARY OF THE INVENTION

Illustrative embodiments of the present invention provide improved organization, file sharing and accessibility in a user friendly manner via a web portal. These web portals allow individuals to instantly setup a secure account and store their important information. The present invention provides residual benefit to families looking to establish a seamless and effective contingency plan, as well as, help facilitate the organization of highly sensitive information. Users will have piece of mind and freedom knowing that their information is organized, safe, secure and highly available to them using the latest technology.

Users can organize, share, access, send and receive information online using a plurality of personal technology which would use different types of software applications to communicate with the system. A computer web browser, mobile device web browser, facsimile machine, scanning device can send and receive information over a communication link with the system using standard software application such as email, mobile messaging, scanning software and facsimile software. The user may also contact the company's Toll-Free Customer Center and have a representative access their account on their behalf if they are unable to access the system using their own personal technology or during an emergency which prevents them from accessing the system under normal circumstances. The Toll-Free Customer Center would access the system to securely transmit information from the user's account to a recipient destination in accordance with the instructions provided by the user (i.e., Customer Representative may be instructed to email or fax medical information to a doctor or family member on behalf of the user of the system. The customer Representative would be able to do-so without having the confidential information leave the system, ensuring a safe and secure transmission.).

The present invention is capable of storing at least two type of information for the user (e.g., documents, notes). Documents are categorized as pre-existing files created by a software program such as Microsoft Word, Microsoft Excel, Microsoft PowerPoint, Adobe Acrobat to create word processing Documents, spreadsheets, presentations, scanned image files, Portable Document Format (PDF) files, Photo Image files, Music files, Video Files, Facsimile Documents, or any other file that the user may already have on his/her compute or in hard copy format. Notes are categorized as custom information files created by the user using a proprietary database template provided by the system which would allow the user to enter data into default and custom fields and store important information that the user may not already have had in a predefined Document format. This would allow the user to create a note or record "on-the-fly" by just filling out a template specific to subject matter where the appropriate fields have already been selected from the proprietary database.

The stored information is securely stored in online folders, for each family member labeled specifically under multiple categories such as Life, Medical, Financial, Contacts, Sharing and Planning. Once the stored information has been securely stored in the online folders, the user may access and share this information with other individuals using a Sharing feature with the systems.

These and other objects, features, and advantages of the present invention will become apparent from the following detailed description of illustrative embodiments thereof, which is to be read in connection with the accompanying drawings.

BRIEF DESCRIPTION OF THE DRAWINGS

These and other features and advantages of the present invention will be better and more completely understood by referring to the following detailed description of example non-limiting embodiments in conjunction with the drawings, of which:

FIG. 2B1 is a diagram which illustratively depicts the graphical user interface of the new user registration homepage of the server system shown in FIG. 1 in accordance with one or more embodiments of the present invention.

FIG. 2B2 is a diagram which illustratively depicts the graphical user interface of the security questions webpage of the server system shown in FIG. 1 in accordance with one or more embodiments of the present invention.

FIG. 2B3 is a diagram which illustratively depicts the graphical user interface of the user profile webpage of the server system shown in FIG. 1 in accordance with one or more embodiments of the present invention.

FIG. 2B4 is a diagram which illustratively depicts the graphical user interface of the terms of use webpage of the server system shown in FIG. 1 in accordance with one or more embodiments of the present invention.

FIG. 2B5 is a diagram which illustratively depicts the graphical user interface of the complete registration webpage of the server system shown in FIG. 1 in accordance with one or more embodiments of the present invention.

FIG. 2C is a diagram which illustratively depicts the graphical user interface of a secondary authentication process webpage of the server system shown in FIG. 1 in accordance with one or more embodiments of the present invention.

FIG. 2D is a diagram which illustratively depicts a users homepage of the server system shown in FIG. 1 in accordance with one or more embodiments of the present invention.

FIG. 2D1 is a diagram which illustratively depicts a users settings webpage of the server system shown in FIG. 1 in accordance with one or more embodiments of the present invention.

FIG. 2D2 is a diagram which illustratively depicts a users messages webpage of the server system shown in FIG. 1 in accordance with one or more embodiments of the present invention.

FIG. 2E is a diagram which illustratively depicts a users life category database webpage of the server system shown in FIG. 1 in accordance with one or more embodiments of the present invention.

FIG. 2I is a diagram which illustratively depicts a user's sharing category database webpage of the server system shown in FIG. 1 in accordance with one or more embodiments of the present invention.

FIG. 2J is a diagram which illustratively depicts a user's planning category database webpage of the server system shown in FIG. 1 in accordance with one or more embodiments of the present invention.

FIG. 2K is a diagram which illustratively depicts a user's logout category database webpage of the server system shown in FIG. 1 in accordance with one or more embodiments of the present invention.

FIG. 3 illustrates a flow diagram depicting the process by which the user uses a client system login shown in FIG. 2 to access the website and its server system shown in FIG. 1 to add, edit or delete the stored Note(s) using the proprietary database screen shown in FIG. 3A in accordance with the teachings of this invention.

FIG. 3A is a diagram which illustratively depicts a graphical user interface of typical proprietary database screens showing how notes are securely added to a designated folder of the server system shown in FIG. 1 in accordance with one or more embodiments of the present invention.

FIG. 3C is a diagram which illustratively depicts a proprietary database screen where a user securely stores a note to a category sub-database folder of the server system shown in FIG. 1 in accordance with one or more embodiments of the present invention.

FIG. 3D is a diagram which illustratively depicts a graphical user interface generated by a folder contents report function showing all notes stored within a typical category database of the server system shown in FIG. 1 in accordance with one or more embodiments of the present invention.

FIG. 4 illustrates a flow diagram depicting the process by which the user uses a client system login shown in FIG. 2 to access the website and its server system shown in FIG. 1 to add, edit, move or delete Documents in accordance with the teachings of this invention.

FIG. 4A is a diagram which illustratively depicts the proprietary database screen that a user would interact with when adding documents to a designated category sub-database in the server system shown in FIG. 1 in accordance with one or more embodiments of the present invention.

FIG. 4C is a diagram which illustratively depicts a folder contents report of the server system shown in FIG. 1 in accordance with one or more embodiments of the present invention.

FIG. 4D is a diagram which illustratively depicts the graphical user interface screen of a user sending documents via an email server or fax server of the server system shown in FIG. 1 in accordance with one or more embodiments of the present invention.

FIG. 5 illustrates a flow diagram depicting the process by which the user uses a client system login shown in FIG. 2 to access the website and its server system shown in FIG. 1 to search access and view a stored Note(s) or stored Document(s) in accordance with one or more embodiments of the present invention.

FIG. 5A is a diagram which illustratively depicts a graphical user interface screen by which a user may search, select or view stored documents in accordance with one or more embodiments of the present invention.

FIG. 5C is a diagram which illustratively depicts a graphical user interface screen by which a user may search, select or view stored documents in accordance with one or more embodiments of the present invention.

FIG. 6.1 illustrates a flow diagram depicting the process by which an intended sharing recipient uses a client system login shown in FIG. 2 to access the website and its server system shown in FIG. 1 to securely access the shared Notes or Documents stored in particular Category Sub-Databases (Folders) for specific family members in accordance with one or more embodiments of the present invention.

FIG. 6A is a diagram which illustratively depicts an encrypted email link instructing the recipient to access shared documents and notes in accordance with one or more embodiments of the present invention.

FIG. 6B is a diagram which illustratively depicts an authentication webpage prompted when accessing shared notes and documents in accordance with one or more embodiments of the present invention.

FIG. 6C is a diagram which illustratively depicts a users shared content report in accordance with one or more embodiments of the present invention.

FIG. 7B is the graphical user interface which depicts a toll free customer center access screen in accordance with one or more embodiments of the present invention.

FIG. 7C is the graphical user interface which depicts a toll free customer center access screen in accordance with one or more embodiments of the present invention.

FIG. 7D is the graphical user interface which depicts a toll free customer center access screen in accordance with one or more embodiments of the present invention.

FIG. 7D1 is the graphical user interface which depicts a toll free customer center access screen in accordance with one or more embodiments of the present invention.

FIG. 7F is the graphical user interface which depicts a toll free customer center access screen used by a customer representative to send notes and documents via email or fax on behalf of an authorized user in accordance with one or more embodiments of the present invention.

FIG. 8B is a diagram which illustratively depicts proprietary software tools embedded within the server system shown in FIG. 1 in accordance with one or more embodiments of the present invention.

FIG. 8D is a diagram which illustratively depicts proprietary software tools embedded within the server system shown in FIG. 1 in accordance with one or more embodiments of the present invention.

FIG. 9A illustrates a visual depiction of the E-Notary platform in accordance with one or more embodiments of the present invention.

FIG. 9C illustrates a visual depiction of the E-Notary platform in accordance with one or more embodiments of the present invention.

FIG. 9D illustrates a visual depiction of the E-Notary platform in accordance with one or more embodiments of the present invention.

FIG. 9E illustrates a visual depiction of the E-Notary platform in accordance with one or more embodiments of the present invention.

FIG. 9F illustrates a visual depiction of the E-Notary platform in accordance with one or more embodiments of the present invention.

DETAILED DESCRIPTION OF THE INVENTION

Various aspects and embodiments of the present invention will now be described in detail with reference to the accompanying figures. Certain terminology is used herein for convenience only and is not to be taken as a limitation on the present disclosure. The terminology includes the words specifically mentioned, derivatives thereof and words of similar import. The embodiments illustrated below are not intended to be exhaustive or to limit the disclosure to the precise form disclosed. These embodiments are chosen and described to best explain the principle of the disclosure and its application and practical use and to enable others skilled in the art to best utilize the invention.

Figure 1:
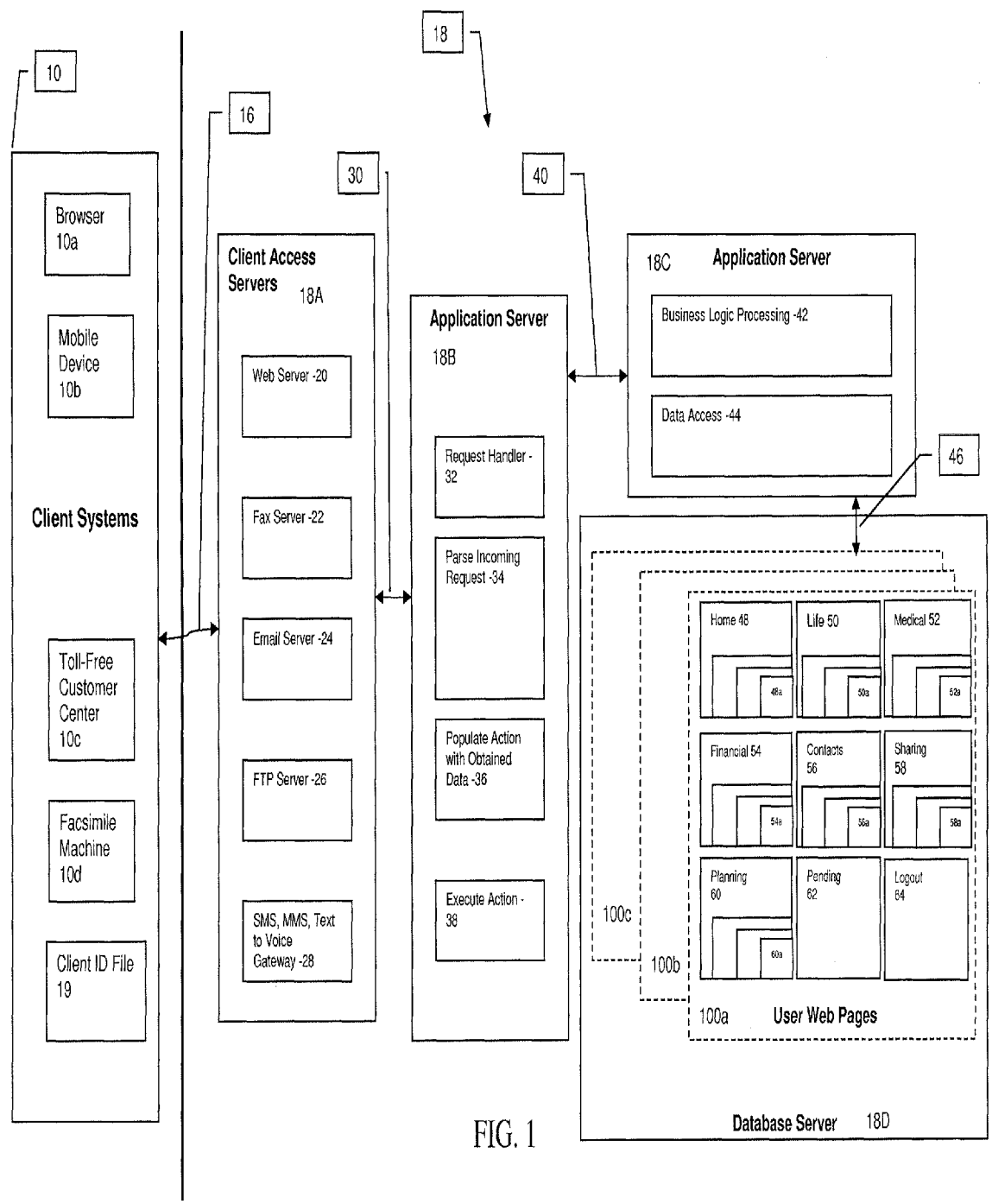
FIG. 1 illustrates a functional block diagram depicting how a plurality of client systems and a server of a website to be accessed by the user's client system are connected to and by a communication link to each other in accordance with one or more embodiments of the present invention.

FIG. 1—Client Systems

FIG. 1 shows an illustrative embodiment of this invention which permits a user, during an emergency situation or routinely, to use a plurality client systems 10 and to access a database server 18D by exchanging messages over a communication link 16 to access and retrieve information that is displayed on User Web Pages 100a, 100b and 100c which denote web pages unique to each user of the server system 18.

It is appreciated that a plurality of client systems 10, which include a browser 10a, a mobile device 10b, a Toll-Free Customer Center 10c and a facsimile 10d are connected to communication link 16 are configured to transmit messages of communication link 16. As shown in FIG. 1, it is contemplated that a user can communicate with the server system 18 through any of the plurality of client systems 10 which would include a browser 10a, a mobile device 10b, a Toll-Free Customer Center 10c and a facsimile 10d.

In the illustrative embodiment of the present invention, a user would use client systems 10 to open a communication session with server system 18 by entering and sending user's client identifier, which is stored in client ID file 19, over link 16 to server system 18. The client identifier which is entered in by the user and is known as "user credentials" is stored in a client ID file 19 and each of client systems 10a through 10d utilize client ID file 19 for sending the "user credentials", which uniquely identifies the user of client systems 10, to server system 18. From then on, client system 10 includes its client identifier with all messages sent to server system 18 so that server system 18 can identify the particular user from which the message was sent. Such use of client ID file 19 permits a user to access, send or retrieve his/her unique Notes and Documents that are displayed on User Web Pages 100a, 100b, 100c within server system 18. Client's Notes and Documents can be viewed or transmitted to an external recipient using multiple communication links 16, in accordance with the teachings of this invention.

FIG. 1—Client System: Using a Browser

In yet another illustrative embodiment of the present invention, a user initiates browser 10a to open a communication session with server system 18 by assigning and sending client identifier to client system 10 over link 16. The client identifier, which is entered in by the user and known as "user credentials", is stored in client ID file 19. From then on, client system 10 includes its client identifier with all messages sent to server system 18 so that server system 18 can identify the particular user from which the message was sent from browser 10a. Such use of the client system 10 permits a user to access, send or retrieve particular Notes and Documents that are displayed on User Web Pages 100a, 100b, 100c within server system 18 can be transmitted to an external recipient using multiple communication links 16, in accordance with the teachings of this invention as further described in FIG. 2.

FIG. 1—Client System: Using a Mobile Device Browser

In another illustrative embodiment of the present invention, a user initiates a communication session with server system 18 on mobile device browser 10b by assigning and sending over ink 16, client identifier, to client system 10. The client identifier or "user credentials" is entered by a user and is then stored in client ID file 19. From then on, client system 10 includes its client identifier with all messages sent to server system 18 so that server system 18 can identify the particular user from which the message was sent from browser 10b. Such use of client system 10 permits a user to access, send or retrieve particular Notes and Documents that are displayed on User Web Pages 100a, 100b, 100c within server system 18, which then can be transmitted to an external recipient using multiple communication links 16, in accordance with the teachings of this invention as further described in FIG. 2.

FIG. 1—Client System: Using the Toll-Free Center

In another illustrative embodiment of the present invention, a user contacts a representative at Toll-Free Customer Center 16 and authorizes the representative to open a communication session with server system 18 using browser 10a by providing his/her client identifier to the representative and having the representative assign and send over link 16 his/her client identifier to client system 10. The client identifier, which is entered in by the user and known as "user credentials", is stored in client ID file 19. From then on, client system 10 includes its client identifier with all messages sent to server system 18 so that server system 18 can identify the particular user from which the message was sent from browser 10a. Such use of client system 10 permits a user to authorize the representative to access, send or retrieve particular Notes and Documents on his/her behalf that are displayed on User Web Pages 100a-c, 100b, 100c within server system 18 which can be transmitted to an external recipient using multiple communication links 16, in accordance with the teachings of this invention as further described in FIG. 7.

FIG. 1—Client System: Using a Facsimile

In another illustrative embodiment of the invention, a user initiates a communication session with server system 18 on facsimile machine 10d by assigning and sending link 16 to client system 10. The client identifier which is entered in by the user and known as "user credentials" is stored in client ID file 19. From then on, client system 10 includes its client identifier with all messages sent to server system 18 so that server system 18 can identify the particular user from which facsimile 10d transmission was sent from. Such use of client system 10 permits a user to access, send or retrieve particular Notes that are stored on User Web Pages 100a-c, 100b, 100c within server system 18 which is transmitted back to facsimile machine 10d using communication link 16, in accordance with the teachings of this invention.

FIG. 1—Client Access Server

In the illustrative embodiment of the invention, it is further shown in FIG. 1 that client access servers 18A which include Web Server 20, Fax Server 22, Email Server 24, FTP Server 26 and SMS, MMS, TEXT TO VOICE Gateway 28 are designed to handle the communication sessions between the user and the server system 18 depending on the client system the user chooses to access the server system 18.

As shown in client access servers 18A, Web Server 20 would handle communication sessions between a user and a client system such as Browser 10a, mobile device 10b, and Toll-Free Customer Center 10c to handle requests to Add/Edit/Delete Note(s) and Document(s) as shown later in FIG. 3 and FIG. 4 respectively and/or Search to Retrieve or Send Note(s) and Document(s) as shown later in FIG. 5.

As shown in client access servers 18A, Fax Server 22 would handle communication sessions between a user and a client system such as Facsimile Machine 10d to handle requests to Add Document(s) as shown later in FIG. 4 and to Retrieve or Send Note(s) and Document(s) as shown later in FIG. 5.

As shown in client access servers 18A, Email Server 24 would handle communication sessions between a user and a client system such as Browser 10a, a mobile device 10b, and Toll-Free Customer Center 10c to handle requests to Add Document(s) as shown later in FIG. 4 and to Retrieve or Send Note(s) and Document(s) as shown later in FIG. 5.

Figure 4:
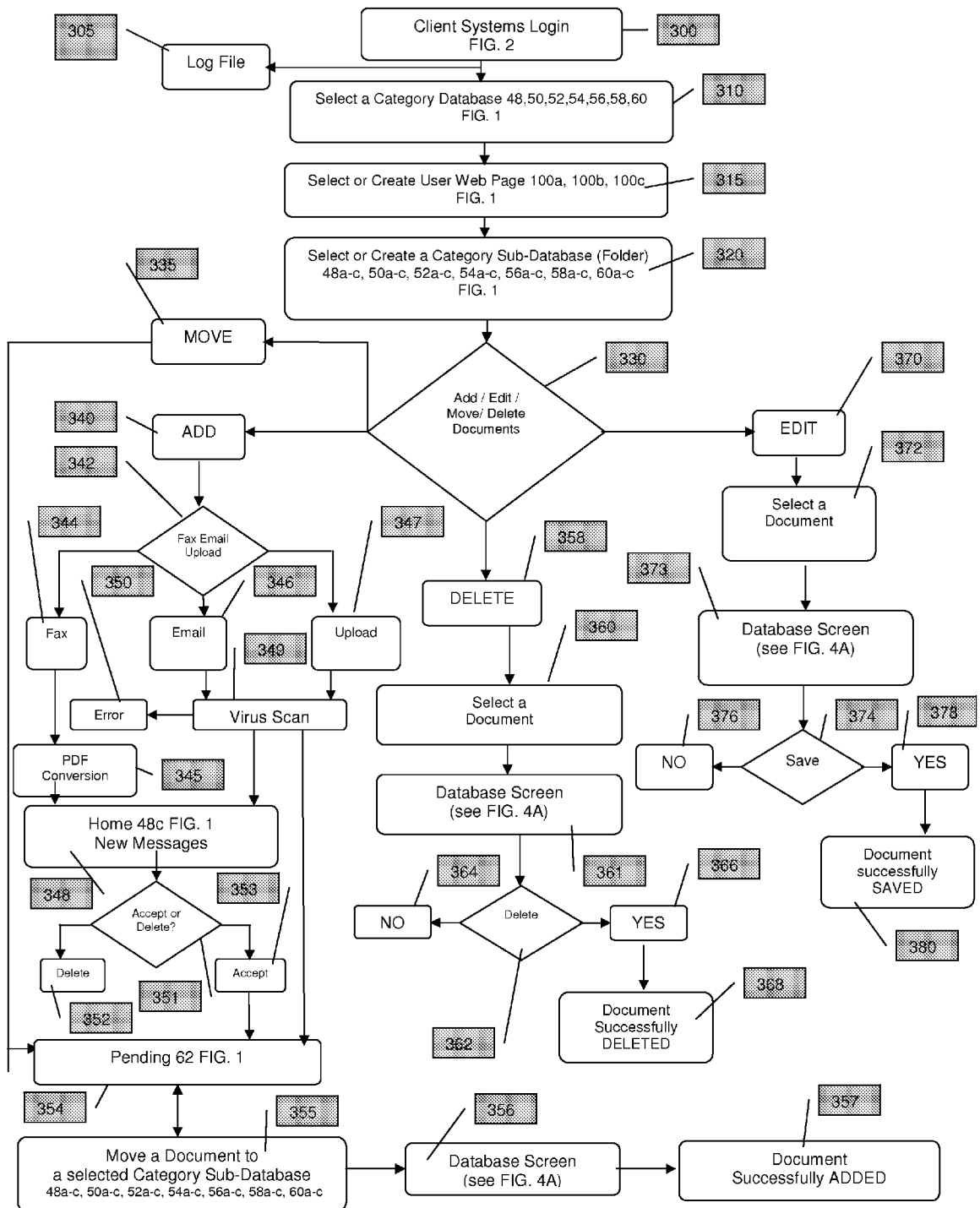
Figure 5:
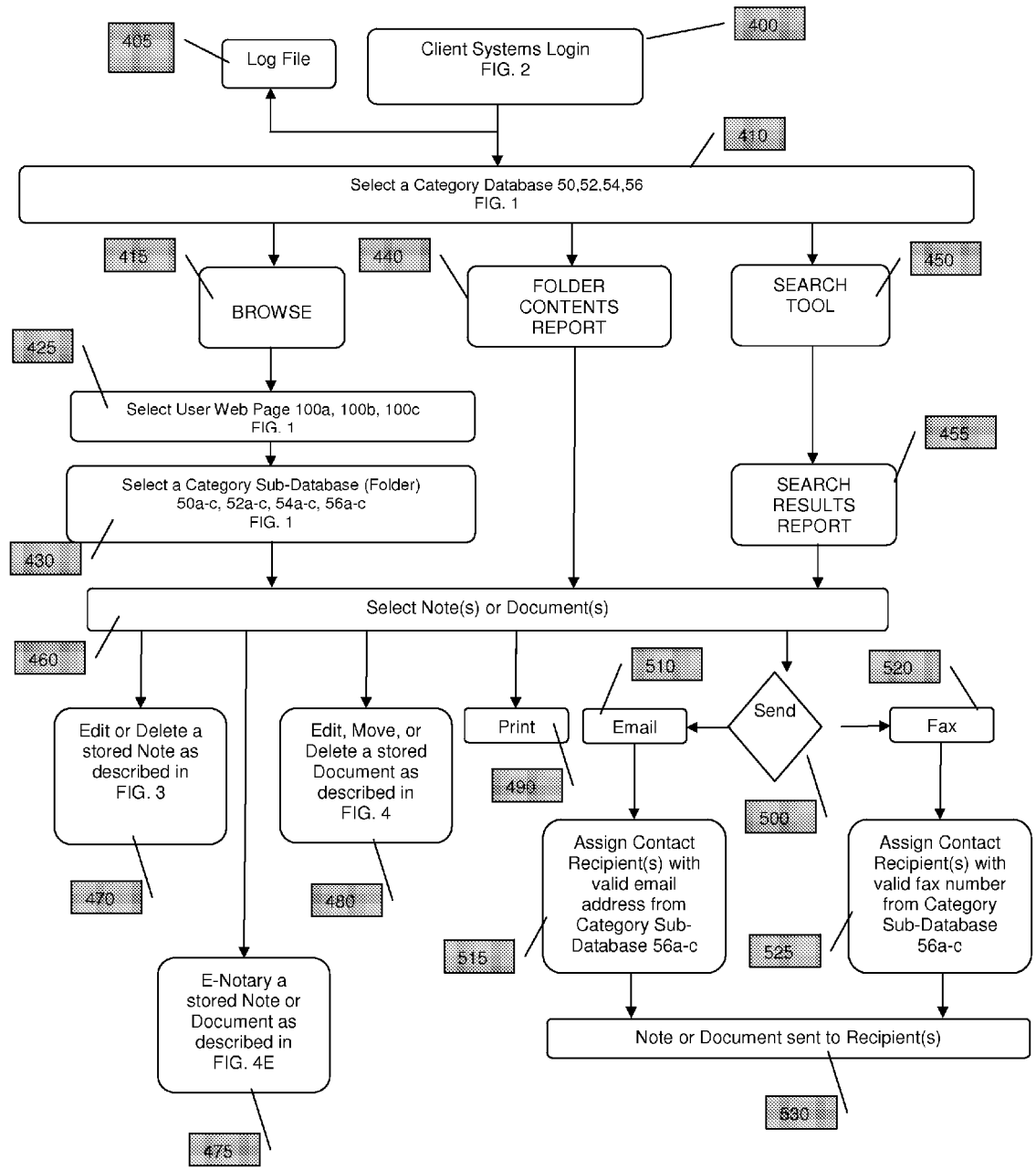

As shown in client access servers 18A, File Transfer Protocol Server or FTP Server 26 would handle communication sessions between a user and a client system such as Browser 10a, and Toll-Free Customer Center 10c to handle requests to Add Document(s) as shown later in FIG. 4 and to Retrieve or Send Note(s) and Document(s) as shown in FIG. 5.

As shown in client access servers 18A, the Simple Message Service (SMS, MMS, TEXT TO VOICE), Multimedia Message Service (MMS) and Text to Voice Server Gateway 28 would handle communication sessions between a user and a client system such as Browser 10*a*, mobile device 10*b* to handle requests to Retrieve or Send Note(s) and Document(s) as shown later in FIG. 5.

FIG. 1—Application Server

In the illustrative embodiment of the invention, it is further shown in FIG. 1 that Application Server 18B are comprised of multiple processes that accept, dissect and process information which include Request Handler Module 32, Parse Incoming Request Module Module 34, Populate Action with Obtained Data Module 36, and Execute Action 38 which are designed to handle the communication sessions between the user and server system 18 for all of the client systems utilized to access the server system 18. In the illustrative embodiment of the invention, it is further shown in FIG. 1 that Application Server 18B would include multiple processors that would process and access databases server 18D by using the action instructions that were sent by Application Server 18B.

As shown in Application Server 18B, Request Handler Module 32 accepts the initial communication request between a user and a client system and receives all the raw information that the user requests the system to perform. Once the information has been obtained by Request Handler Module 32, application server 18B passes the raw information to Parse Incoming Request Module Module 34 process which would then begin to examine the particular details about the raw information received in Request Handler Module 32 and calculate what action is required to resolve each request sent to the server system 18 by the user and then parse that information into specific actions. Once all the actions have been identified by Parse Incoming Request Module Module 34, the dissected information is sent to Populate Action with Obtained Data Module 36 process which provides the pending actions with the specific data that was respectfully identified for that particular action. Once all the actions are correctly populated by Populate Action with Obtained Data Module 36 the actions are executed by a final process called Execute Action 38 process. These particular actions are then sent to Application Server 18B to Business Logic Processing Module 42 which processes each action and converts it into a logical request to Data Access 44 process which then accesses Database Server 18D and the particular Category Sub-Databases 48*a-c*, 50*a-c*, 52*a-c*, 54*a-c*, 56*a-c*, 58*a-c*, 60*a-c* for each family member indicated as User Web Pages 100*a*, 100*b*, 100*c* for each Category Database 48, 50, 52, 54, 56, 58, 60 shown in FIG. 1.

FIG. 1—Database Server

Database server 18D comprises database 48 which stores client identifier/customer table and Category Databases 50, 52, 54, 56, 58, 60, 62. Customer database 48 may contain, for example, customer information for recent purchases or future purchasers. The customer information includes purchaser-specific order information such as the name of the customer and billing information. Customer database 48 stores entries for each order that has not yet been transmitted to a purchaser. Customer database 48 contains a mapping from each client identifier, which is a globally unique identifier that uniquely identifies client system 10, to the purchaser associated with client system 10. Category Databases 50, 52, 54, 56, 58, 60, 62 include separate storage areas for receiving respective data reflective of the different categories and services which may be processed in accordance with this invention.

Figure 2:
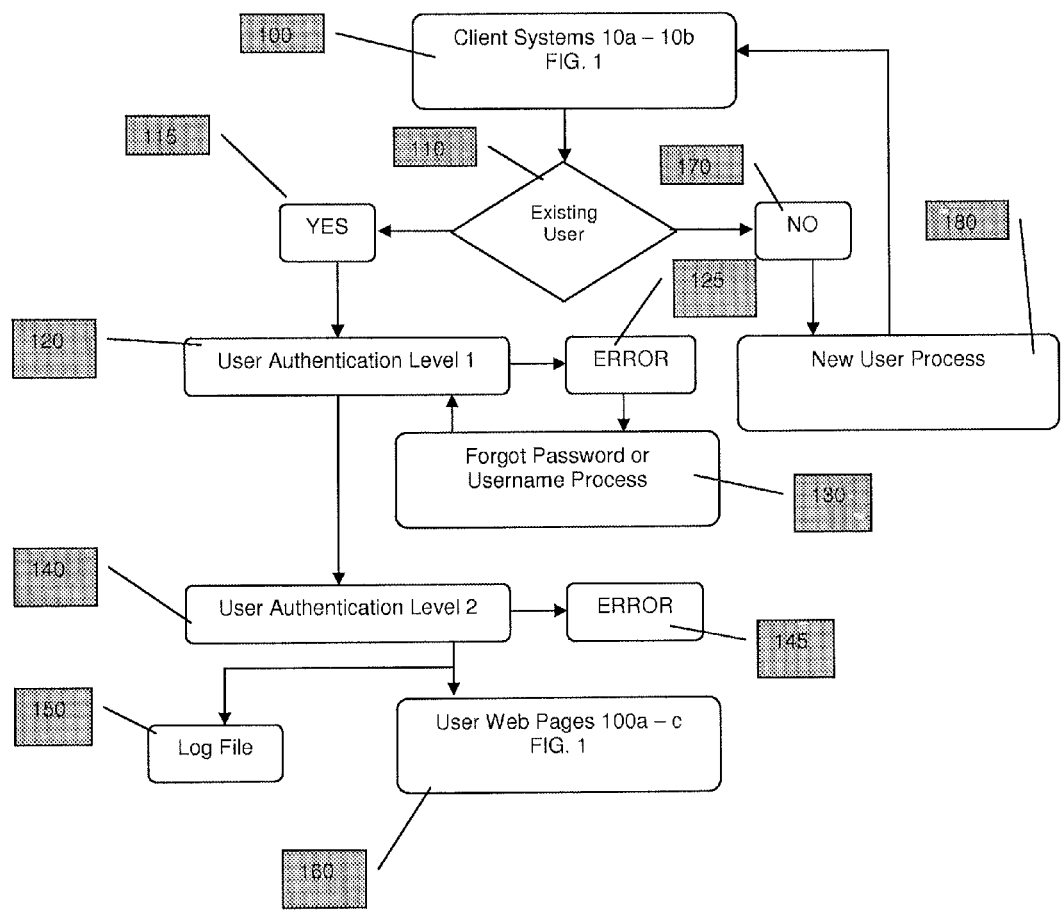
FIG. 2 illustrates a flow diagram depicting the process by which the user uses a browser or mobile device to access the website and its server system shown in FIG. 1, in accordance with one or more embodiments of the present invention.

To be described by FIG. 2, the user will have the opportunity to setup a new account on the system and then have multiple methods for accessing the server system 18 as an existing subscriber of the system. As it will be illustrated in and described with respect to FIG. 3 and FIG. 4 respectively, Note(s) can be entered into a proprietary database screen and stored into database server 18D or Document(s) will be uploaded and stored into database server 18D in the form of Document(s) and uniquely labeled in proprietary database screen. Though database server 18D has been described in FIG. 1 in terms of a plurality of distinct Category Databases 50, 52, 54, 56, 58, 60, 62 it would be appreciated by one skilled in the art that one memory or combination thereof may store this data. Category Database 64, though indicated as a Category Database for consistency, it not a typical database but instead functions as a tool to effectively logoff the server system 18. When a user logs off the system, they have secured all information stored within their account and as a result, this information is no long accessible until the users next authenticated log in.

FIG. 1—Database Server: Adding Notes

Still referring to FIG. 1, Category Databases 50, 52, 54, 56, 58, 60, 62 are comprised of a plurality of User Web Pages 100*a*, 100*b*, 100*c* as defined by the subscriber of the system, and default Category Sub-Databases 50*a-c*, 52*a-c*, 54*a-c*, 56*a-c*, 58*a-c*, 60*a-c*, wherein a plurality of default database fields, accept Note(s) entered in by the user. After Note(s) has been added by the user into Category Sub-Databases 50*a-c*, 52*a-c*, 54*a-c*, 56*a-c*, 58*a-c*, 60*a-c*, it is stored within database server 18D and is able to be displayed on User Web Pages 100*a*, 100*b* and 100*c* which represent the particular family member or pet as defined by the subscriber of the system. A user may edit or delete his/her Note(s) by selecting the appropriate Category Sub-Databases 50*a-c*, 52*a-c*, 54*a-c*, 56*a-c*, 58*a-c*, 60*a-c*, and update or delete Note(s) which will dynamically update database server 18D. As will be explained in FIG. 5, this Note(s) can be searched for and transmitted to an external recipient using multiple communication links 16, in accordance with the teachings of this invention. Multiple Category Sub-Databases 50*a-c*, 52*a-c*, 54*a-c*, 56*a-c*, 58*a-c*, 60*a-c*, are separately needed to permit the user to store, in particular, information specific to each User Web Page 100*a*, 100*b*, 100*c* within each Category Database 50, 52, 54, 56, 58, 60, 62.

FIG. 1—Database Server: Adding Documents

Still referring to FIG. 1, Category Databases 50, 52, 54, 56, 58, 60, 62 comprises of multiple User Web Pages 100*a*, 100*b*, 100*c* as defined by the subscriber of the system, and default Category Sub-Databases 50*a-c*, 52*a-c*, 54*a-c*, 56*a-c*, 58*a-c*, 60*a-c*, wherein a plurality of default database fields, accept Document(s) added by the user. After the Document(s) have been added by the user into database server 18D using a plurality of client systems 10*a-d* over communication link 16 they are stored in Category Database 62 named Incoming Files. After the Document(s) are stored in Incoming Files Category Database 62, the user may add meta-data to specifically identify and label the Document(s) by using a plurality of default database fields within the proprietary database screen. A user then has the ability to store the Document(s) by placing the Document(s) in appropriate Category Sub-Databases 50*a-c*, 52*a-c*, 54*a-c*, 56*a-c*, 58*a-c*, 60*a-c*, associated with appropriate User Web Pages 100*a*, 100*b*, 100*c* which would represent the particular family member or pet as defined by the subscriber of the system which is stored within database server 18D. A user may edit or delete his/her Document(s) by selecting appropriate Category Sub-Databases 50*a-c*, 52*a-c*, 54*a-c*, 56*a-c*, 58*a-c*, 60*a-c*, and update or delete information which will dynamically update database server 18D. As will be explained in FIG. 5, this Document(s) can be searched for and transmitted to an external recipient using multiple communication links 16, in accordance with the teachings of this invention. Multiple Category Sub-Databases 50*a-c*, 52*a-c*, 54*a-c*, 56*a-c*, 58*a-c*, 60*a-c*, are separately needed to permit the user to store, in particular, information specific to each User Web Page 100*a*, 100*b*, 100*c* within each Category Database 50, 52, 54, 56, 58, 60, 62.

Figure 3:
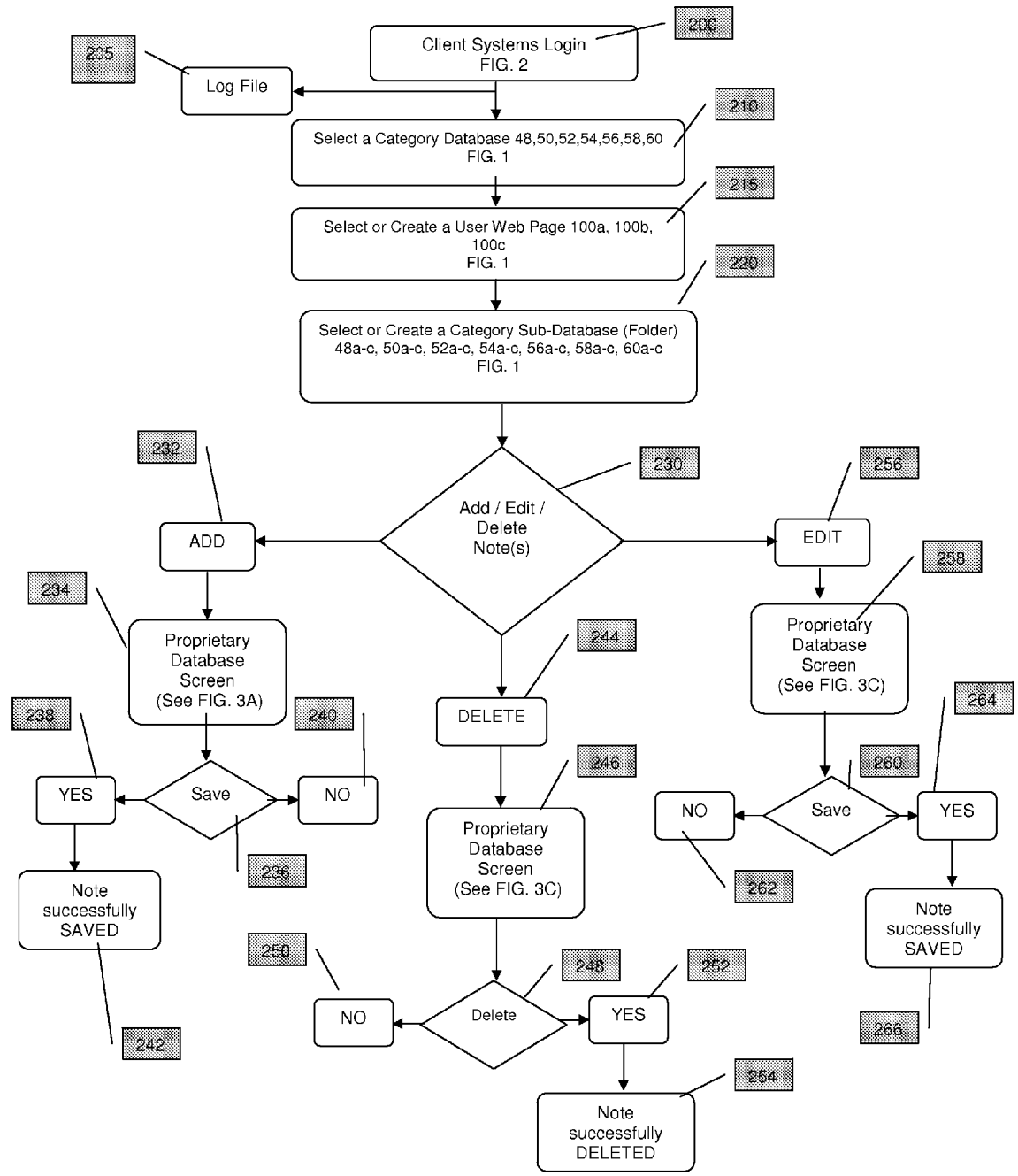

As will be depicted via the flow diagram of FIG. 3 and FIG. 4, the programming for client system 10 and server system 18 permits the user to setup a communication session between a plurality of client systems 10*a*-10*d* and server system 18, whereby the user can communicate with server system 18 to establish new Category Sub-Databases, also known as "Add Custom Folders", in addition to default Category Sub-Databases 50*a-c*, 52*a-c*, 54*a-c*, 56*a-c*, 58*a-c*, 60*a-c*, that a plurality of specific information can be stored within Category Databases 50, 52, 54, 56, 58, 60, 62. Category Sub-Databases 50*a-c*, 52*a-c*, 54*a-c*, 56*a-c*, 58*a-c*, 60*a-c*, and any addition templates that are subsequently added as "Custom Folders" may be renamed to a unique name to reflect the type of information that may be stored in the folder by the user. The naming convention that is chosen by the user to rename any of Category Sub-Databases (Folders) 50*a-c*, 52*a-c*, 54*a-c*, 56*a-c*, 58*a-c*, 60*a-c*, is arbitrary to his/her choosing, in accordance with the teachings of this invention. Such a name may take the form, for example, of "Home Improvement Records" to store Note(s) or Document(s) pertaining to a remodeling project being performed for the user by a contractor.

FIG. 2—Client System Access with Browser or Mobile Device Flow Chart

FIG. 2 depicts a flow diagram which illustrates the process by which the user uses his/her browser 10*a* or his/her mobile device 10*b* to access the website and its server system shown in FIG. 1, in accordance with one or more embodiments of the present invention.

In one illustrative embodiment of this invention, and explained in respect to the flow diagram of FIG. 2, a user can use a plurality of client systems in step 100, which include browser 10*a* and mobile device 10*b* to securely access the server system 18 over link 16 as shown in FIG. 1. Protocols are inherent in the system which would secure the connection to system 18 in the form of encrypted keys that are generated by the system and provided to the user during the initial communication link. A user accessing the server system 18 cannot do so unless they are an existing subscriber to the server system 18 in step 110. If the user is not an existing user of system 170, a New User Process in step 180 (see FIG. 2B below for graphical detail) is initiated and allows for the user to setup a personal account on the system or store pertinent information such as identification and billing information as well as define user credentials and security challenge questions which will be used to securely access the server system 18 in the future. Once the user completes the New User Process, the new subscriber can use a plurality of client systems 10 as described in FIG. 1. When accessing the server system 18, an existing subscriber in step 115 will be presented with multiple authentication questions to ensure proper identification and security into the server system 18 over communication link 16 as shown in FIG. 1. In step 120 the User Authentication Level 1 (see FIG. 2A below for graphical detail) will prompt the user accessing the server system 18 to provide specific credentials that were defined in the new user process in step 180. This is to prevent computer hackers and unauthorized users from attacking the system with programmed scripts. If the credentials provided by the user in step 120 are incorrect, then an alarm will sound in step 125 asking the user to reenter the credentials. If the user fails to provide correct credentials on three attempts, the system will lock the user out of the account and prompt them to contact the Toll-Free Customer assistance center to reset the account.

A user may also use the Forgot Password or Username process in step 130 for online assistance with accessing their account. If the credentials are accurately defined, then the system will proceed to step 140 which is the User Authentication Level 2 (see FIG. 2B below for graphical detail). The system will prompt the user in step 140 to provide more specific answers to three random security challenge questions defined in the new user process in step 180. Since a new user would have to setup ten security challenge questions during the New User Process back in step 180, the User Authentication Level 2 in step 140 would only ask for three random questions at one time. If the credentials provided by the user in step 140 are incorrect, then an alarm will sound in step 145 asking the user to answer three new randomly selected questions that were defined by the user in the new user process in step 180. This will be repeated until the third alarm is sounded at which time the system will lock the user account and instruct the user to contact Toll-Free Customer Center 10*c* in FIG. 1 for further instructions. If the credentials are accurately defined in step 140, then, the system would automatically begin to generate Access Log File 150 which would record current session activity and securely store this information within the user account for future reference. For additional security, the session with the system will expire and logoff from the user session if no activity is detected for 30 minutes. The user would be required to log back into the system as described in FIG. 2. The user would then proceed to step 160 which grants the user access to User Web Pages 100*a*, 100*b*, 100*c* in FIG. 1.

Figure 2A:
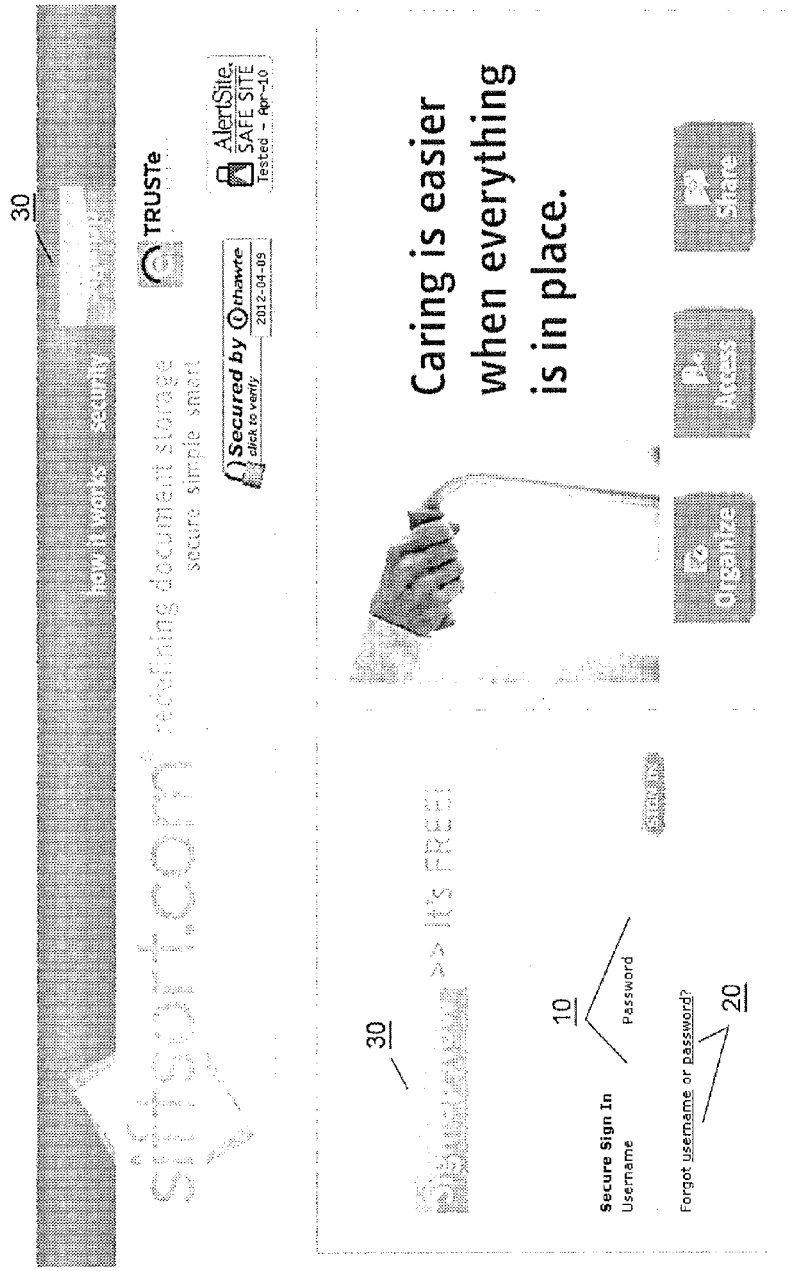
FIG. 2A is a diagram which illustratively depicts the graphical user interface of the user homepage of the server system shown in FIG. 1 in accordance with one or more embodiments of the present invention.

FIG. 2A—User Authentication Level 1: Log-On Page

FIG. 2A is a diagram which illustratively depicts the graphical user interface by which the user uses his/her browser 10*a* or his/her mobile device 10*b* to access the website and its server system shown in FIG. 1, in accordance with the teachings of this invention.

Figure 2B5:
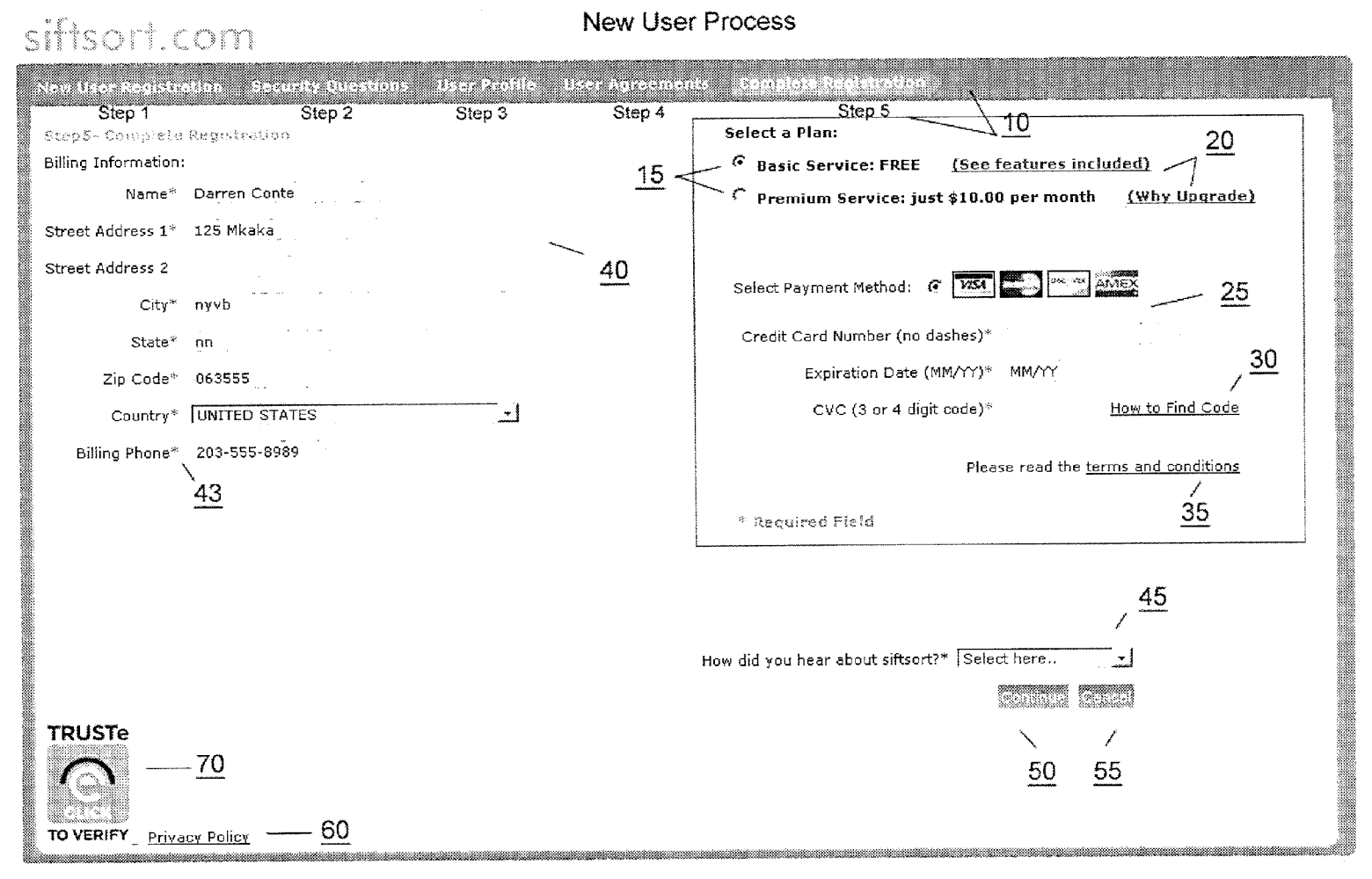

If the person trying to access the system is new and has not already setup an account, they may do so by using the New User Process as indicated in numeral 30 in FIG. 2A which is further explained in FIG. 2B and also shown in step 180 in FIG. 2. The user can store pertinent information such as identification and billing information as well as define user credentials and security challenge questions which will be used to securely access the system in the future. If the person is already and existing user of the system, they may use the User Authentication Level 1 indicated as numeral 10 in FIG. 2A and referenced in step 120 in FIG. 2 which would allow an existing user to enter in his/her credentials (Username and Password) to login to the system, using the Sign In button indicated as numeral 15. If an existing user forgot either of these credentials they could use the Forgot Password or Username processes indicated as numeral 20 in FIG. 2A and referenced in step 130 in FIG. 2 to utilize online assistance with login credentials in. These processes would require the user to answer security challenge questions after providing unique information relating to his/her account. Once a user has properly identified themselves, the requested information would be sent to the email address on record in the system and the user could retry to login to the system in item 10 in FIG. 2A.

FIG. 2B1—New User Process: Step 1

FIG. 2B1 is a diagram which illustratively illustrates the graphical user interface by which the user uses his/her browser 10*a* or his/her mobile device 10*b* to setup a new user account using the New User Process to access the website and its server system shown in FIG. 1, in accordance with the teachings of this invention.

The New User Process would enable a person to securely establish an account by which they could access to the system. The process has five unique steps within it to help the user create a new user account namely, New User Registration, Security Questions, User Profile and User Agreements; Complete Registration indicated as numeral 10. New User Registration, Step 1 would require the user of the system to define a unique Login ID and Password and verify the unique Password for accuracy indicated as numeral 20. For additional security, the system would rate the strength of the unique Password as it is entered by the user indicated as numeral 25, allowing the user to create a stronger Password before proceeding with the New User Process. The unique Login ID and Password will be used when the user attempts to access the server system in FIG. 2A—User Authentication Level 1—LOGON PAGE. For additional security, the user would have to replicate a random image produced by the system showing a variety of alphanumeric characters indicated as numeral 30. This fail-safe step would prevent unauthorized people from using malicious scripts to enter and/or damage the system. If the user fails to replicate the random image produced by the system showing a variety of alphanumeric characters, a new random image will be produced by the system showing a variety of different alphanumeric characters, which the user must replicate as indicated as numeral 30. Once the user has correctly completed the New User Registration, Step 1 they would use the Continue button indicated as numeral 40 to proceed to Security Questions, Step 2, of the New User Process. The user may cancel the New User Process at this point by clicking the Cancel button indicated as numeral 50, and the server system will not retain in its server memory any unique information provided by the user in any fields as indicated as numeral 20 or numeral 30. The user may display and read a Privacy Policy Statement indicated as numeral 60. The user may verify a third-party rating of Siftsort.com and the server system indicated as numeral 70.

FIG. 2B2—New User Process: Step 2

FIG. 2B2 is a diagram which illustratively depicts the graphical user interface by which the user uses his/her browser 10*a* or his/her mobile device 10*b* to setup a new user account using the New User Process to access the website and its server system shown in FIG. 1, in accordance with the teachings of this invention.

The New User Process would enable a person to securely establish an account by which they could access to the system. The process has five unique steps within it to help the user create a new user account namely, New User Registration, Security Questions, User Profile and User Agreements; Complete Registration indicated as numeral 10. Security Questions, Step 2 is where the user of the system would be required create 10 security challenge questions for additional security, which will be used when accessing the website and its server system shown in FIG. 2C—User Authentication Level 2—SECURITY QUESTIONS. Five standard security questions as indicated as numeral 20 can be selected from the system which would offer a wide selection of "standard" questions allowing the user to enter in unique alphanumerical answers as indicated as numeral 25. The remaining five security questions would be "custom" questions where the user would create five unique alphanumeric questions as indicated as numeral 30 and create five unique alphanumeric answers for each custom question as indicated as numeral 35. None of the 10 security questions provided by the user of the system, as indicated as numeral 20 and 30, may be alphanumerically identical. If the system detects that any 2 of the 10 security questions provided by the user of the system are alphanumerically identical, as indicated as numeral 20 and 30, the system will display an error message to the user of the system, requiring him/her to make all the 10 questions alphanumerically unique. The user may return to New User Registration, Step 1 by using the Back button as indicated as numeral 40, and the server system will retain in the system memory the unique information provided by the user of the system indicated in numeral 20, 25, 30 and 35 when the user returns to Security Questions, Step 2. Once the user has correctly completed the Security Questions, Step 2 the user of the system would use the Continue button indicated as numeral 50 to proceed to the User Profile, Step 3, of the New User Process. The user may display and read a Privacy Policy Statement indicated as numeral 60. The user may verify a third-party rating of Siftsort.com and the server system indicated as numeral 70.

FIG. 2B3—New User Process: Step 3

FIG. 2B3 is a diagram which illustratively depicts the graphical user interface by which the user uses his/her browser 10*a* or his/her mobile device 10*b* to setup a new user account using the New User Process to access the website and its server system shown in FIG. 1, in accordance with one or more embodiments of the present invention.

The New User Process would enable a person to securely establish an account by which they could access to the system. The process has five unique steps within it to help the user create a new user account namely, New User Registration, Security Questions, User Profile and User Agreements; Complete Registration indicated as numeral 10. User Profile, Step 3 is where the user of the system would be required to enter in their personal mailing address and contact information as indicated as numeral 20. The user of the system must complete all "required fields" in order to complete the User Profile, Step 3 successfully, by entering the required information noted with an orange asterisk indicated as numeral 25. If any information is not provided by the user of the system in the fields noted with an orange asterisk, the system will display an error message asking the user of the system to properly define all fields noted with an orange asterisk. The system will allow a user of the system to enter in a unique coupon code as indicated as numeral 30, to obtain a future monetary discount from a paid subscription service, known as Premium Service. The user may enter in a unique coupon code and validate the coupon on the server system by using the Validate Code button as indicated as numeral 35, and the server system will accept or reject the coupon code entered by the user of the system. The user may return to Security Questions, Step 2 by using the Back button as indicated as numeral 40, and the server system will retain in the system memory the unique information entered by the user in the files indicated as 20, 25 and 30 when the user returns to User Profile, Step 3. Once the user has correctly completed the User Profile, Step 3 they would click Continue button 50 and proceed to the User Agreements, Step 4, of the New User Process. The user may display and read a Privacy Policy Statement indicated as numeral 60. The user may verify a third-party rating of Siftsort.com and the server system indicated as numeral 70.

FIG. 2B4—New User Process: Step 4

FIG. 2B4 is a diagram which illustratively depicts the graphical user interface by which the user uses his/her browser 10*a* or his/her mobile device 10*b* to setup a new user account using the New User Process to access the website and its server system shown in FIG. 1, in accordance with one or more embodiments of the present invention.

The New User Process would enable a person to securely establish an account by which they could access to the system. The process has five unique steps within it to help the user create a new user account namely, New User Registration, Security Questions, User Profile and User Agreements;

Complete Registration indicated as numeral 10. User Agreements, Step 4 would require the user to "Agree" to the Terms of Use indicated as numeral 20. The user of the system may read the Terms of Use and when completed, the user of the system must acknowledge acceptance of the Terms of Use by checking the "I Agree to 'Terms of Use' box indicated as numeral 30. If the user of the system does not check the box indicated as numeral 30, then the system will display an error message informing the user of the system that they may not proceed with the New User Process unless they Accept the Terms of Use. The user may return to User Profile, Step 3 by using the Back button as indicated as numeral 40, and the server system will retain in the system memory the unique information entered by the user indicated as numeral 30 when the user returns to User Agreements, Step 4. Once User Agreements, Step 4 is completed, they would use the Continue button indicated as numeral 50 to proceed to the Complete Registration, Step 5, of the New User Process. The user may display and read a Privacy Policy Statement indicated as numeral 60. The user may verify a third-party rating of Siftsort.com and the server system indicated as numeral 70.

FIG. 2B5—New User Process: Step 5

FIG. 2B5 is a diagram which illustratively depicts the graphical user interface by which the user uses his/her browser 10a or his/her mobile device 10b to setup a new user account using the New User Process to access the website and its server system shown in FIG. 1, in accordance with one or more embodiments of the present invention.

The New User Process would enable a person to securely establish an account by which they could access to the system. The process has five unique steps within it to help the user create a new user account namely, New User Registration, Security Questions, User Profile and User Agreements; Complete Registration indicated as numeral 10. Complete Registration, Step 5 would require the user of the system to Select a Plan indicated as numeral 15 which the user of the system may select one of two types of subscription plans, a Basic Service or a Premium Service plan. The user of the system can display and read the differences between the two types of subscription plans by clicking on the 'See Features Included' and 'Why Upgrade' links indicated as numeral 20. The system will default to the Basic Service plan but if the user of the system chooses to subscribe to the Premium Service plan, the user of the system may select Premium Service and the user of the system will need to provide payment information indicated as numeral 25. The user of the system may also display and read 'How to Find Code' for their credit card by clicking the link indicated as numeral 30 and further read the Terms and Conditions of the billing cycle by clicking the link indicated as numeral 35. Furthermore, if the user of the system chooses to subscribe to the Premium Services, the user will be required to verify or edit Billing Information, which had been previously entered in User Profile, Step 3 indicated as numeral 40. The user of the system who elects to choose Premium Service Plan indicated as numeral 15 must complete all "required fields" in order to complete the Complete Registration, Step 5, by entering the required information noted with an orange asterisk as indicated as numeral 43. If any information is not provided by the user of the system in the fields noted with an orange asterisk, the system will display an error message asking the user of the system to properly define all fields noted with an orange asterisk. The user of the system must select from the pull-down menu 'How did you hear about SIFTSORT?' indicated as numeral 45. Once the user has correctly completed the Complete Registration, Step 5 they would use the Continue button indicated as numeral 50 to complete the New User Process, and the new User Account with all of the user provided information from all five New User Process Steps would be saved in the system and automatically return the user of the system to the User Authentication Level 1—LOGON PAGE process illustratively illustrated in FIG. 2A. The user may cancel the New User Process at this point by clicking the Cancel button indicated as numeral 55, and the server system will not retain in its server memory any unique information provided by the user in any fields as indicated from numeral 15 through numeral 45, or any previous steps completed in the New User Process. The user may display and read a Privacy Policy Statement indicated as numeral 60. The user may verify a third-party rating of Siftsort.com and the server system indicated as numeral 70.

FIG. 2C—User Authentication Level 2: Security Questions

FIG. 2C is a diagram which illustratively depicts the graphical user interface by which the user uses his/her browser 10a or his/her mobile device 10b to further authenticate access the website and its server system shown in FIG. 1, in accordance with one or more embodiments of the present invention.

Figure 7:
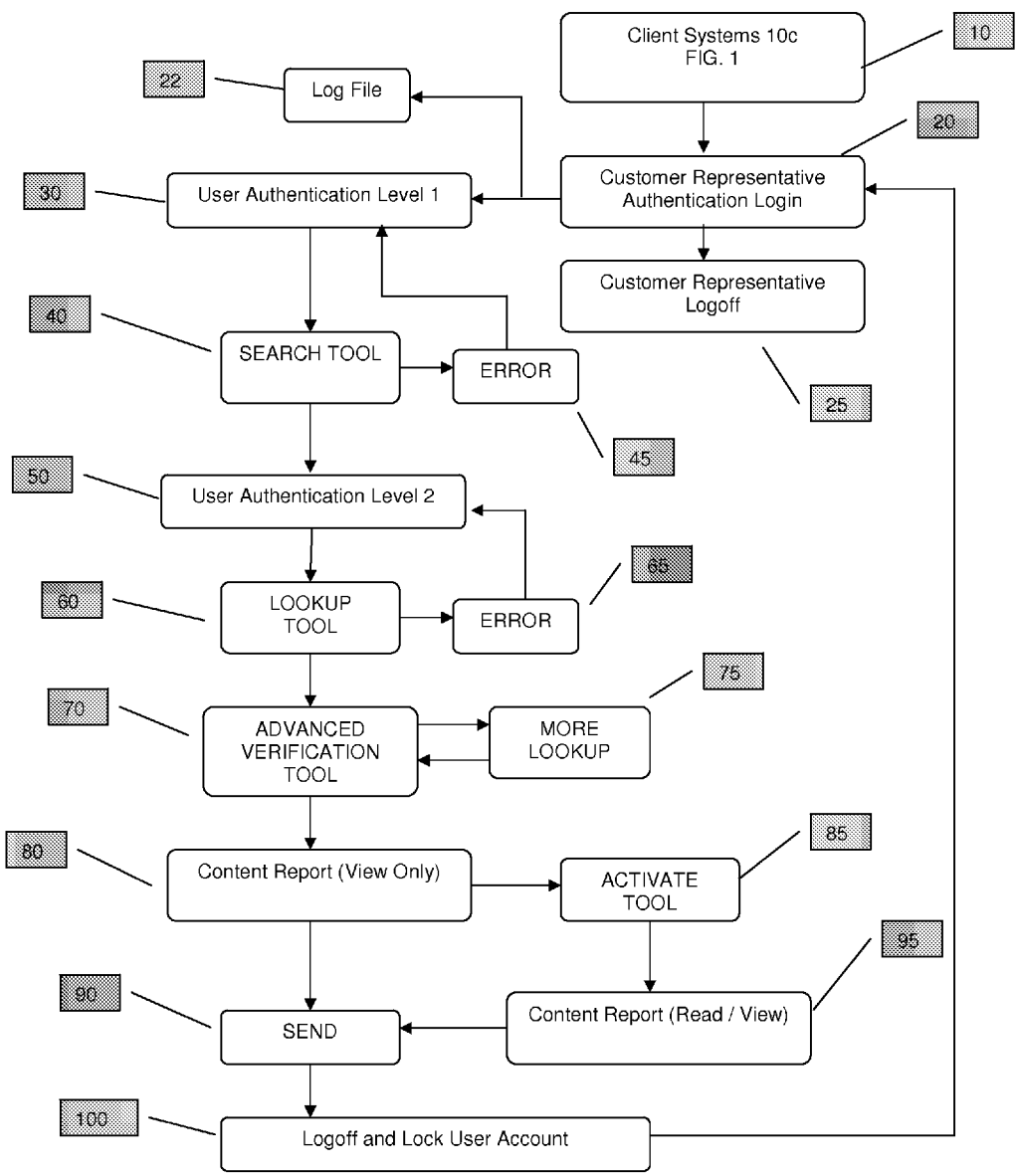
FIG. 7 illustrates a flow diagram depicting the process by which a user does not have access to the a client system Browser and Mobile Browser shown in FIG. 1 to access the website and its server system shown in FIG. 1 and described in FIG. 2 but can do so by requesting the Toll-Free Customer Assistance Center in FIG. 1 to access and send user Notes or Documents on his/her behalf in accordance with the teachings of this invention.

As part of the New User Process shown in step 180 in FIG. 2, a user would create ten security challenge questions. These questions would be used as additional security to prevent unauthorized access to the system. These are presented to the user after successfully completing the User Authentication Level 1 procedure indicated in step 120 in FIG. 2. The user would have to complete the User Authentication Level 2 process in step 140 of FIG. 2 by answering three security challenge questions that have been selected at random by the system and illustratively illustrated in FIG. 2C marked as numeral 10. Once these questions have been successfully answered, the user would click the 'Continue' button indicated as numeral 20 to attempt to access the system. The system would verify the answered provided by the user and if the answers are accurate, the user will be granted access into the system and be presented with the User Web Pages 100a, 100b, 100c as illustratively illustrated in FIG. 2D. Should the user answer any of these security challenge questions unsuccessfully, an error would sound and three new questions would be presented to the user to provide answers to. The user would repeat the process again and after the third unsuccessful attempt to answer the security challenge questions, the system would lock the user account and request that the user contact the Toll-Free Customer center for further assistance in accessing the system as shown in FIG. 7.

FIG. 2D—Category Database: Home

FIG. 2D is a diagram which illustratively depicts User Web Pages 100a that a user would interact with the HOME Category Database 48 by using his/her browser 10a or his/her mobile device 10b after successfully accessing the server system shown in FIG. 1, in accordance with one or more embodiments of the present invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustrated illustratively as numeral 10 Category Databases 48, 50, 52, 54, 56, 58, 60, 62, 64. FIG. 2D would specifically show the graphical user interface showing the HOME Category Database indicated as numeral 48. Components specific to the Category Sub-Databases would be namely 48a Dashboard, 48b My Settings and 48c Messages indicated as numeral 20 in FIG. 2D. 48a Dashboard component displays to the user of the system, current status and overall completion percentage indicated as numeral 25 which is calculated by the system by adding the sum of the unique Note(s) and Document(s), Items Saved or stored by the user of the system, indicated by 30 and dividing by the sum of the Items Needed, indicated as numeral 33. The system will display a Status icon, indicated as numeral 35, respectively "Action Required", if Items Saved indicated as numeral 30 is equal to 0, "In-Progress" if Items Saved, indicated as numeral 30 is less than the value of the respective Items Needed indicated as numeral 33, and "Completed" if Items Saved, indicated as numeral 30 is greater than or equal to the respective Items Needed, indicated as numeral 33. 48b My Settings component would allow the user of the system to edit specific profile information related to their account such as security questions, mailing or billing address, credit card information. 48c Messages (1) would display be important electronic messages generated by the system that require the user of the system immediate attention, for example, the notification of an expired credit card, or the arrival of a new Document(s) in the user's account. The user of the system can click the "Help (Manuals and Videos)" link to view Siftsort.com educational videos and literature, the user may also click the "Invite a Friend" link to send an electronic invitation to a friend, requested that they become a user of the system by completing the New User Process, described in FIG. 2, the user may also click the "Feedback" link to send an electronic message to the Customer Support personnel of the system, the user may also click the "Browser Support" link to view which computer browser or mobile device is supported by the system, respectively 10a and 10b shown in FIG. 1, in accordance with the teachings of this invention; indicated as numeral 12. The user of the system can click the "Troubleshooting" link to view Siftsort.com technical support literature and research questions regarding specific technical issues the user of the system may be experiencing, the user may also click the "Contact Us" link to call or email the Toll-Free Customer Center, 10c shown in FIG. 1, in accordance with the teachings of this invention; the user of the system may click, display and read the "Privacy Policy" Statement, and the user of the system may click, display and read the "Terms of Use" Statement, indicated as numeral 14. The user of the system may also set a reminder or alert by clicking the 'Set a Reminder' link indicated as numeral 40, and create a calendar event in their personal electronic organization program.

FIG. 2D1—Category Sub-Database: My Settings

FIG. 2D1 is a diagram which illustratively depicts User Web Pages 100a that a user would interact with the HOME Category Database 48, specifically Category Sub-Database 48b 'My Settings' by using his/her browser 10a or his/her mobile device 10b after successfully accessing the server system shown in FIG. 1, in accordance with one or more embodiments of the present invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustrated illustratively as numeral 10 Category Databases 48, 50, 52, 54, 56, 58, 60, 62, 64. FIG. 2D1 would specifically show the graphical user interface showing the HOME Category Database indicated as numeral 48 and the Category Sub-Databases would be namely 48a Dashboard, 48b My Settings and 48c Messages indicated as numeral 20 in FIG. 2D. 48b My Settings component displays to the user of the system, a plurality of methods to manage the profile and account in the system.

The user of the system can use the Update Account button 25 to edit personal profile information captured during the New User Process described previously in FIG. 2B3 and illustratively depicted as numeral 27. Once the user of the system has successfully changed any of the profile information to their account, the old profile information is purged from the system and replaced with the latest one.

The user of the system can use the Change Password button 30 to change the Password to their account that was established during the New User Process described previously in FIG. 2B1. Once the user of the system has successfully changed the Password to their account, the old Password is purged from the system and replaced with the latest one.

The user of the system can use the Change Security Questions button 35 to change any of the ten Security Challenge Questions in their account that was established during the New User Process described previously in FIG. 2B2. Once the user of the system has successfully changed any of the ten Security Challenge Questions to their account, the old Security Challenge Questions and their respective answers are purged from the system and replaced with the latest one.

The user of the system can use the Billing Information button 40 to edit personal billing information captured during the New User Process described previously in FIG. 2B5. Once the user of the system has successfully changed any of the billing information to their account, the old billing information is purged from the system and replaced with the latest one.

The user of the system can use the Cancel Account button 45 to purge from the system, their entire account profile and information captured during the New User Process described previously in FIGS. 2B1-2B5 and illustratively illustrated in part as numeral 27. Once the user of the system has successfully cancelled the account, the profile information and any stored or shared Notes or Documents in their account, are purged from the system.

FIG. 2D2—Category Sub-Database: Messages

FIG. 2D2 is a diagram which illustratively depicts User Web Pages 100a that a user would interact with the HOME Category Database 48, specifically Category Sub-Database 48b 'Messages' by using his/her browser 10a or his/her mobile device 10b after successfully accessing the server system shown in FIG. 1, in accordance with one or more embodiments of the present invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustrated illustratively as numeral 10 Category Databases 48, 50, 52, 54, 56, 58, 60, 62, 64. FIG. 2D2 would specifically show the graphical user interface showing the HOME Category Database indicated as numeral 48 and the Category Sub-Databases would be namely 48a Dashboard, 48b My Settings and 48c Messages indicated as numeral 15 in FIG. 2D2. 48c Messages component displays to the user of the system, a plurality of methods to FAX, EMAIL, UPLOAD Documents into the system, and be able to manage New Messages, that may contain Documents, that the system would receive for the user of the system.

The user of the system can use a plurality of methods to send Documents into the system, which include using the Fax Server—22, the Email Server—24 and the FTP Server—26 illustrated in FIG. 1 and illustratively depicted by numerals 20, 22, 24 in FIG. 2D2, respectively.

The server system 18 allows the user to send Documents to the User Web Pages 100a, 100b, 100c shown in FIG. 1, and illustrated illustratively in FIG. 2D2 so that the Documents can be stored in default folders or custom folders Category Sub-Databases 50a, 50b, 50c shown in FIG. 1, and indicated as numeral 30 in FIG. 2E. The user of the system can assign a dedicated unique facsimile number from the system indicated as numeral 20 and use a Facsimile Machine 10d shown in FIG. 1 to access the server system 18 and connect specifically to the Fax Server—22 shown in FIG. 1 to send a new Document to the User Web Pages 100a, 100b, 100c shown in FIG. 1. The new Document will be processed by the Fax Server—22 and routed to the User Web Pages Home 48 Sub-Database Messages indicated as 48c specifically, New Messages, illustratively illustrated as numeral 25, which the user of the system can access from any Category Database or User using the Messages (1) button indicated as numeral 86 in FIG. 2E, or any similarly shown button throughout this Detailed Description of Embodiment. When placed in the New Messages area 25, the user can select a new message by clicking the checkbox indicated as numeral 27 and then choose a plurality of commands to manage the new message as described below.

The server system 18 allows the user to send Documents to the User Web Pages 100a, 100b, 100c shown in FIG. 1, and illustrated illustratively in FIG. 2D2 so that the Documents can be stored in default folders or custom folders Category Sub-Databases 50a, 50b, 50c shown in FIG. 1, and indicated as numeral 30 in FIG. 2E. The user of the system has been assigned a unique email address, specifically User ID chosen by the user of the system, during the New User Process in FIG. 2B1 with the domain of @ siftsort.com, indicated as numeral 22 and use a Browser 10a shown in FIG. 1 to access the server system 18 and connect specifically to the Email Server—24 shown in FIG. 1 to send a new Document to the User Web Pages 100a, 100b, 100c shown in FIG. 1. The new Document will be processed by the Email Server—24 and routed to the User Web Pages Home 48 Sub-Database Messages indicated as 48c specifically, New Messages, illustratively illustrated as numeral 25, which the user of the system can access from any Category Database or User using the Messages (1) button indicated as numeral 86 in FIG. 2E, or any similarly shown button throughout this Detailed Description of Embodiment. When placed in the New Messages area 25, the user can select a new message by clicking the checkbox indicated as numeral 27 and then choose a plurality of commands to manage the new message as described below.

The server system 18 allows the user to send Documents to the User Web Pages 100a, 100b, 100c shown in FIG. 1, and illustrated illustratively in FIG. 2D2 so that the Documents can be stored in default folders or custom folders Category Sub-Databases 50a, 50b, 50c shown in FIG. 1, and indicated as numeral 30 in FIG. 2E. The user of the system choose a file stored on their local computer network and upload it to the system by using the Upload button, indicated as numeral 24 and use a Browser 10a shown in FIG. 1 to access the server system 18 and connect specifically to the FTP Server—26 shown in FIG. 1 to send a new Document to the User Web Pages 100a, 100b, 100c shown in FIG. 1. The new Document will be processed by the FTP Server—26 and routed to the Pending area, illustratively depicted by numeral 50, and that particular area is visible from any User Web Pages 100a, 100b, 100c and any Category Databases, specifically named Life 50, Medical 52, Financial 54 so that the user of the system can move the Document to a Category Sub-Database within each Category Database, as further described in FIG. 4A. The user of the system can delete a Document that resides in the Pending area 50, by selecting the appropriate checkbox for the Document, indicated as numeral 52 and clicking the Delete button indicated as numeral 55 to purge the Document from the system.

Once a new message has arrived into system, using the Fax Server—22 or the Email Server—24 the system will notify the user of the system that a new message has arrived by sending a new communication notice to the personal and business email addresses stored within the account, captured during the New User Process in FIG. 2B3 provided the notification "Email me an Alert" is checked, indicated as numeral 60. The user can disable this notification at anytime by unchecking the alert flag indicated as numeral 60.

Figure 4A:
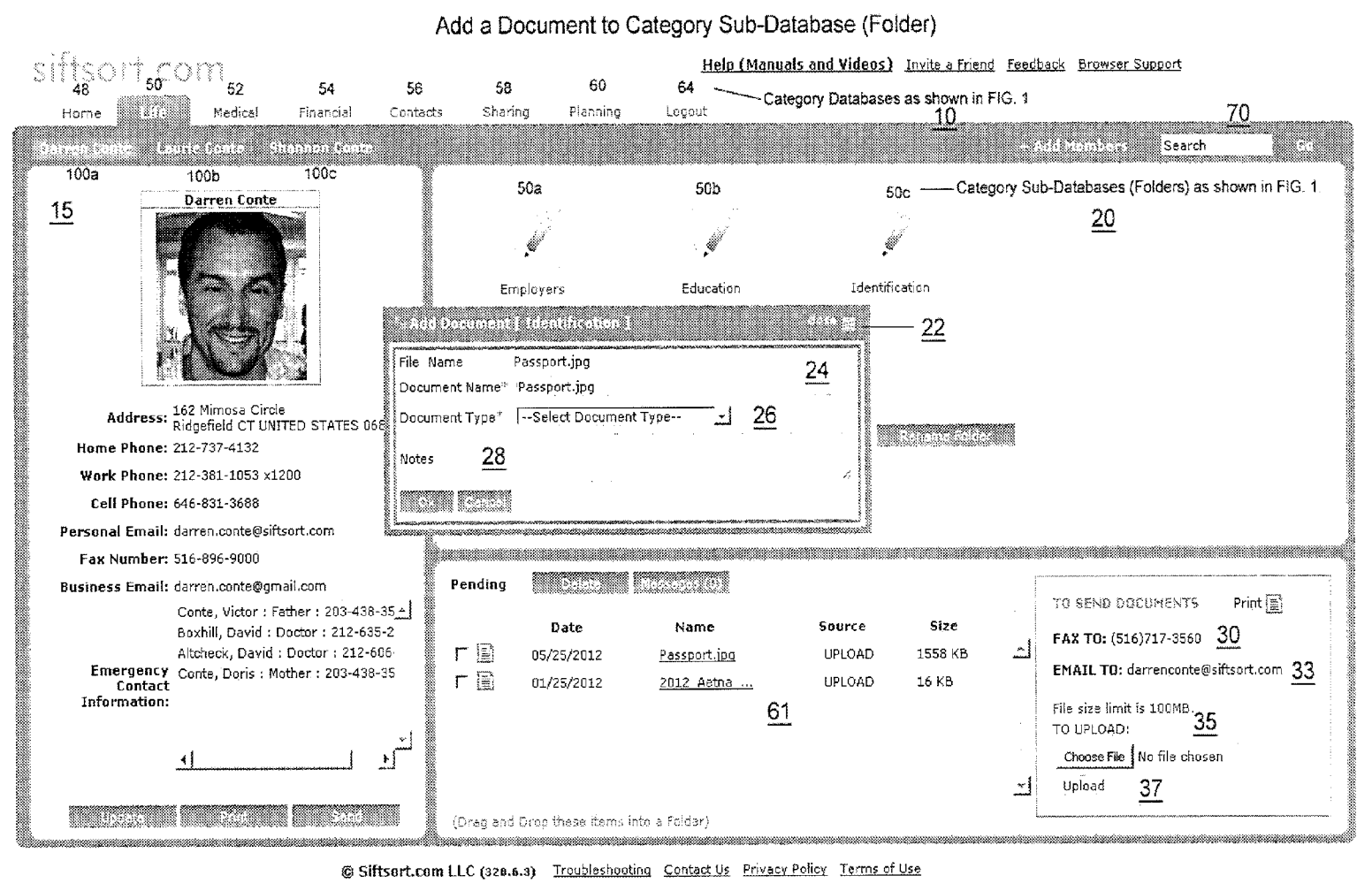

After selecting the new message by clicking the appropriate checkbox 27, the user can choose the Accept button 35, which would move the Document into the Pending indicated as 50 and that particular area is visible from any User Web Pages 100a, 100b, 100c and any Category Databases, specifically named Life 50, Medical 52, Financial 54 so that the user of the system can move the Document to a Category Sub-Database within each Category Database, as further described in FIG. 4A.

After selecting the new message by clicking the appropriate checkbox 27, the user can choose the Delete button 40, which would delete the new message and any Document(s) attached to the new message from the system.

After selecting the new message by clicking the appropriate checkbox 27, the user can choose the Print button 45, which would print the new message and any Document(s) attached to the new message from the system, in its native program and with a local printer device attached to the user's computer.

The system will automatically check for new message at intervals of 5 minutes, but at any time, the user of the system can use the Refresh 30 to refresh the connection to the Fax Server—22 or the Email Server—24 of the system to check for new messages that may have been sent.

FIG. 2E—Category Database: Life

FIG. 2E is a diagram which illustratively depicts User Web Pages 100a that a user would interact with the LIFE Category Database 50 by using his/her browser 10a or his/her mobile device 10b after successfully accessing the server system shown in FIG. 1, in accordance with one or more embodiments of the present invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustrated as numeral 10 Category Databases 48, 50, 52, 54, 56, 58, 60, 62, 64. FIG. 2E would specifically show the graphical user interface showing the LIFE Category Database indicated as numeral 50. Within the Category Database 50 are default folders which cannot be deleted or renamed by the user and are illustrated in FIG. 2E marked as numeral 30 named Category Sub-Database 50a, 50b, 50c. These folders would allow the user to store the specific information pertaining to the subject matter of each folder for that specific Category Database 50 named LIFE. Custom Folders can be created for this Category Database by the user using the Add Custom Folder wizard indicated as numeral 34 illustrated in FIG. 2E. When a custom folder is created the user may customize the name the folder and then proceed to save Notes and Documents within that new custom folder as they would in a default folder. Custom folders may be renamed or deleted by the user of the system by using the Rename Custom Folder wizard indicated as numeral 38 in FIG. 2E or the Delete Custom Folder wizard indicated as numeral 32. An unlimited amount of custom folders can be created by the user within each Category Database allowing the user to store an infinite amount of Notes and Documents in each folder. If the user wants to generate a report to list the contents of each folder after storing information in the system, they would use the Folder Contents marked as numeral 36 in FIG. 2E.

Furthermore, the server system 18 allows the user to add multiple family members into more specific User Web Pages 100*a*, 100*b*, 100*c* shown in FIG. 1, and illustrated in FIG. 2E marked as numeral 20, indicating 100*a*, 100*b*, 100*c*. By using the Add Members feature indicated as numeral 15 in FIG. 2E, the user would be able to add a new family member to the system and then be able to separate stored Notes and Documents specific to that family member in the Category Databases 48, 50, 52, 54, 56, 58, 60 and subsequently in the Category Sub-Databases 50*a*, 50*b*, 50*c* indicated as numeral 30 in FIG. 2E and also shown in FIG. 1. FIG. 2E specifically displays family member user 100*a* namely "Darren Conte" and Category Sub-Databases (Folders) would represent information only stored for that particular family member. If a user wanted to update the profile of this particular family member 100*a*, he/she would use the UPDATE button 42 to edit the details relating to a specific User Web Pages 100*a*, 100*b*, 100*c* shown in FIG. 1, and illustratively depicted in FIG. 2E marked as numeral 20, indicating 100*a*, 100*b*, 100*c* for the selected family member. If the user wanted to print the details of the selected family member (for example 100*a*), then the user would use the PRINT 44 button to print to an external printer a "Fact Sheet" of the family member profile details and picture on one page for a specific User Web Pages 100*a*, 100*b*, 100*c* shown in FIG. 1, and illustratively depicted in FIG. 2E marked as numeral 20, indicating 100*a*, 100*b*, 100*c* for the selected family member. If the user wanted to send the details of the selected family member (for example 100*a*), then the user would use the SEND 46 button to send an electronic communication to a recipient a "Fact Sheet" of the family member profile details and picture on one page for a specific User Web Pages 100*a*, 100*b*, 100*c* shown in FIG. 1, and illustratively depicted in FIG. 2E marked as numeral 20, indicating 100*a*, 100*b*, 100*c* for the selected family member. This function would be available for all family members 100*a*-*c* and any additional family members that are subsequently added to the system by the user using the Add Members button indicated as numeral 20.

Furthermore, the server system 18 allows the user to send Documents to the User Web Pages 100*a*, 100*b*, 100*c* shown in FIG. 1, and illustratively depicted in FIG. 2E so that the Documents can be stored in default folders or custom folders Category Sub-Databases 50*a*, 50*b*, 50*c* shown in FIG. 1, and indicated as numeral 30. The user of the system can assign a dedicated unique facsimile number from the system indicated as numeral 70 and use a Facsimile Machine 10*d* shown in FIG. 1 to access the server system 18 and connect specifically to the Fax Server—22 shown in FIG. 1 to send a new Document to the User Web Pages 100*a*, 100*b*, 100*c* shown in FIG. 1. The new Document will be processed by the Fax Server—22 and routed to the User Web Pages Home 48 Sub-Database Messages indicated as 48*c* shown in FIG. 2D, which the user of the system can access using the Messages (1) button indicated as numeral 86 in FIG. 2E.

Furthermore, the server system 18 allows the user to send Documents to the User Web Pages 100*a*, 100*b*, 100*c* shown in FIG. 1, and illustratively depicted in FIG. 2E so that the Documents can be stored in default folders or custom folders Category Sub-Databases 50*a*, 50*b*, 50*c* shown in FIG. 1, and indicated as numeral 30. The user of the system is automatically assigned a unique email address which is derived by the system from the Login ID indicated as numeral 20 in FIG. 2B1, then adding the "@siftsort.com" extension to the Login ID, indicated as numeral 73 so that the user of the system can connect to the Email Server—24 shown in FIG. 1 to send a new Document(s) to the User Web Pages 100*a*, 100*b*, 100*c* shown in FIG. 1. The new Document will be processed by the Email Server—24 and routed to the User Web Pages Home 48 Sub-Database Messages indicated as 48*c* shown in FIG. 2D, which the user of the system can access using the Messages (1) button indicated as numeral 86 in FIG. 2E.

Furthermore, the server system 18 allows the user to send Documents to the User Web Pages 100*a*, 100*b*, 100*c* shown in FIG. 1, and illustratively depicted in FIG. 2E so that the Documents can be stored in default folders or custom folders Category Sub-Databases 50*a*, 50*b*, 50*c* shown in FIG. 1, and indicated as numeral 30. The user can upload a Document from a computer to the system by clicking the Choose File button, indicated as numeral 75 browse to a particular Document on their local computer, and select that Document, then click the Upload button, indicated as numeral 75 so that the user of the system can connect to the FTP Server—26 shown in FIG. 1 to transfer a new Document(s) to the User Web Pages 100*a*, 100*b*, 100*c* shown in FIG. 1. The new Document will be processed by the FTP Server—26 and routed to the User Web Pages specifically to the Category Sub-Database namely Pending indicated as 62 shown in FIG. 1, which the user of the system can illustratively see the new Document in the Category Sub-Database Pending area indicated as numeral 80 in FIG. 2E. The user of the system may open any Document in its native program (such as Microsoft Word) by clicking the Document link created by the system, indicated as numeral 80, in which the system will automatically launch the native program from the user local computer to view the Document.

Furthermore, the server system 18 allows the user to Delete any new Document by selecting the Document check box indicated as numeral 82 in the Category Sub-Database Pending indicated as numeral 80 and proceed to Delete the Document by clicking the Delete button indicated as numeral 84 in which the system will permanently purge the Document from the Category Sub-Database Pending indicated as numeral 80.

Furthermore, the server system 18 allows the user to Move any new Document(s) to a specific Category Sub-Database (Folder) 30 by selecting the Document(s) check box indicated as numeral 82 in the Category Sub-Database Pending indicated as numeral 80 and proceed to Move the Document(s) by clicking the Move To . . . button indicated as numeral 88 in which the system will prompt the user of the system to select a target Category Sub-Database (Folders) 50*a*-50*c* from a list which derives from the current existing Category Sub-Databases (Folders) 50*a*-50*c* for the Category Database 'LIFE' indicated as numeral 50. Once the user of the system has selected the desired target Category Sub-Database (Folder) 50*a*-50*c*, the system would Move the selected Document(s) from the Category Sub-Database Pending 62 to the selected target Category Sub-Category (Folder) 50*a*-50*c*.

Furthermore, the server system 18 can print the unique methods to add a new Document to the User Web Pages 100*a*, 100*b*, 100*c* shown in FIG. 1 by clicking the PRINT button indicated as numeral 78, the system will print these unique methods by sending the document to the user's printer attached to their local computer. If a user of the system wanted to search the Category Sub-Databases 50*a*, 50*b*, 50*c* for the Category Databases 50, 52, 54, 56 for specific content or text that matched a user provided query, the user could use the SEARCH tool 12 to search and find specific content based off of user provided queries. The user would enter in unique context in the Search Tool and click the GO button 12 to execute the search. The system would return a listing of content that matched the query entered by the user in the Search Tool only for the specific User Web Pages 100*a*, 100*b*, 100*c* selected, in this FIG. 2E, User Web Pages 100*a* is selected, so the Search Tool would only query and return content stored in the system for User Web Pages 100*a* and not 100*b* or 100*c*.

Figure 2F:
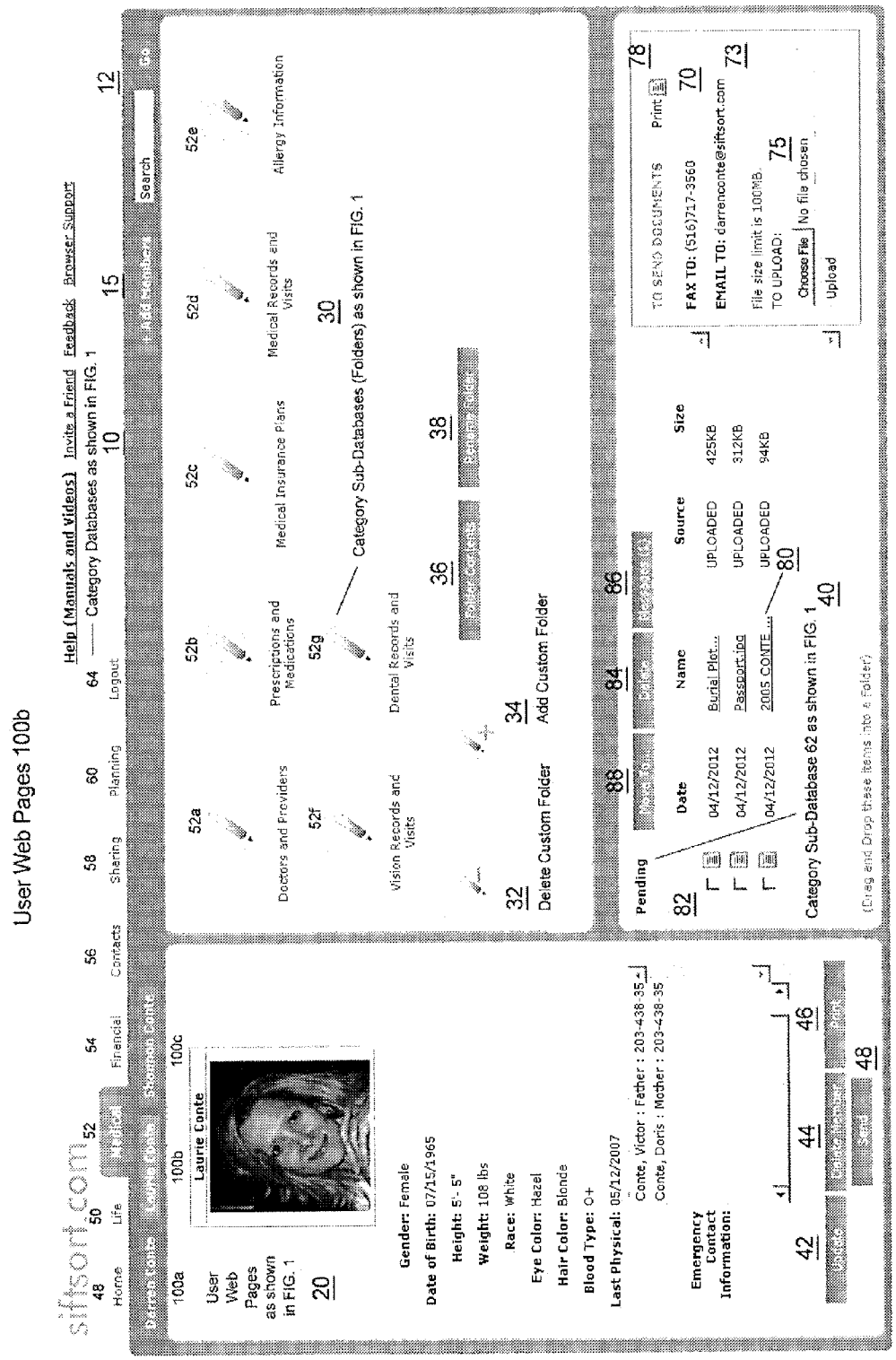
FIG. 2F is a diagram which illustratively depicts a users medical category database webpage of the server system shown in FIG. 1 in accordance with one or more embodiments of the present invention.

FIG. 2F—Category Database: Medical

FIG. 2F is a diagram which illustratively depicts User Web Pages 100*b* that a user would interact with the MEDICAL Category Database 52 by using his/her browser 10*a* or his/her mobile device 10*b* after successfully accessing the server system shown in FIG. 1, in accordance with one or more embodiments of the present invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustratively depicted as numeral 10 Category Databases 48, 50, 52, 54, 56, 58, 60, 62, 64. FIG. 2F would specifically show the graphical user interface showing the MEDICAL Category Database indicated as numeral 52. Within the Category Database 52 are default folders which cannot be deleted or renamed by the user and are illustratively depicted in FIG. 2F marked as numeral 30 named Category Sub-Database 52*a*, 52*b*, 52*c*, 52*d*, 52*e*, 52*f* and 52*g*. These folders would allow the user to store the specific information pertaining to the subject matter of each folder for that specific Category Database 52 named MEDICAL. Custom Folders can be created for this Category Database by the user using the Add Custom Folder wizard illustratively depicted in FIG. 2F marked as numeral 34. When a custom folder is created the user may customize the name the folder and then proceed to save pertinent information within that new folder as they would in a default folder. Custom folders may be renamed or deleted by the user of the system by using the Rename Custom Folder wizard marked as numeral 38 in FIG. 2F or the Delete Custom Folder wizard marked as numeral 32 in FIG. 2F. An unlimited amount of new folders can be created by the user within each Category Database allowing the user to store an infinite amount of information in each folder. If the user wants to generate a report to list the contents of each folder after storing information in the system, they would use the Folder Contents marked as numeral 36 in FIG. 2F.

Furthermore, the server system 18 allows the user to define multiple family members into more specific User Web Pages 100*a*, 100*b*, 100*c* shown in FIG. 1, and illustratively depicted in FIG. 2F marked as numeral 20, indicating 100*a*, 100*b*, 100*c*. By using the Add Members feature indicated as numeral 15 in FIG. 2F, the user would be able to add a new family member to the system and then be able to separate stored Notes and Documents specific to that family member in the Category Databases 48, 50, 52, 54, 56, 58, 60 and subsequently in the Category Sub-Databases 52*a*, 52*b*, 52*c*, 52*d*, 52*e*, 52*f* and 52*g* shown in FIG. 1. FIG. 2F specifically displays user 100*b* namely "Laurie Conte" and Category Sub-Databases (Folders) would represent information only stored for that particular family member. If a user wanted to update the profile of this particular family member 100*b*, he/she would use the UPDATE button 42 to edit the details relating to a specific Category Database 50, 52, 54, 56 for the selected family member. If the user wanted to delete a selected family member entirely, he/she would use the DELETE 44 button and completely remove the selected family member and the entire store Notes and Documents across all Category Database 50, 52, 54, 56, 58 respective to the selected family member 100*b*. This delete function is only available to non-primary family members (all family member added in addition to 100*a*) since the system requires at least one primary member be part of the system. If the user wanted to print the details of the selected family member (for example 100*b*), then the user would use the PRINT 46 button to print a "Fact Sheet" of the family member profile details and picture on one page for a specific Category Database 50, 52, 54, 56. If the user wanted to send the details of the selected family member (for example 100*b*), to a recipient in electronic format, then the user would use the SEND 48 button to send and electronic email of a "Fact Sheet" of the family member profile details and picture on one page for a specific Category Database 50, 52, 54, 56. This function would be available for all family members 100*a*, 100*b*, 100*c* and any additional family members that are subsequently added to the system by the user.

Furthermore, the server system 18 allows the user to send Documents to the User Web Pages 100*a*, 100*b*, 100*c* shown in FIG. 1, and illustratively depicted in FIG. 2F so that the Documents can be stored in default folders or custom folders Category Sub-Databases 50*a*, 50*b*, 50*c* shown in FIG. 1, and indicated as numeral 30. The user of the system can assign a dedicated unique facsimile number from the system indicated as numeral 70 and use a Facsimile Machine 10*d* shown in FIG. 1 to access the server system 18 and connect specifically to the Fax Server—22 shown in FIG. 1 to send a new Document to the User Web Pages 100*a*, 100*b*, 100*c* shown in FIG. 1. The new Document will be processed by the Fax Server—22 and routed to the User Web Pages Home 48 Sub-Database Messages indicated as 48*c* shown in FIG. 2D, which the user of the system can access using the Messages (1) button indicated as numeral 86 in FIG. 2F.

Furthermore, the server system 18 allows the user to send Documents to the User Web Pages 100*a*, 100*b*, 100*c* shown in FIG. 1, and illustratively depicted in FIG. 2F so that the Documents can be stored in default folders or custom folders Category Sub-Databases 50*a*, 50*b*, 50*c* shown in FIG. 1, and indicated as numeral 30. The user of the system is automatically assigned a unique email address which is derived by the system from the Login ID indicated as numeral 20 in FIG. 2B1, then adding the "@siftsort.com" extension to the Login ID, indicated as numeral 73 so that the user of the system can connect to the Email Server—24 shown in FIG. 1 to send a new Document(s) to the User Web Pages 100*a*, 100*b*, 100*c* shown in FIG. 1. The new Document will be processed by the Email Server—24 and routed to the User Web Pages Home 48 Sub-Database Messages indicated as 48*c* shown in FIG. 2D, which the user of the system can access using the Messages (1) button indicated as numeral 86 in FIG. 2F.

Furthermore, the server system 18 allows the user to send Documents to the User Web Pages 100*a*, 100*b*, 100*c* shown in FIG. 1, and illustratively depicted in FIG. 2F so that the Documents can be stored in default folders or custom folders Category Sub-Databases 50*a*, 50*b*, 50*c* shown in FIG. 1, and indicated as numeral 30. The user can upload a Document from a computer to the system by clicking the Choose File button, indicated as numeral 75 browse to a particular Document on their local computer, and select that Document, then click the Upload button, indicated as numeral 75 so that the user of the system can connect to the FTP Server—26 shown in FIG. 1 to transfer a new Document(s) to the User Web Pages 100*a*, 100*b*, 100*c* shown in FIG. 1. The new Document will be processed by the FTP Server—26 and routed to the User Web Pages specifically to the Category Sub-Database namely Pending indicated as 62 shown in FIG. 1, which the user of the system can illustratively see the new Document in the Category Sub-Database Pending area indicated as numeral 80 in FIG. 2F. The user of the system may open any Document in its native program (such as Microsoft Word) by clicking the Document link created by the system, indicated as numeral 80, in which the system will automatically launch the native program from the user local computer to view the Document.

Furthermore, the server system 18 allows the user to Delete any new Document by selecting the Document check box indicated as numeral 82 in the Category Sub-Database Pending indicated as numeral 80 and proceed to Delete the Document by clicking the Delete button indicated as numeral 84 in which the system will permanently purge the Document from the Category Sub-Database Pending indicated as numeral 80.

Furthermore, the server system 18 allows the user to Move any new Document(s) to a specific Category Sub-Database (Folder) 30 by selecting the Document(s) check box indicated as numeral 82 in the Category Sub-Database Pending indicated as numeral 80 and proceed to Move the Document(s) by clicking the Move To . . . button indicated as numeral 88 in which the system will prompt the user of the system to select a target Category Sub-Database (Folders) 50a-50c from a list which derives from the current existing Category Sub-Databases (Folders) 50a-50c for the Category Database 'LIFE' indicated as numeral 50. Once the user of the system has selected the desired target Category Sub-Database (Folder) 50a-50c, the system would Move the selected Document(s) from the Category Sub-Database Pending 62 to the selected target Category Sub-Category (Folder) 50a-50c.

Furthermore, the server system 18 can print the unique methods to add a new Document to the User Web Pages 100a, 100b, 100c shown in FIG. 1 by clicking the PRINT button indicated as numeral 78, the system will print these unique methods by sending the document to the user's printer attached to their local computer. If a user of the system wanted to search the Category Sub-Databases 52a, 52b, 52c, 52d, 52e, 52f, 52g for the Category Databases 50, 52, 54, 56 for specific content or text that matched a user provided query, the user could use the SEARCH tool 12 to search and find specific content based off of user provided queries. The user would enter in unique context in the Search Tool and click the GO button 12 to execute the search. The system would return a listing of content that matched the query entered by the user in the Search Tool only for the specific User Web Pages 100a, 100b, 100c selected, in this FIG. 2F, User Web Pages 100b is selected, so the Search Tool would only query and return content stored in the system for User Web Pages 100b and not 100a or 100c.

Figure 2G:
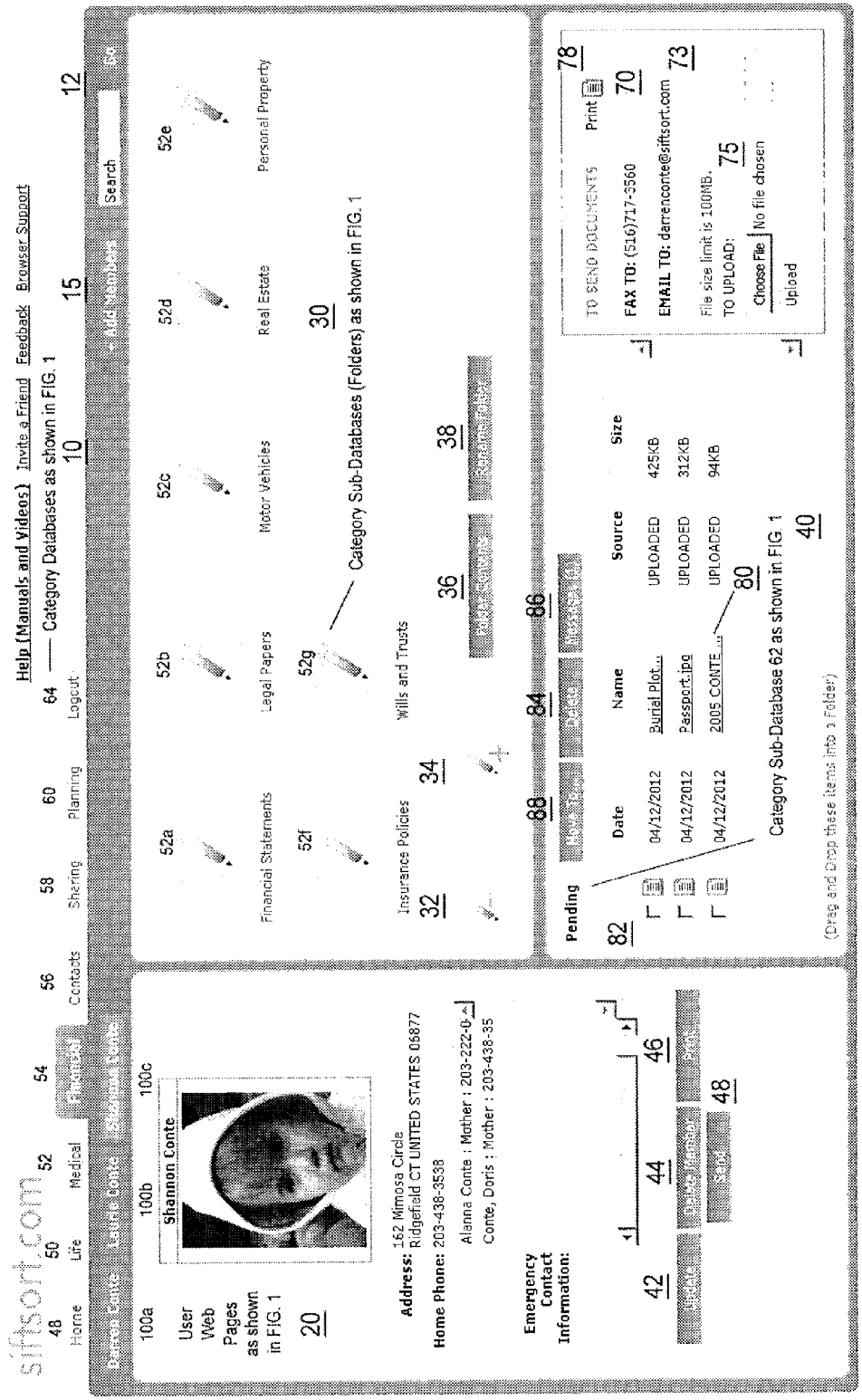
FIG. 2G is a diagram which illustratively depicts a user's financial category database webpage of the server system shown in FIG. 1 in accordance with one or more embodiments of the present invention.

FIG. 2G—Category Database: Financial

FIG. 2G is a diagram which illustratively depicts User Web Pages 100c that a user would interact with the FINANCIAL Category Database 54 by using his/her browser 10a or his/her mobile device 10b after successfully accessing the server system shown in FIG. 1, in accordance with one or more embodiments of the present invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustrated illustratively as numeral 10 Category Databases 48, 50, 52, 54, 56, 58, 60, 62, 64. FIG. 2G would specifically show the graphical user interface showing the FINANCIAL Category Database indicated as numeral 54. Within the Category Database 54 are default folders which cannot be deleted or renamed by the user and are illustratively depicted in FIG. 2G marked as numeral 30 named Category Sub-Database 54a, 54b, 54c, 54d, 54e, 54f and 54g. These folders would allow the user to store the specific information pertaining to the subject matter of each folder for that specific Category Database 54 named FINANCIAL. Custom Folders can be created for this Category Database by the user using the Add Custom Folder wizard illustratively depicted in FIG. 2G marked as numeral 34. When a custom folder is created the user may customize the name the folder and then proceed to save pertinent information within that new folder as they would in a default folder. Custom folders may be renamed or deleted by the user of the system by using the Rename Custom Folder wizard marked as numeral 38 in FIG. 2G or the Delete Custom Folder wizard marked as numeral 32 in FIG. 2G. An unlimited amount of new folders can be created by the user within each Category Database allowing the user to store an infinite amount of information in each folder. If the user wants to generate a report to list the contents of each folder after storing information in the system, they would use the Folder Contents marked as numeral 36 in FIG. 2G.

Furthermore, the server system 18 allows the user to define multiple family members into more specific User Web Pages 100a, 100b, 100c shown in FIG. 1, and illustratively depicted in FIG. 2G marked as numeral 20, indicating 100a, 100b, and 100c. By using the Add Members feature indicated as numeral 15 in FIG. 2G, the user would be able to add a new family member to the system and then be able to separate stored Notes and Documents specific to that family member in the Category Databases 48, 50, 52, 54, 56, 58, 60 and subsequently in the Category Sub-Databases 54a, 54b, 54c, 54d, 54e, 54f and 54g shown in FIG. 1. FIG. 2G specifically displays user 100c namely "Shannon Conte" and Category Sub-Databases (Folders) would represent information only stored for that particular family member. If a user wanted to update the profile of this particular family member 100c, he/she would use the UPDATE button 42 to edit the details relating to a specific Category Database 50, 52, 54, 56 for the selected family member. If the user wanted to delete a selected family member entirely, he/she would use the DELETE 44 button and completely remove the selected family member and the entire store Notes and Documents across all Category Database 50, 52, 54, 56, 58 respective to the selected family member 100c. This delete function is only available to non-primary family members (all family member added in addition to 100a) since the system requires at least one primary member be part of the system. If the user wanted to print the details of the selected family member (for example 100c), then the user would use the PRINT 46 button to print a "Fact Sheet" of the family member profile details and picture on one page for a specific Category Database 50, 52, 54, 56. If the user wanted to send the details of the selected family member (for example 100c), to a recipient in electronic format, then the user would use the SEND 48 button to send and electronic email of a "Fact Sheet" of the family member profile details and picture on one page for a specific Category Database 50, 52, 54, 56. This function would be available for all family members 100a, 100b, 100c and any additional family members that are subsequently added to the system by the user.

Furthermore, the server system 18 allows the user to send Documents to the User Web Pages 100a, 100b, 100c shown in FIG. 1, and illustratively depicted in FIG. 2G so that the Documents can be stored in default folders or custom folders Category Sub-Databases 50a, 50b, 50c shown in FIG. 1, and indicated as numeral 30. The user of the system can assign a dedicated unique facsimile number from the system indicated as numeral 70 and use a Facsimile Machine 10d shown in FIG. 1 to access the server system 18 and connect specifically to the Fax Server—22 shown in FIG. 1 to send a new Document to the User Web Pages 100a, 100b, 100c shown in FIG.

1. The new Document will be processed by the Fax Server—22 and routed to the User Web Pages Home 48 Sub-Database Messages indicated as 48c shown in FIG. 2D, which the user of the system can access using the Messages (1) button indicated as numeral 86 in FIG. 2G.

Furthermore, the server system 18 allows the user to send Documents to the User Web Pages 100a, 100b, 100c shown in FIG. 1, and illustratively depicted in FIG. 2G so that the Documents can be stored in default folders or custom folders Category Sub-Databases 50a, 50b, 50c shown in FIG. 1, and indicated as numeral 30. The user of the system is automatically assigned a unique email address which is derived by the system from the Login ID indicated as numeral 20 in FIG. 2B1, then adding the "@siftsort.com" extension to the Login ID, indicated as numeral 73 so that the user of the system can connect to the Email Server—24 shown in FIG. 1 to send a new Document(s) to the User Web Pages 100a, 100b, 100c shown in FIG. 1. The new Document will be processed by the Email Server—24 and routed to the User Web Pages Home 48 Sub-Database Messages indicated as 48c shown in FIG. 2D, which the user of the system can access using the Messages (1) button indicated as numeral 86 in FIG. 2G.

Furthermore, the server system 18 allows the user to send Documents to the User Web Pages 100a, 100b, 100c shown in FIG. 1, and illustratively depicted in FIG. 2G so that the Documents can be stored in default folders or custom folders Category Sub-Databases 50a, 50b, 50c shown in FIG. 1, and indicated as numeral 30. The user can upload a Document from a computer to the system by clicking the Choose File button, indicated as numeral 75 browse to a particular Document on their local computer, and select that Document, then click the Upload button, indicated as numeral 75 so that the user of the system can connect to the FTP Server—26 shown in FIG. 1 to transfer a new Document(s) to the User Web Pages 100a, 100b, 100c shown in FIG. 1. The new Document will be processed by the FTP Server—26 and routed to the User Web Pages specifically to the Category Sub-Database namely Pending indicated as 62 shown in FIG. 1, which the user of the system can illustratively see the new Document in the Category Sub-Database Pending area indicated as numeral 80 in FIG. 2G. The user of the system may open any Document in its native program (such as Microsoft Word) by clicking the Document link created by the system, indicated as numeral 80, in which the system will automatically launch the native program from the user local computer to view the Document.

Furthermore, the server system 18 provides a tool to upload, capture and freeze any new Document into a static state, ensuring that the Document is final in nature and cannot be amended or altered in anyway to notarize the Document. The Document is then securely transmitted by the server system 18 to a third-party platform where it will be ingested, recorded, serialized with a unique hash string and stamped with a watermark seal. The Document is then returned to the server system 18 and automatically parsed into the user's account.

Furthermore, the server system 18 allows the user to Delete any new Document by selecting the Document check box indicated as numeral 82 in the Category Sub-Database Pending indicated as numeral 80 and proceed to Delete the Document by clicking the Delete button indicated as numeral 84 in which the system will permanently purge the Document from the Category Sub-Database Pending indicated as numeral 80.

Furthermore, the server system 18 allows the user to Move any new Document(s) to a specific Category Sub-Database (Folder) 30 by selecting the Document(s) check box indicated as numeral 82 in the Category Sub-Database Pending indicated as numeral 80 and proceed to Move the Document(s) by clicking the Move To . . . button indicated as numeral 88 in which the system will prompt the user of the system to select a target Category Sub-Database (Folders) 50a-50c from a list which derives from the current existing Category Sub-Databases (Folders) 50a-50c for the Category Database 'LIFE' indicated as numeral 50. Once the user of the system has selected the desired target Category Sub-Database (Folder) 50a-50c, the system would Move the selected Document(s) from the Category Sub-Database Pending 62 to the selected target Category Sub-Category (Folder) 50a-50c.

Furthermore, the server system 18 can print the unique methods to add a new Document to the User Web Pages 100a, 100b, 100c shown in FIG. 1 by clicking the PRINT button indicated as numeral 78, the system will print these unique methods by sending the document to the user's printer attached to their local computer. If a user of the system wanted to search the Category Sub-Databases 54a, 54b, 54c, 54d, 54e, 54f, 54g for the Category Databases 50, 52, 54, 56 for specific content or text that matched a user provided query, the user could use the SEARCH tool 12 to search and find specific content based off of user provided queries. The user would enter in unique context in the Search Tool and click the GO button 12 to execute the search. The system would return a listing of content that matched the query entered by the user in the Search Tool only for the specific User Web Pages 100a, 100b, 100c selected, in this FIG. 2G, User Web Pages 100c is selected, so the Search Tool would only query and return content stored in the system for User Web Pages 100c and not 100a or 100b.

Figure 2H:
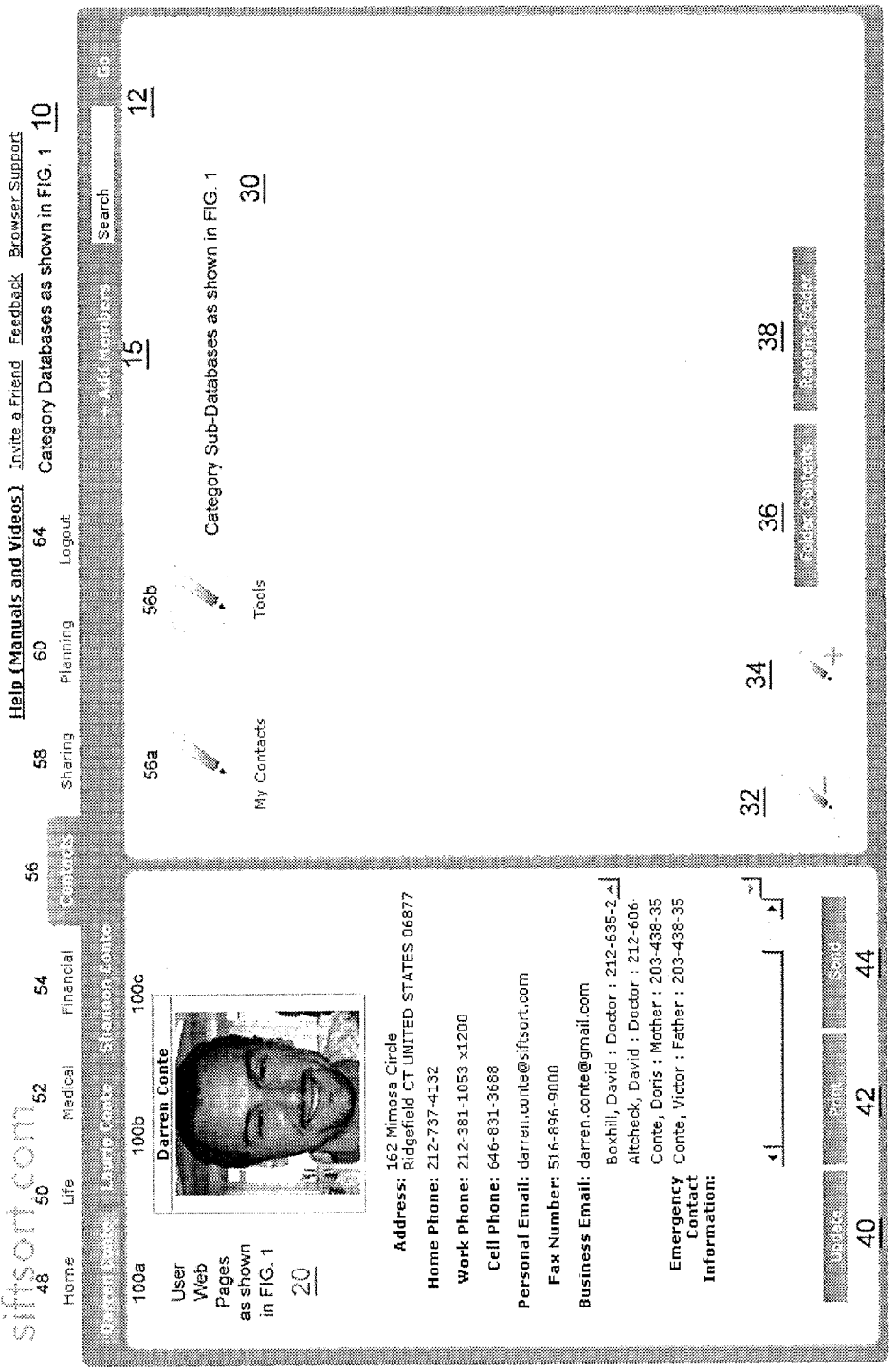
FIG. 2H is a diagram which illustratively depicts a user's contacts category database webpage of the server system shown in FIG. 1 in accordance with one or more embodiments of the present invention.
Figure 21:
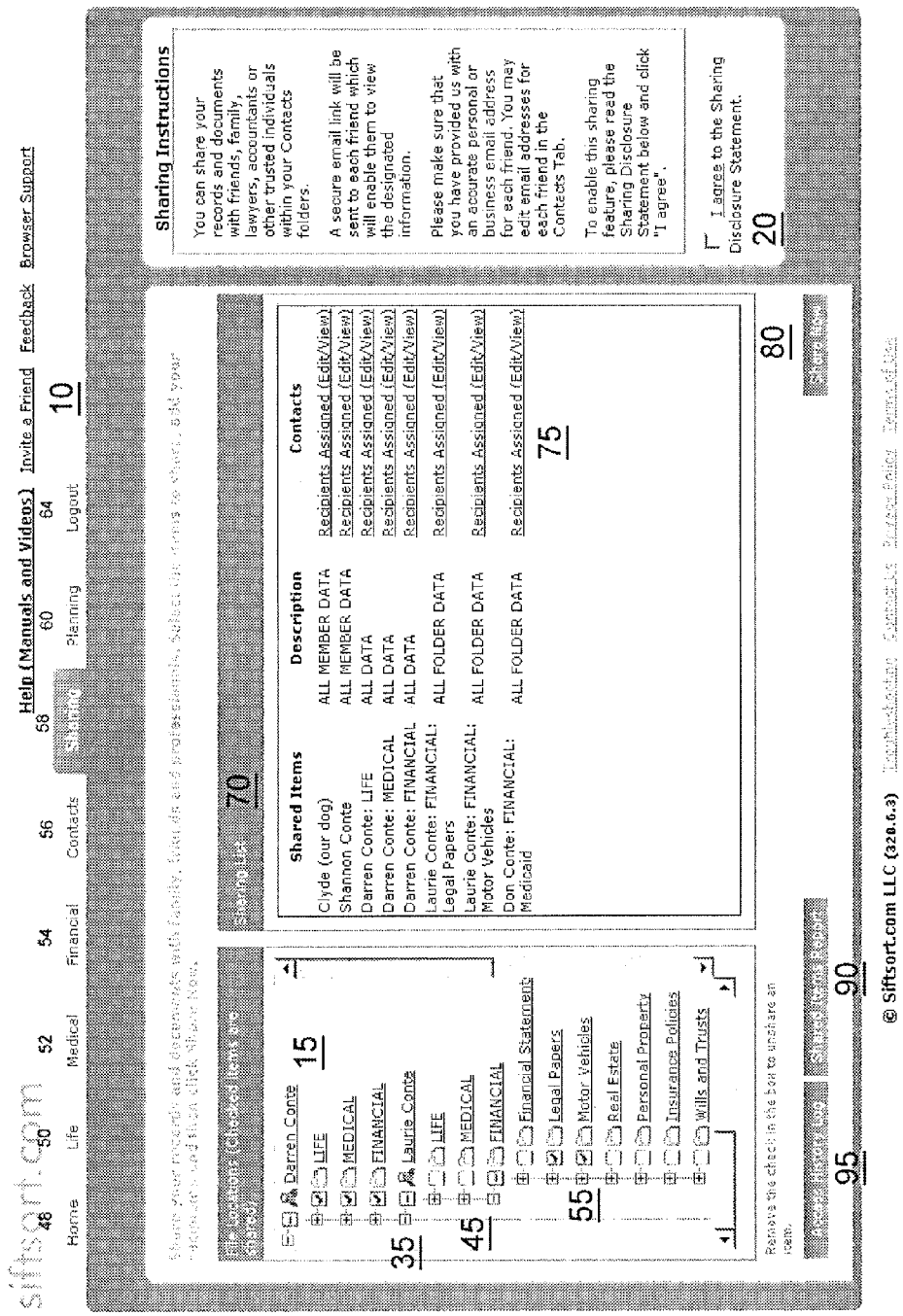

FIG. 2H—Category Database: Contacts

FIG. 2H is a diagram which illustratively depicts User Web Pages 100a that a user would interact with the CONTACTS Category Database 56 by using his/her browser 10a or his/her mobile device 10b after successfully accessing the server system shown in FIG. 1, in accordance with the teachings of this invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustratively depicted as numeral 10 Category Databases 48, 50, 52, 54, 56, 58, 60, 62, 64. FIG. 2G would specifically show the graphical user interface showing the CONTACTS Category Database indicated as numeral 56. Within the Category Database 56 are default folders which cannot be deleted or renamed by the user and are illustratively depicted in FIG. 2H marked as numeral 30 named Category Sub-Database 56a, 56b. These folders would allow the user to store the specific information pertaining to the subject matter of each folder for that specific Category Database 56 named CONTACTS. Custom Folders can be created for this Category Database by the user using the Add Custom Folder wizard illustratively depicted in FIG. 2H marked as numeral 34. When a custom folder is created the user may customize the name the folder and then proceed to save pertinent information within that new folder as they would in a default folder. Custom folders may be renamed or deleted by the user of the system by using the Rename Custom Folder wizard marked as numeral 38 in FIG. 2H or the Delete Custom Folder wizard marked as numeral 32 in FIG. 2H. An unlimited amount of new folders can be created by the user within each Category Database allowing the user to store an infinite amount of information in each folder. If the user wants to generate a report to list the contents of each folder after storing information in the system, they would use the Folder Contents marked as numeral 36 in FIG. 2H.

Furthermore, the server system 18 allows the user to define multiple family members into more specific User Web Pages 100a, 100b, 100c shown in FIG. 1, and illustratively depicted in FIG. 2H marked as numeral 20, indicating 100a, 100b, and 100c. By using the Add Members feature indicated as numeral 15 in FIG. 2H, the user would be able to add a new family member to the system and then be able to separate stored Notes and Documents specific to that family member in the Category Databases 48, 50, 52, 54, 56, 58, 60 and subsequently in the Category Sub-Databases 56a, 56b shown in FIG. 1. FIG. 2H specifically displays user 100a namely "Darren Conte" and Category Sub-Databases (Folders) would represent information only stored for that particular family member. If a user wanted to update the profile of this particular family member 100a, he/she would use the UPDATE button 40 to edit the details relating to a specific Category Database 50, 52, 54, 56 for the selected family member. If the user wanted to print the details of the selected family member (for example 100a), then the user would use the PRINT 42 button to print a "Fact Sheet" of the family member profile details and picture on one page for a specific Category Database 50, 52, 54, 56. If the user wanted to send the details of the selected family member (for example 100a), to a recipient in electronic format, then the user would use the SEND 44 button to send and electronic email of a "Fact Sheet" of the family member profile details and picture on one page for a specific Category Database 50, 52, 54, 56. This function would be available for all family members 100a, 100b, 100c and any additional family members that are subsequently added to the system by the user.

If a user of the system wanted to search the Category Sub-Databases 56a, 56b or the Category Databases 50, 52, 54, 56 for specific content or text that matched a user provided query, the user could use the SEARCH tool 12 to search and find specific content based off of user provided queries. The user would enter in unique context in the Search Tool and click the GO button 12 to execute the search. The system would return a listing of content that matched the query entered by the user in the Search Tool only for the specific User Web Pages 100a, 100b, 100c selected, in this FIG. 2H, User Web Pages 100a is selected, so the Search Tool would only query and return content stored in the system for User Web Pages 100a and not 100b or 100c.

FIG. 2I—Category Database: Sharing

FIG. 2I is a diagram which illustratively depicts User Web Pages 100a-c that a user would interact with the SHARING Category Database 58 by using his/her browser 10a or his/her mobile device 10b after successfully accessing the server system shown in FIG. 1, in accordance with one or more embodiments of the present invention.

The server system 18 in FIG. 1 offers a user the ability to store personal and family information within a selection of Category Databases, specifically named Home 48, Life 50, Medical 52, Financial 54, Contacts 56, Sharing 58, Planning 60, Pending 62 and Logout 64 in FIG. 1 and illustratively depicts as numeral 10 Category Databases 48, 50, 52, 54, 56, 58, 60, 62, 64. FIG. 2I would specifically show the graphical user interface showing the SHARING Category Database indicated as numeral 58.

Within the Category Database 58 are listed all the default folders and custom folders for all which by the User Web Pages 100a, 100b, 100c and are illustratively depicted in FIG. 2H marked as numeral 15 named Category Sub-Databases 50a-c, 52a-g, 54a-g, 56a-b.

Sharing is a unique hierarchy component of the system which allows a user of the system to share particular Note(s) or Document(s) stored in a particular Category Sub-Databases 50a-c, 52a-g, 54a-g, 56a-b, the entire Category Sub-Databases 50a-c, 52a-g, 54a-g, 56a-b or the entire User Web Pages 100a, 100b, 100c. These sharing tools and functions are further described below in FIGS. 6.0-6.1 and FIGS. 6A-6C.

As previously described, a user can add an unlimited number of Notes and Documents into the server system 18 and securely store the Notes and Documents into Category Sub-Databases or Folders 50a-c, 52a-g, 54a-g, 56a-c sorted by User Web Pages 100a, 100b, 100c. The system allows the user to share the Notes and Documents using the advanced sharing feature. After successfully accessing the system, the user would use the Category Database 58 known as 'SHARING' 10. To enable the sharing feature, the user would have to "Agree" to the Access Permission Disclosure Agreement 20 which would activate the sharing capabilities for the users account. Once the sharing capabilities have been activated, the user would then be able to select a particular family member 35, and proceed to further select Category Databases 45 for the previously selected family member. Once a Category Database has been selected, the user would select a Category Sub-Database or folder 55 and ultimately a particular note or document stored within these folders. By selecting a specific folder, or note or document 55, they system would temporarily place these selected records and Documents in the Sharing Queue 70. The user can add as many Notes and Documents to the Sharing Queue. The Sharing Queue keeps track of the exact location of each selected note and document. When the user has finished selecting Notes and Documents, the user must then assign recipients to each selected Note and document using the Recipients Assigned tool 75. The Recipients Assigned tool is similar to the Assign Contact to a Note procedure explained in FIG. 3B, in which it would allow the user to choose from all the stored Contact records in the Category Database 56 known as 'Contacts' and tag a particular email address of each selected contact as a recipient of the particular shared note and document placed in the Sharing Queue. If a valid email address does not exist, the Recipients Assigned tool would sound an alarm, forcing the user to enter in a valid email address. Once all of the sharing recipients have been assigned to the appropriate Category Databases, the user would then have to Send Now 80 a sharing email link. This process allows the user to review the contact names who have been assigned sharing privileges before the sharing email link is sent to the intended recipients, in Recipients Assigned tool 75. After the encrypted email has been sent the user may also generate a report 90 showing the list of who has been granted sharing privileges to the user account. The system would automatically begin to generate an Access History Log 95 which would record current session activity and securely store this information within the user account for future reference. The Access History Log 95 would record information such as date, time, IP Address and Internet Service Provider, when the recipients access the shared Notes and Documents, further described in FIG. 6.1 below.

Figure 2J:
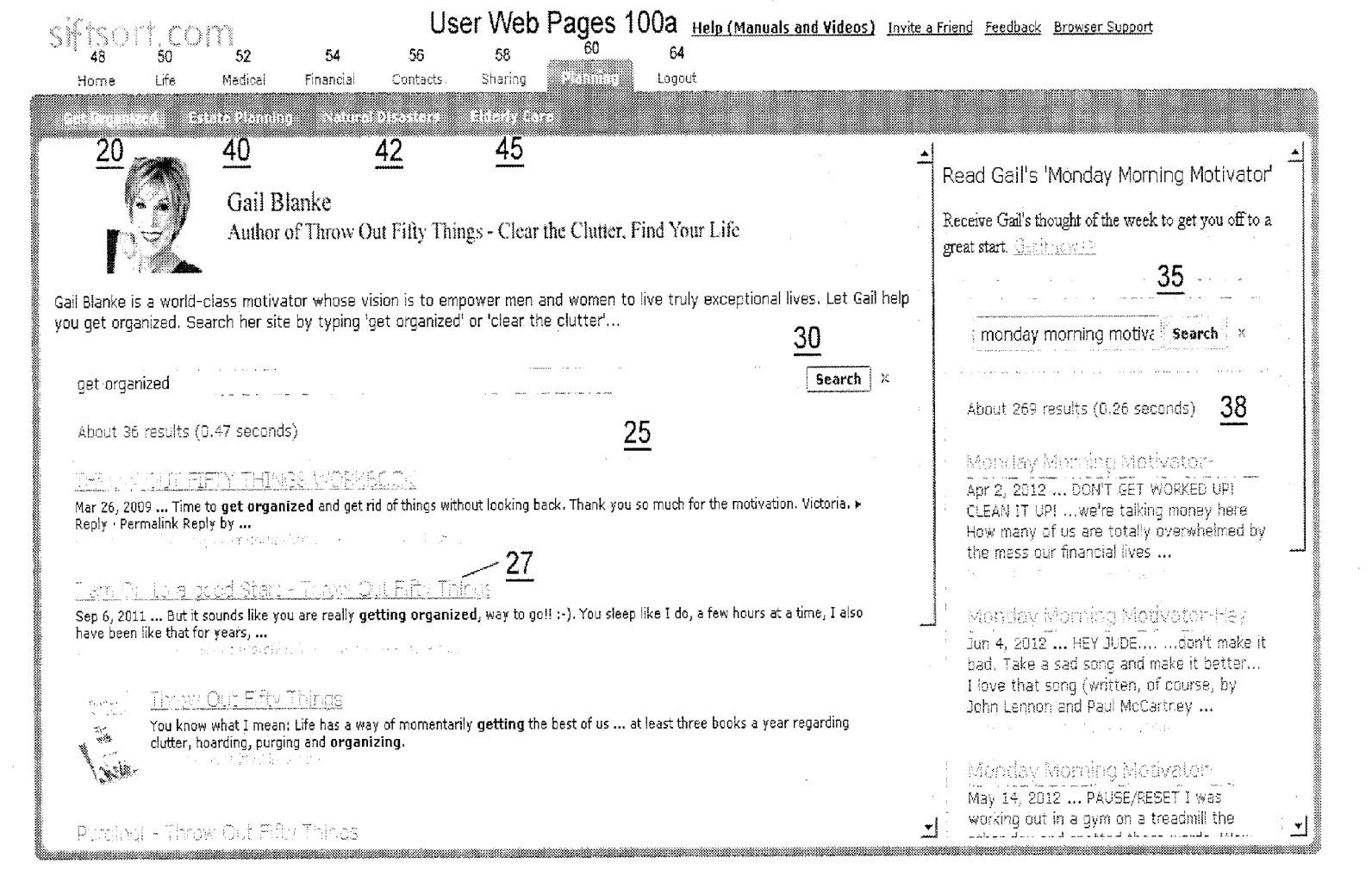

FIG. 2J—Category Database: Planning

FIG. 2J is a diagram which illustratively depicts User Web Pages 100a-c that a user would interact with the PLANNING Category Database 60 by using his/her browser 10a or his/her mobile device 10b after successfully accessing the server system shown in FIG. 1, in accordance with one or more embodiments of the present invention.

Within the Category Database 'Planning' 60 are multiple sub-components called Content Listings, indicated as Get Organized 20, Estate Planning 40, Natural Disasters 42 and Elderly Care 45. Content Listings are features in the server system 18 which use Application Programming Interface, also known as APIs, which is programmed to dynamically lookup relative content from external sources residing on the internet based off of preset keywords, which results are then illustratively depicted in a sortable format indicated as numeral 25. At anytime, the user may click in the hyperlink 27 associated with the content generated by the system to open a new browser window to read the content, without terminating their session within the system. The user may also use a Search Tool 30 to refine the or alter the preset keywords programmed into the system to dynamically lookup relative content from external sources residing on the internet and ultimately dynamically alter the results shown in numeral 25.

Similarly, there are different preset keywords and external sources to the system that are programmed into the system to display other relative content, indicated as numeral 38 and the user would use the Search tool 35 to search on relative keywords within those programmed external sources to further refine the content listed by the system, indicated as numeral 38.

Each other Content Listing, indicated as Estate Planning 40, Natural Disasters 42 and Elderly Care 45 are similarly programmed with Application Programming Interfaces, also known as APIs, which are programmed to dynamically lookup different relative content from external sources residing on the internet based off of preset keywords, related to the subject matter named for each Content Listing which results are then illustratively illustrated in a sortable format indicated as numeral 25 and numeral 38 respectively, providing the user of the system a mechanism of reading externally generated content from within the system, relative to their user profile and Notes and Documents stored on the system.

FIG. 2K—Category Database: Log-Out

FIG. 2K is a diagram which illustratively depicts User Web Pages 100*a-c* that a user would interact with the LOGOUT Category Database 64 by using his/her browser 10*a* or his/her mobile device 10*b* after successfully accessing the server system shown in FIG. 1, in accordance with the teachings of this invention.

After securely accessing the system, the user can end the session with the system by using the Category Database 60 which would instruct the system to disconnect the browser 10*a* or the mobile device 10*b* from the system and remove the cookie session associated with the session to ensure a secure disconnect has occurred.

After the user of the system has performed a logout of the system, in order to access the system again, the user would need to reestablish a session by performing a Logon, described previously in FIG. 2A and FIG. 2C.

FIG. 3—Add/Edit/Delete Notes Flow Chart

Figure 3A:
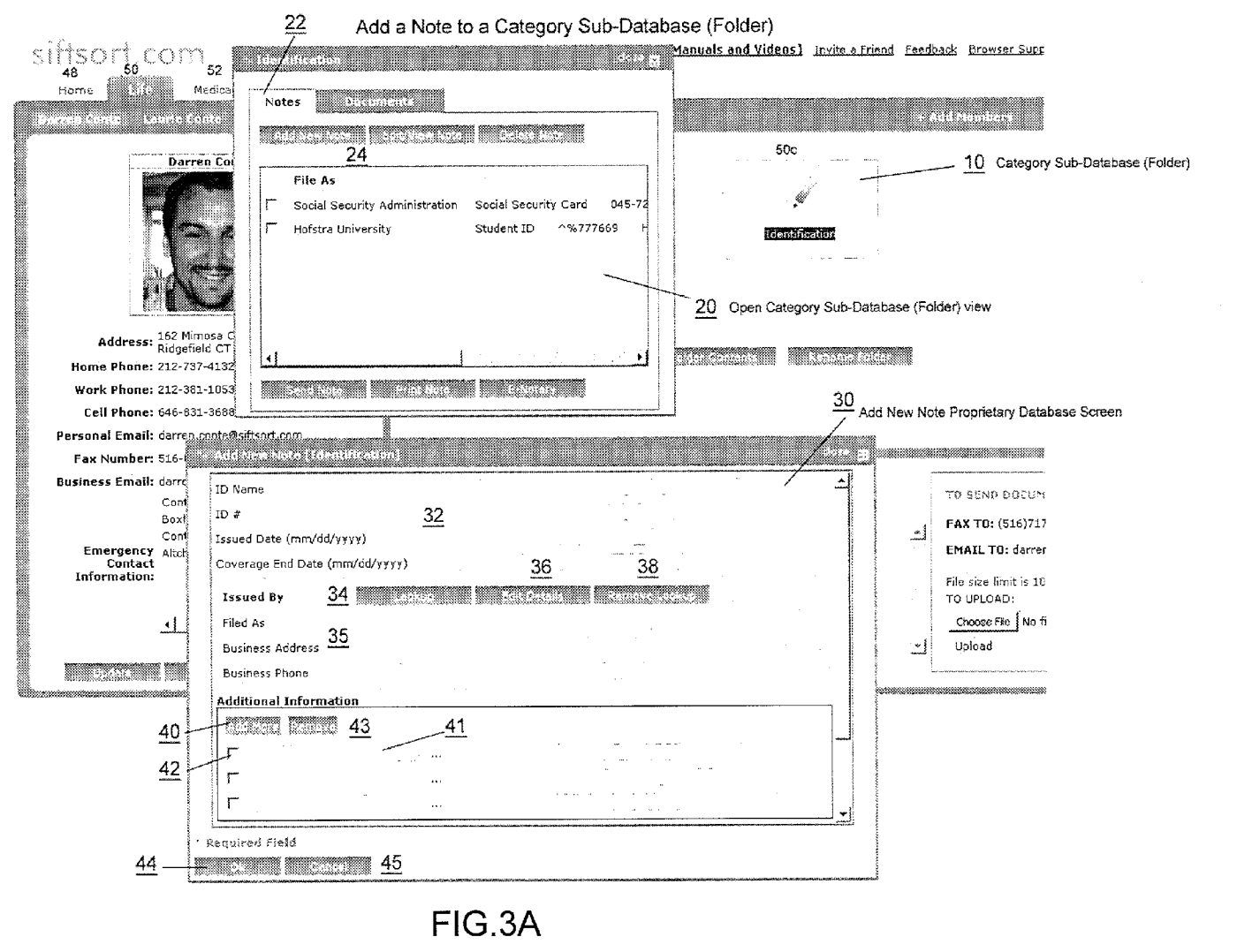

FIG. 3 is a flow diagram which illustratively depicts the process by which the user uses a client system login shown in FIG. 2 to access the website and its server system shown in FIG. 1 to add, edit or delete the stored Note(s) using the proprietary database screen shown in FIG. 3A in accordance with one or more embodiments of the present invention.

As described earlier, the server system 18 is capable of storing two types of information within the Category Sub-Databases (Folders) 48*a-c*, 50*a-c*, 52*a-c*, 54*a-c*, 56*a-c*, 58*a-c*, 60*a-c* shown in FIG. 1 and illustratively depicted as numeral 30 in FIG. 2E, 2F, 2G, 2H. The following diagram illustratively depicts how the user of the system would ADD, EDIT and DELETE Notes stored within the system.

In one illustrative embodiment of the present invention, and explained in respect to flow diagram FIG. 3, a user can use a plurality of client systems in step 200, which include browser 10*a* and mobile device 10*b* to enter and send the Notes to the server system 18 over link 16 shown in FIG. 1.

Once a user is securely connected to the server system 18, the system automatically generates Access Log File 205 which records current session activity and securely stores information within the user account for accessibility in the future. For additional security, the session with the system will expire and logoff from the user session if no activity is detected for 30 minutes. The user would be required to log back into the system as described in FIG. 2. The user would be able to choose from a selection of Category Databases 48, 50, 52, 54, 56, 58, 60 as shown in step 210. After a user is connect to the selected Category Database, they can select User Web Page 100*a*, 100*b*, 100*c* or create a new User Web Page (i.e. 100*d*) as shown in step 215 also known as family members which would represent the multiple family members as defined by the account holder who has signed up for the service. Upon selection of a User Web Page 100*a*, 100*b*, 100*c*, the user of the system can choose from a selection of default Category Sub-Database 48*a-c*, 50*a-c*, 52*a-c*, 54*a-c*, 58*a-c*, 60*a-c* in step 220 or create a new Category Sub-Database (i.e. d) to store the Notes. Once a user has selected a specific Category Sub-Database, in step 230 the user would choose between adding new Notes or editing or deleting existing Notes by using the default Proprietary Database Screen FIG. 3A or FIG. 3C in accordance with one or more embodiments of the present invention.

If a user chooses to Add a new Note in step 232, they would be prompted by a default selection of database fields illustratively displayed by Proprietary Database Screen (see FIG. 3A) in step 234 and then begin to fill-in database fields with the appropriate unique information. After the user had finished entering in the personal information into the default or customized database fields illustratively displayed in Proprietary Database Screen FIG. 3A the user would be given the opportunity to Save the new information in step 236. If the user chooses to Save the information in step 238 the Note would be successfully saved in step 242 placing the Note(s) into the specific Category Sub-Database also known as a Folder chosen in step 220, hence adding the Note to the specific User Web Page 100*a*, 100*b*, 100*c* chosen in step 215 and adding the Note to the Database Server 18D in FIG. 1. If the user chooses to discard the information that was entered into the database fields in step 234 they may discard all personal information in step 240 and the Note will not be added to the specific User Web Page 100*a*, 100*b*, 100*c* chosen in step 215 and not added to the Database Server 18D in FIG. 1.

As further shown and explained with respect to the flow diagram of FIG. 3, the Notes that are stored in the Category Sub-Database 50*a-c*, 52*a-c*, 54*a-c*, 56*a-c*, 58*a-c* and 60*a-c* can be edited by the user in step 256 which would EDIT the Note information or contents stored in the Category Sub-Database selected in step 220. The user would be prompted in step 258 to view and edit the personal information already stored in the database fields illustratively displayed in Proprietary Database Screen (see FIG. 3C). Once the user edited the personal information stored in the database fields displayed in Proprietary Database Screen the user would be given the opportunity in step 260 to Save the changes made to the Note. If the user chooses to save the edited information in step 258 then in step 264 the Note would be successfully saved in step 266 placing the Note into the specific Category Sub-Database also known as a Folder chosen in step 220, hence adding the Note to the specific User Web Page 100*a*, 100*b*, 100*c* chosen in step 215 and adding the Note to the Database Server 18D in FIG. 1. If the user chooses to cancel the changes made to the information that was edited into the database fields in step 258 they may discard all edited information in step 262 and the original Note will not be altered in the specific User Web Page 100a, 100b, 100c chosen in step 215 and not altering the Database Server 18D in FIG. 1.

As further shown and explained with respect to the flow diagram of FIG. 3, the Notes that are stored in the Category Sub-Database 50a-c, 52a-c, 54a-c, 56a-c, 58a-c and 60a-c can be deleted by the user in step 244 which would Delete the Note information and contents stored in the Category Sub-Database selected in step 220. The user would be prompted in step 246 to view the personal information already stored in the database fields illustratively displayed in Proprietary database screen FIG. 3C. If the user decided to delete the personal information stored in the database fields displayed in Proprietary Database Screen (see FIG. 3C) the user would be given the opportunity to permanently delete the Note in step 248. If the user chooses to delete the information from step 246 then in step 252 the Note would be successfully deleted in step 254 removing the Note from the specific Category Sub-Database also known as a Folder chosen in step 220, hence permanently deleting the Note from the specific User Web Page 100a, 100b, 100c chosen in step 215 and deleting the Note to the Database Server 18D in FIG. 1. If the user chooses not to delete the information that was viewed in the database fields, then in step 246 they may discard all intentions to delete the Note in step 250 and the original Note will not be altered in the specific User Web Page 100a, 100b, 100c and ultimately not altering the Database Server 18D in FIG. 1.

FIG. 3A—Add a Note to Category Sub-Database

FIG. 3A is a diagram which illustratively depicts the graphical user interface of a typical proprietary database screen representing how Note(s) are securely added within a typical Category Sub-Database (Folder) that which a user would interact with by using his/her browser 10a or his/her mobile device 10b to access the website and its server system shown in FIG. 1, in accordance with one or more embodiments of the present invention.

The server system 18 in FIG. 1 offers a user the ability to store personal and family Notes within a selection of Category Sub-Category (Folders) 50a-c, 52a-c, 54a-c, 56a-c, illustratively depicted as numeral 10 specifically Category Sub-Database (Folder) 50c in FIG. 3A. These folders would allow the user to store the specific information pertaining to the subject matter of each folder—for this example that specific Category Sub-Database (Folder) 50c is named Identification. The users would open the desired Category Sub-Database (Folder) to display the Open Category Sub-Database (Folder) view indicated as numeral 20. On the Notes TAB indicated as numeral 22, the user may create a new Note by clicking on the Add New Note button indicated as numeral 24. Once this button as been pressed, a new window is opened showing the Add New Note Proprietary Database Screen indicated as numeral 30. The user may then enter in the specific information pertaining to Note in the proprietary fields provided by the system indicated as numeral 32.

These fields are unique in the respect that they are specifically referring to data that would pertain exclusively to the subject matter indicated by the name of the Category Sub-Database (Folder). By using the Lookup function indicated as numeral 34 a user can assign a Contact record from the Contact Category Database (indicated as numeral 56 in FIG. 1) and dynamically display the Contact Record details on the Add New Note Screen indicated as numeral 30 thus associating two individual records together through a link and displaying the information into the fields indicated as numeral 35. Since the database screen only displays a few fields that are assigned from the chosen Contact record as shown in numeral 35, the Edit Details function indicated as numeral 36 would allow the user to view and edit all the fields within the Contact record stored in the Contacts database, numeral 56 in FIG. 1. The user may also remove the assigned Contact record by using the Remove Lookup button indicated as numeral 38.

The proprietary database that provides the fields for each record has the unique ability to dynamically add custom fields that would pertain to the specific Note being added to the system. By using the Additional Information fields indicated as numeral 41 the user would be offered a selection of additional fields that are provided by the system to dynamically add into the Note. If the user wishes to add their own custom fields to the Note they may do so by typing in the blank spaces indicated also as numeral 41. These text spaces can be used to define and describe the field and the pertaining information associated with it. If the user needs to add more Additional Information fields, they may use the Add More button indicated as numeral 40. If the user has decided to remove any of the custom fields that have been added, he/she may click on the remove selection boxes indicated in numeral 42 which would highlight the particular custom field then click the Remove button also indicated as numeral 43. This would then remove the custom field and all of its values from the Note. Once the data has been successfully entered into the Note, the user would then have the choice to save the Note or discard the Note and not save any information. If the user wishes to save the Note to the system, he/she would click the Ok button indicated as numeral 44, which would then save the Note to the Category Sub-Database (Folder). Should the user wish to discard the Note completely, he/she would click the Cancel button indicated as numeral 45 which would discard the Note contents from the Category Sub-Database (Folder).

An unlimited amount of new Notes can be created by the user within each Category Sub-Database (Folder) allowing the user to store an infinite amount of information. If the user wants to generate a report to list the Notes of each Category Sub-Database (Folder) after storing information in the system, they would use the Folder Contents Report later described in FIG. 3D.

Figure 3B:
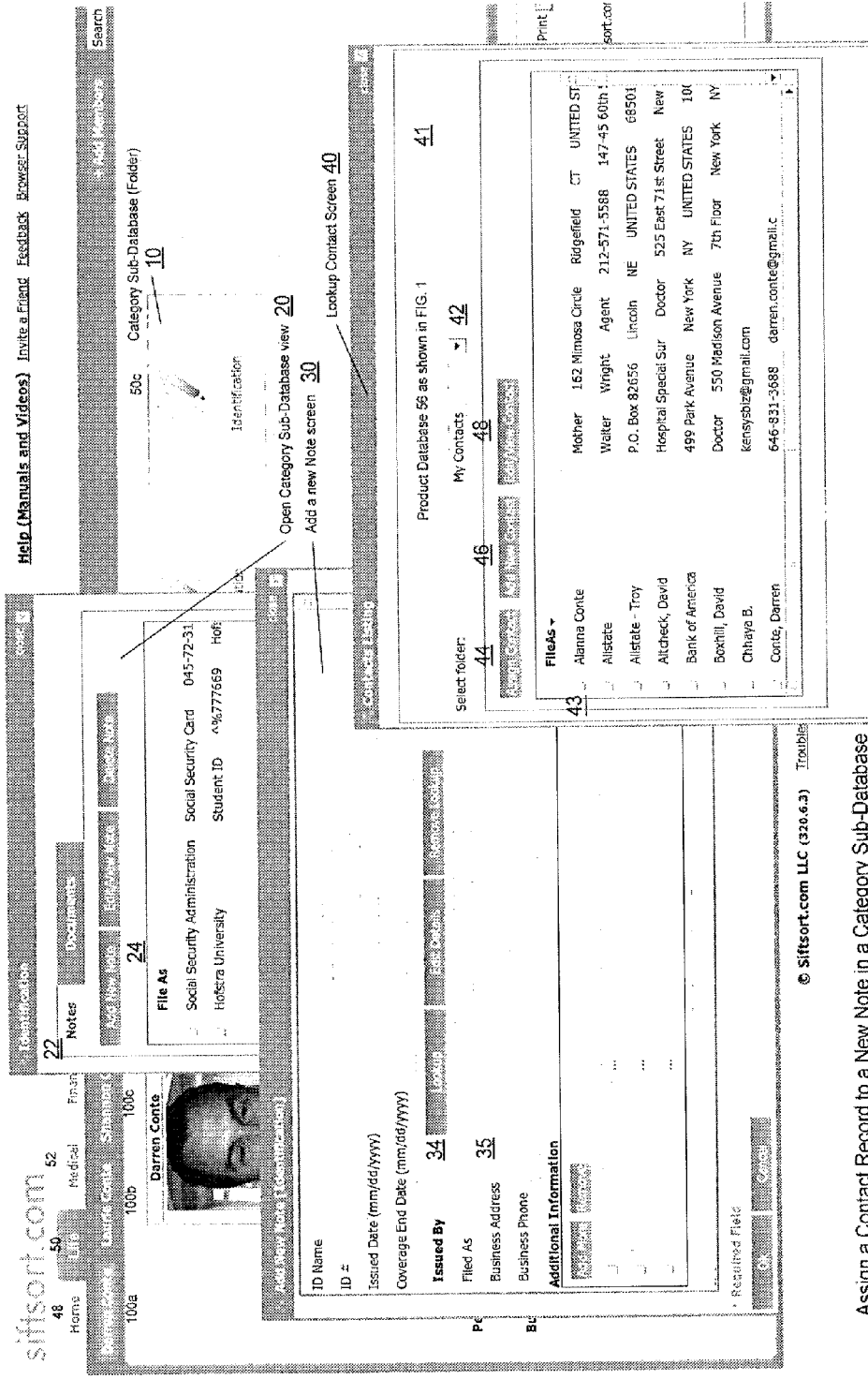
FIG. 3B is a diagram which illustratively depicts a proprietary database screen where a user assigns a contact record to a category sub-database folder of the server system shown in FIG. 1 in accordance with one or more embodiments of the present invention.

FIG. 3B—Assign a Contact Record to a New Note in a Category Sub-Database

FIG. 3B is a diagram which illustratively depicts the proprietary database screen that a user would interact with by using his/her browser 10a or his/her mobile device 10b to assign a contact record to a typical Category Sub-Database (Folder) in the server system shown in FIG. 1, in accordance with one or more embodiments of the present invention.

As previously described in FIG. 3A, a user can assign a contact record from the Category Database 56 known as Contacts, into a new Note that is to be stored in a different Category Database—in this example Category Database 50 known as Life. FIG. 3B illustratively depicts the database screen that the user would utilize to assign the contact record to the new Note within the particular Category Sub-Database (Folder). As described earlier, the user would open the desired Category Sub-Database (Folder) indicated as numeral 10 to display the Open Category Sub-Database (Folder) view indicated in numeral 20. The user would display the Notes TAB indicated as numeral 22 then click the Add New Note button indicated as numeral 24 to view the Add a New Note screen indicated as numeral 30. The user would then click the Lookup button indicated as numeral 34 to display the Lookup Contact Screen indicated as numeral 40. It is here, that the user can select and assign a particular Contact record that is stored in the Category Database named Contacts and as shown as numeral 56 in FIG. 1 in which the contents of this database are illustratively illustrated as numeral 41. The user of the system may select the Category Sub-Database (Folder)

tree from the pull-down menu indicated as numeral 42 to choose a particular Category Sub-Database (Folder) of Contact records. To assign an existing Contact record from the chosen Category Sub-Database (Folder) the user would select the checkbox indicated as numeral 43 next to the desired Contact record and then click the Assign Contact button indicated as numeral 44. That function would automatically display the information in the fields indicated as numeral 35 in the Add a New Note screen indicated as numeral 30. If the desired Contact record in which the user wishes to assign does not exist in the Category Database 56, the user may dynamically add a new contact by clicking the Add New Contact button indicated as numeral 46 which would add a new contact to the Contact database 56, in which the user may then select the newly added contact to have it assigned to the new Note in the fields indicated as numeral 35. Should a user notice that the desired contact to be assigned has incorrect information within its Contact record, the user may use the Edit/View Contact button indicated as numeral 48 to edit the Contact record prior to assigning it to the new Note in the Add a New Note screen indicated as numeral 30. Once the Contact record has been successfully assigned to the new Note screen, the user may continue entering the remaining data needed to complete the New Note screen indicated as numeral 30.

Figure 3C:
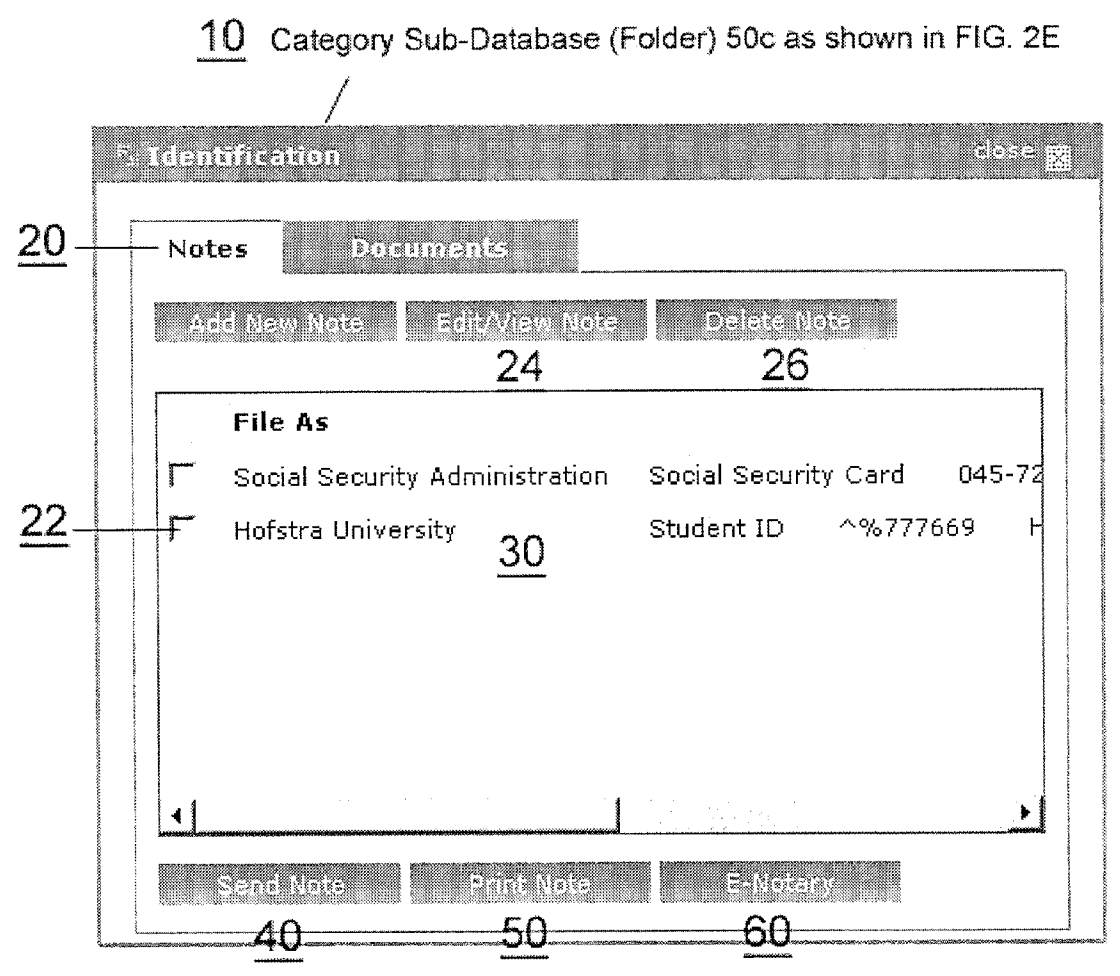

FIG. 3C—Typical Category Sub-Database: Stored Note(s)

FIG. 3C is a diagram which illustratively depicts the graphical user interface of a typical Category Sub-Database (Folder) view showing how Note(s) are securely stored within a typical Category Sub-Database (Folder) that which a user would interact with by using his/her browser 10*a* or his/her mobile device 10*b* to access the website and its server system shown in FIG. 1, in accordance with one or more embodiments of the present invention.

As previously described, a user can add Notes to a Category Sub-Database (Folder) using the Proprietary Database Screen indicated as numeral 30 in FIG. 3A. FIG. 3C shows a typical Category Sub-Database (Folder), in this case, Category Sub-Database (Folder) 50*c* as indicated in numeral 10 illustratively depicts the Notes TAB indicated as numeral 20 which would list the stored Notes created by the user indicated as numeral 30. If a user chooses to Edit a stored Note, he/she may select the target Note by placing a check in the box indicated as numeral 22 and then use the Edit/View Note button indicated as numeral 24 which would allow the user to alter the information that is stored within the Note. The user may also choose to Delete the Note and may do so by placing a check in the box indicated as numeral 22 next to the desired Note and then by using the Delete Note button indicated as numeral 26 to delete the Note from the system. A warning message would appear asking the user to confirm the deletion of the Note from the system and once confirmed by the user, the Note and all of the information stored within the Note would be permanently removed from the system.

Figure 3E:
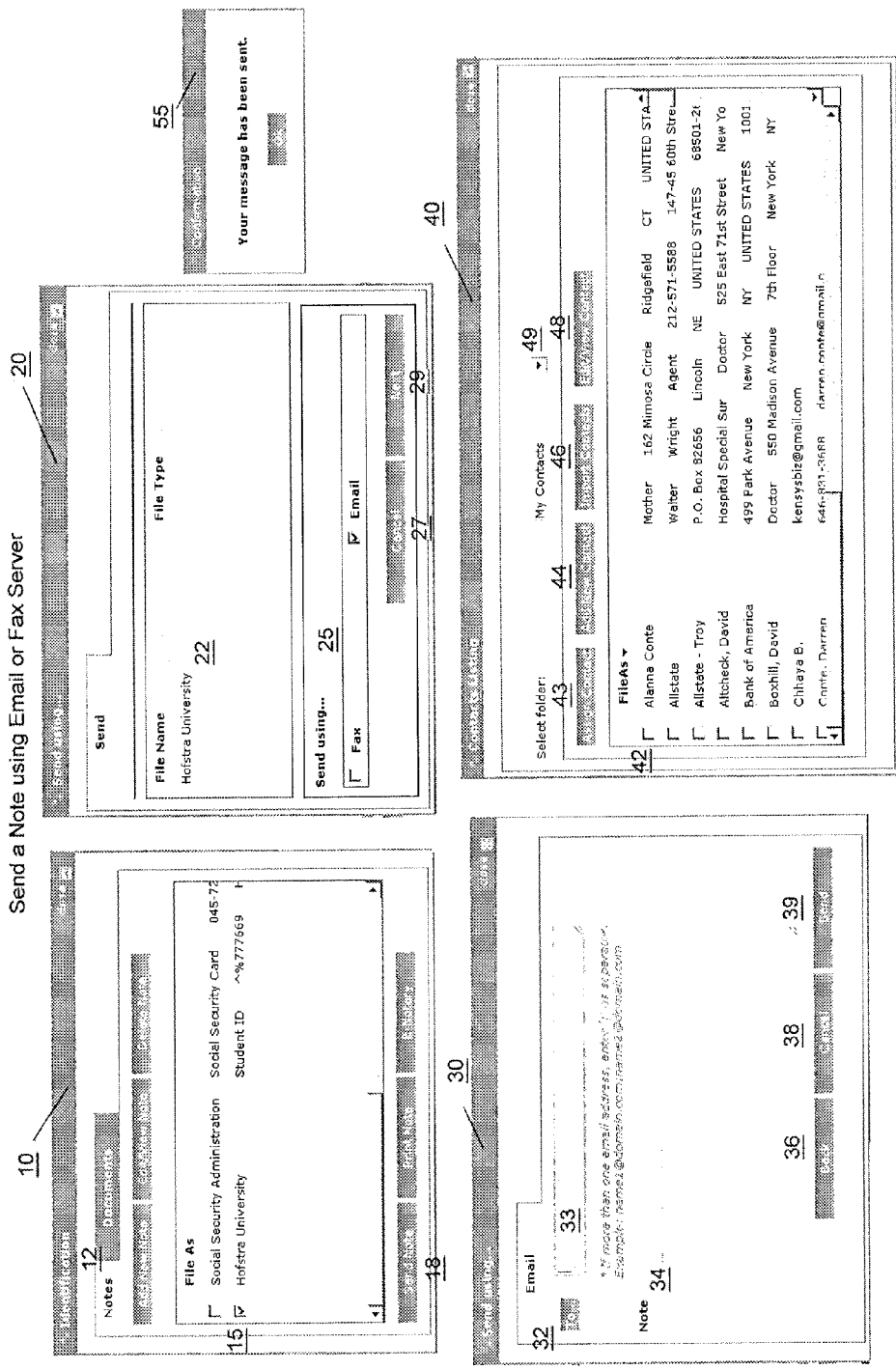
FIG. 3E is a diagram which illustratively depicts a graphical user interface screen used by a user to send note(s) stored within all category sub-databases in a server system using an email server or fax server of the server system shown in FIG. 1 in accordance with one or more embodiments of the present invention.

A user of the system may choose to Send the Note from the target Category Sub-Database (Folder) to a recipient which the user may do so by placing a check in the box indicated as numeral 22 and then by using the Send Note button indicated as numeral 40 to send the Note from the Category Sub-Database (Folder) to an external recipient(s) using the system Email Server—24 or Fax Server—22 indicated in FIG. 1 which is further described in FIG. 3E.

A user of the system may choose to Print the Note from the target Category Sub-Database (Folder) to a local connected printer by placing a check in the box indicated as numeral 22 and then by using the Print Note button indicated as numeral 50 to print the Note to a designated printer which may be connected to the user's local computer.

A user of the system may choose to E-Notary the Document from the target Category Sub-Database (Folder) by securely routing the Document through the Veroha E-NotaryTrust system for official notarization using the E-Notary Wizard which the user may do so by placing a check in the box indicated as numeral 22 and then by using the E-Notary button indicated as numeral 60 to initiate the E-Notary Wizard and connect to the Veroha E-NotaryTrust system using the system Web Server—20 and the Email Server—24 indicated in FIG. 1 which is further described in FIG. 9, 9A-9G, below.

FIG. 3D—Folder Contents Report: Stored Notes

FIG. 3D is a diagram which illustratively depicts the graphical user interface generated by the Folder Contents Report function showing all Note(s) stored within a typical Category Database that which a user would interact with by using his/her browser 10*a* or his/her mobile device 10*b* to access the website and its server system shown in FIG. 1, in accordance with one or more embodiments of the present invention.

Indicated as numeral 36 in FIG. 2E, 2F, 2G, 2H a user can display all Notes stored in all Category Sub-Databases (Folder) by using the Folder Contents Report function. Once this button is pressed by the user, a report is instantly generated displaying all Notes stored within all Category Sub-Databases (Folder) as indicated as numeral 10 in FIG. 3D. On the Notes TAB of this Folder Contents Report indicated as numeral 20 the list would display the Note Files As Name indicated as numeral 30 as well as the location of each particular Notes in the particular Category Databases indicated as numeral 40. The location indicates the specific Category Database indicated as numeral 42, followed by the specific User Web Page indicated by numeral 44, followed by the specific Category Sub-Database (Folder) indicated by numeral 46. The user could also PRINT the Folder Contents Report by using the PRINT function button indicated as numeral 15.

FIG. 3E—Transmission of Note(s) Via Email/Fax

FIG. 3E is a diagram which illustratively depicts the graphical user interface screen that a user would interact with by using his/her browser 10*a* or his/her mobile device 10*b* to send a Note stored within all Category Sub-Databases (Folders) in the server system using the Email Server—24 or Fax Server—22 shown in FIG. 1, in accordance with one or more embodiments of the present invention.

As previously described, a user can send Notes from a Category Sub-Database (Folder) using the Send Note button indicated as numeral 40 in FIG. 3C and illustratively depicted as number 10 in FIG. 3E. The user of the system would select the Notes Tab indicated as numeral 12 and select a desired Note by placing a check in the box indicated as numeral 15 then clicking the Send Note button 18 to initiate the Send process. Once this Send Note button indicated as number 18 is pressed by the user, the Send wizard screen appears 20 in which the selected Note is carried forward 22 and the user is presented with a choice of sending the Note using either the Fax Server protocol or the Email Server protocol 25. The user of the system can select one protocol by placing a check in the respective check box the clicking the Next button 29. If the user of the system decides to cancel the Send wizard at this point, the user may click the Cancel button 27.

In this example, the Email protocol is selected and demonstrated and is similar to the Fax protocol process except that the Send wizard will deliver the selected Note using the Email Server—24 to an email address of the desired recipients. When the Fax protocol is selected, the Send wizard will deliver the selected Note using the Fax Server—22 to a facsimile number of the desired recipients.

When Next button 29 is pressed, the next Send wizard screen 30 prompts a user of the system to assign a contact recipient(s) 33 to the receive the selected Note carried forward and indicated as numeral 22. The user can enter in recipient email address or facsimile number in the space provided 33 or perform a lookup of the recipients email address or facsimile number in the Contacts Database 56 by using the To . . . button indicated as numeral 32. If the user needed to return to the previous Send wizard screen, the user may click the Back button indicated as numeral 36. If the user of the system decides to cancel the Send wizard at this point, the user may click the Cancel button 38. By clicking the To . . . button indicated as numeral 32 the Contact Listing screen would appear indicated as numeral 40 which would allow the user of the system to choose the desired recipient(s) to receive the selected Note 22.

The user of the system has many selections to find the desired recipient(s) which the user can do by placing a check in the box 42 to select a Contact recipient(s) then clicking the Assign Contact button indicated as numeral 43. This would automatically populate the desired email address or facsimile number into the recipient's field indicated as numeral 33. The user may also browse to find other recipients by using the pull-down menu indicated as numeral 49 to browse other Category Sub-Database (Folders) indicated as numeral 30 in FIG. 2H in the Category Database 56 shown in FIG. 1 and also indicated as Contacts 56 in FIG. 2H for all User Web Pages 100*a*, 100*b*, 100*c* indicated as numeral 20 in FIG. 2H.

The user of the system may also click Add a New Contact 44 to dynamically add a new contact to the system and Category Database 56 and then select and assign it as a recipient using numeral 42 and 43 respectively. The system also allows the user to import recipients from other external systems into the Category Database 56 by using the Import Contacts button 46. The Import Contacts wizard allows contact information to be imported from any external system such as an external email program such as Microsoft Outlook, or online services such as Google Contacts. The user of the system may also update an email address or facsimile number dynamically to an existing recipient Contact record stored in the Category Database 56 by using the Edit/View Contact 48 button to update the Contact record before the user selects and assigns it as a recipient using numeral 42 and 43 respectively. As soon as the user of the system selects and assigns a recipients(s) the user of the system would then finalize the Send wizard by clicking the Send button indicated as numeral 39. The system would use the respective Fax Server—22 or the Email Server—24 of the server system 18 indicated in FIG. 1 to send the selected Note 22 to the desired recipient(s) facsimile number or email addresses respectfully. Once completely, the system would display a confirmation screen 55 to the user of the system that the message has been successfully sent by the system of the desired recipient(s) facsimile number or email addresses.

FIG. 4—Add/Edit/Move/Delete Documents Flow Chart

FIG. 4 is a flow diagram which illustratively depicts the process by which the user uses a client system login shown in FIG. 2 to access the website and its server system shown in FIG. 1 to add, edit, move or delete Documents in accordance with the teachings of this invention.

In one illustrative embodiment of this invention, and explained in respect to the flow diagram of FIG. 4, a user can use a plurality of client systems in step 300, which include a browser 10*a*, a mobile device 10*b* and a facsimile machine 10*d* to enter and send the Documents to the server system 18 over the link 16. Once a user is securely connected to the server system 18, the system would automatically begin to generate a Log File 305 which would record current session activity and securely store this information within the user account for future reference. For additional security, the session with the system will expire and logoff from the user session if no activity is detected for 30 minutes. The user would be required to log back into the system as described in FIG. 2. The user would be able to choose from a selection of Category Databases 48, 50, 52, 54, 56, 58, 60 as shown in step 310. After a user is connect to the selected Category Database, they can select a User Web Page 100*a*, 100*b*, 100*c* or create a new User Web Page (i.e. d) as shown in step 315 also known as family members which would represent the multiple family members as defined by the account holder who has signed up for the service. After a specific User Web Page 100*a*, 100*b*, 100*c* is selected, the user of the system can choose from a selection of default Category Sub-Database also known as Folders 48*a-c*, 50*a-c*, 52*a-c*, 54*a-c*, 58*a-c*, 60*a-c* in step 320 or create a new Category Sub-Database (Folder) (i.e. d) to store the Documents. Once a user has selected a specific Category Sub-Database (Folder), in step 330 the user would choose between adding a new Document or editing or deleting an existing Document in accordance with one or more embodiments of the present invention.

If a user decides to Add a new Document in step 340, they would be prompted by a default selection of methods to add a new Document in step 342 which would include to Fax, Email or Upload a new Document into the server system 18 over the link 16 and securely store it within the Database Server 18D in FIG. 1. As further described by FIG. 4, if a user chose to FAX a Document in step 344 that would indicate that a Facsimile document specifically would be stored in to the server system 18. A user would use their own client system 10 in FIG. 1, specifically a facsimile machine 10*d* in FIG. 1 to fax the desired Document to our server system 18 using a pre-assigned fax number generated by the Fax Server 22 in FIG. 1 in step 344. Once a user has successfully faxed in a new Facsimile Document, it is passed through the server system 18 by the Fax Server 22 in FIG. 1 and converted from its original format to a Portable Document Format (PDF) in step 345. During step 345 the file is reduced in size, which is to save storage space in the Database Server 18D, and then sent to the Home 48 in FIG. 1 more specifically, New Messages 48*c* in FIG. 1 and illustrated as 348 where the new Document will reside for the user of the system to either Accept or Delete 351 the new Document from the server system 18. If the user of the systems decided to Delete 352 the new Document, the new Document would be purged from the server system 18. If the user of the systems decided to Accept 353 the new Document, the new Document would be added to the server system 18 and stored in the Pending 62 FIG. 1 container within the user specific account in step 354, where it will be stored for the user. The user may then select the chosen Category Sub-Database (Folder) from step 320, move the newly created Document file from the Pending 62 into that chosen Category Sub-Database (Folder) selected in step 355. When the new Document file is moved to the selected Category Sub-Database (Folder), the user will be prompted to enter in specific information within default fields that will be illustratively displayed in the proprietary database screen 356 and further described in FIG. 4A. Once the user added the specific information stored in the database fields displayed in proprietary database screen 356 the new Document would be successfully saved in step 357 placing the document into the specific Category Sub-Database (Folder) chosen in step 355, hence adding the Document to the specific User Web Page 100*a*, 100*b*, 100*c* chosen in step 315 and ultimately adding the Document to the Database Server 18D in FIG. 1.

If a user decides to Add a new Document in step 340, they would be prompted by a default selection of methods to add a new Document in step 342 which would be to Fax, Email or Upload a new Document in to the server system 18 over the link 16 and securely store it within the specific User Web Page 100*a*, 100*b*, 100*c* and ultimately storing the Documents in the Database Server 18D in FIG. 1. As further described by FIG. 4, if a user chose to e-Mail a Document in step 346 that would indicate that an assortment of Documents may be sent to be stored in to the server system 18. A user would use their own client system 10 in FIG. 1, specifically a browser 10*a* or a mobile device 10*b* in FIG. 1 to email the desired Document(s) as an attachment file to our server system 18 using a pre-assigned email address generated by the Email Server 24 in FIG. 1 in step 342. Once a user has successfully emailed in a new Document, it is passed through the server system 18 by the Email Server 24 in FIG. 1 and scanned for viruses in step 349. If step 349 fails to clean the Document of a virus, an alarm is sounded in step 350. If the virus scan in step 349 is successful, the file is then sent to the Home 48 in FIG. 1 more specifically, New Messages 48*c* in FIG. 1 and illustrated as 348 where the new Document will reside for the user of the system to either Accept or Delete 351 the new Document from the server system 18. If the user of the systems decided to Delete 352 the new Document, the new Document would be purged from the server system 18. If the user of the systems decided to Accept 353 the new Document, the new Document would be added to the server system 18 and stored in the Pending 62 FIG. 1 container within the user specific account in step 354, where it will be stored for the user. The user may then select the chosen Category Sub-Database (Folder) from step 320, move the newly created Document file from the Pending 62 into that chosen Category Sub-Database (Folder) selected in step 355. When the new Document file is moved to the selected Category Sub-Database (Folder), the user will be prompted to enter in specific information within default fields that will be illustratively displayed in the proprietary database screen 356 and further described in FIG. 4A. Once the user added the specific information stored in the database fields displayed in proprietary database screen 356 the new Document would be successfully saved in step 357 placing the document into the specific Category Sub-Database (Folder) chosen in step 355, hence adding the Document to the specific User Web Page 100*a*, 100*b*, 100*c* chosen in step 315 and ultimately adding the Document to the Database Server 18D in FIG. 1.

If a user decides to Add a new Documents in step 340, they would be prompted by a default selection of methods to add a new Documents in step 342 which would be to Fax, Email or Upload a new Documents in to the server system 18 over the link 16 and securely store it within the Database Server 18D in FIG. 1. As further described by FIG. 4, if a user chose to UPLOAD a document in step 347 that would indicate that an assortment of Documents may be sent to be stored in to the server system 18. A user would use their own client system 10 in FIG. 1, specifically a browser 10*a* or a mobile device 10*b* in FIG. 1 to upload the desired document to our server system 18 from a pre-assigned location on the user client system 10, for example a personal computer and send it to FTP Server 26 in FIG. 1 in step 342. Once a user has successfully uploaded a new document, it is passed through the server system 18 by the FTP Server 26 in FIG. 1 and scanned for viruses in step 349. If the virus scan in step 349 fails to clean the document of a virus, an alarm is sounded in step 350. If the virus scan in step 349 is successful, the file is then sent to the Pending 62 FIG. 1 container within the user specific account in step 354, where it will be stored for the user. The user may then select the chosen Category Sub-Database (Folder) from step 320, move the newly created Document file from the Pending 62 into that chosen Category Sub-Database (Folder) selected in step 355. When the new Document file is moved to the selected Category Sub-Database (Folder), the user will be prompted to enter in specific information within default fields that will be illustratively displayed in the proprietary database screen 356 and further described in FIG. 4A. Once the user added the specific information stored in the database fields displayed in proprietary database screen 356 the new Document would be successfully saved in step 357 placing the document into the specific Category Sub-Database (Folder) chosen in step 355, hence adding the Document to the specific User Web Page 100*a*, 100*b*, 100*c* chosen in step 315 and ultimately adding the Document to the Database Server 18D in FIG. 1. There is no limit or restriction to the amount of Documents that a user can store on the server system 18, in accordance with the teachings of this invention.

As further shown and explained with respect to the flow diagram of FIG. 4, the Documents that are stored in the Category Sub-Database (Folder) 50*a-c*, 52*a-c*, 54*a-c*, 56*a-c*, 58*a-c* and 60*a-c* can be Moved by the user in step 335 which would MOVE the document stored in a specific Category Sub-Database (Folder) selected in step 320 to another Category Sub-Database (Folder) 50*a-c*, 52*a-c*, 54*a-c*, 56*a-c*, 58*a-c* and 60*a-c* within the same or another specific User Web Page 100*a*, 100*b*, 100*c* in step 315 and within the same or another Category Database 50, 52, 54 in step 310 by moving the Document to the Pending 62 FIG. 1 container within the user specific account in step 354, where it will be stored for the user. The user may then select a different Category Sub-Database (Folder) from step 320, to move the Document file from the Pending 62 into that chosen Category Sub-Database (Folder) selected in step 355. When the new Document file is moved to the selected Category Sub-Database (Folder), the user will be prompted to enter in specific information within default fields that will be illustratively displayed in the proprietary database screen 356 and further described in FIG. 4A. Once the user added the specific information stored in the database fields displayed in proprietary database screen 356 the Document would be successfully saved in step 357 placing the document into the specific Category Sub-Database (Folder) chosen in step 355. The user may further refine the move of the Document by selecting a different Category Database 50, 52, 54 as in step 310 additionally selecting a different User Web Page 100*a*, 100*b*, 100*c* as chosen in step 315 and ultimately adding the Document to the Database Server 18D in FIG. 1.

As further shown and explained with respect to the flow diagram of FIG. 4, the Documents that are stored in the Category Sub-Database (Folder) 50*a-c*, 52*a-c*, 54*a-c*, 56*a-c*, 58*a-c* and 60*a-c* can be deleted by the user in step 358 which would DELETE the document stored in the Category Sub-Database (Folder) selected in step 320. The user can select a particular Document in step 360 and would be prompted in step 361 to view the personal information already stored in the database fields illustratively displayed in proprietary database screen, further described in FIG. 4A. If the user decided to Delete the personal information stored in the database fields displayed in proprietary database screen FIG. 4A the user would be given the opportunity to permanently Delete the Document in step 362. If the user chooses to Delete the information from step 361 then in step 366 the file would be successfully deleted in step 368 removing the document from the specific Category Sub-Database (Folder) chosen in step 320, hence permanently deleting the document from the specific User Web Page 100*a*, 100*b*, 100*c* chosen in step 315 and ultimately deleting it from the Database Server 18D in FIG. 1. If the user chooses not to delete the information that was viewed in the database fields, then in step 361 they may discard all intentions to delete the document in step 364 and the original document will not be altered in the specific User Web Page 100a, 100b, 100c chosen in step 315 and not altering it in the Database Server 18D in FIG. 1.

As further shown and explained with respect to the flow diagram of FIG. 4, the Documents that are stored in the Category Sub-Database (Folder) 50a-c, 52a-c, 54a-c, 56a-c, 58a-c and 60a-c can be Edited by the user in step 370 which would EDIT the document stored in the Category Sub-Database (Folder) selected in step 320. The user can select a particular Document in step 372 and would be prompted in step 373 to view the personal information already stored in the database fields illustratively displayed in proprietary database screen, further described in FIG. 4A. If the user decided to Edit the personal information stored in the database fields displayed in proprietary database screen 373 the user would be given the opportunity to edit the Document in step 373. The user would be given the opportunity to Save the changes to the Document properties in step 374. If the user chooses to Save the changes to the Document, then the user would select Yes in step 378 and the Document would be successfully Saved in step 380 to the Category Sub-Database (Folder) selected in step 320, hence permanently saving the Document in the specific User Web Page 100a, 100b, 100c chosen in step 315 and ultimately saving it in the Database Server 18D in FIG. 1. If the user chooses not to Save the Document properties that was edited in the database fields, then in step 373 the user may discard all intentions to Save the Document changes in step 376 and the original Document will not be altered in the specific User Web Page 100a, 100b, 100c chosen in step 315 and not altering it in the Database Server 18D in FIG. 1.

FIG. 4A—Add a Document to a Category Sub-Database (Folder)

FIG. 4A is a diagram which illustratively depicts the proprietary database screen that a user would interact with by using his/her browser 10a or his/her mobile device 10b to add a document to a typical Category Sub-Database (Folder) in the server system shown in FIG. 1, in accordance with one or more embodiments of the present invention.

The server system 18 in FIG. 1 offers a user the ability to store Documents within a selection of Category Sub-Databases also known as Folders 50a-c, 52a-c, 54a-c, 56a-c, illustratively illustrated as numeral 10 specifically Category Sub-Database Folder 50c illustratively illustrated as number 20 in FIG. 4A. These folders would allow the user to store the specific information pertaining to the subject matter of each folder—for this example that specific Category Sub-Database 50c is named IDENTIFICATION. The users would be able to add Documents to the system using three methods and temporarily storing the Documents in the Category Sub-Database known as 'Pending' indicated as numeral 61. The first method would be to FAX a Document into the system by using a dedicated facsimile number dynamically assigned by the system to the user of the system indicated as numeral 30. The system would dynamically assign a number that the user could use a facsimile machine to communicate with the system and send the document to the Category Sub-Database 'Pending' indicated as numeral 61. The second method would be for the user to EMAIL the Document into the system by sending a secure electronic mail to the unique email address assigned to the user by the system indicated as numeral 33. By sending the Document to the email system, the Document would be sent directly to the Category Sub-Database 'Pending' indicated as numeral 61. The third method that a user could use to send a Document to the system would be UPLOAD the document from his/her personal computer into the system by using the browse or Choose File button indicated as numeral 35 to locate the Document on his/her personal computer. Once the Document has been selected on the personal computer, the user would click the upload button indicated as numeral 37 to send the Document to the Category Sub-Database 'Pending' indicated as numeral 61.

Once the Document has been delivered to the Category Sub-Database 'Pending' indicated as numeral 61 the user may move and store the Document to a desired target Category Database indicated as number 10, a specific User Web Page 100a, 100b, 100c indicated as number 15 and more specifically a Category Sub-Database, also known as a Folder 20. Once the user of the system has selected the desired target Category Database 10 and the desired target User Web Pages 15 and the desired Category Sub-Database (Folder) 20 the user of the system can move, or drag and drop the Document from the Category Sub-Database 'Pending' indicated as numeral 61 to the desired Category Sub-Database (Folder) indicated as numeral 20 illustratively illustrated as number 50c, to the folder named IDENTIFICATION.

When the user of the system moves the Document from the Category Sub-Database 'Pending' indicated as numeral 61 to the desired Category Sub-Database (Folder) indicated as numeral 20 a proprietary database screen indicated as numeral 22 would appear and prompt the user to define specific meta-data information regarding the Document being added to the Category Sub-Database (Folder) indicated as number 20, or more specifically in this illustrative illustration as number 50c, namely IDENTICATION. The user would define specific Document Name indicated as number 24, which is defaulted by the system as the original name of the source Document, in this example "Passport.jpg". The user of the system may keep this default name or rename it to a newly desired name. The user of the system would then select a Document Type indicated as number 26 which is a pull-down menu of unique definitions relative to the subject matter or name of the Category Sub-Database (Folder). The user of the system would be able to select the Document Type that best describes that properties of the Document from a system generated list, for example "Drivers License" or "Passport". Then, the user of the system would then write any Notes referring to the Document indicated as numeral 28. When the user has completed the proprietary database screen indicated as number 22 and the user of the system is ready to move the Document and the associated meta-data information to the desired target Category Sub-Database (Folder) 20, the user of the system would click the 'Ok' button in the proprietary database screen indicated as numeral 22, which would move the Document from the Category Sub-Database 'Pending' indicated as numeral 61 to the desired Category Sub-Database (Folder) indicated as numeral 20, in this specific illustrative illustration to Category Sub-Category (Folder) number 50c. If the user elects not to move the Document to the target Category Sub-Database (Folder) 20 the user of the system would click the 'Cancel' button in the proprietary database screen indicated as numeral 22, which would leave the Document in the Category Sub-Database 'Pending' indicated as numeral 61, and remove any meta-data defined in the proprietary database screen indicated as numeral 22.

In accordance with the functionality of this invention, each Category Sub-Database (Folder) 20 is uniquely named within each specific Category Database 50, 52, 54 and offers a unique Document Type 26 pull-down menu of definitions in the proprietary database screen 22 relative to the subject matter or name of the Category Sub-Database (Folder) 20.

Hence, when the user of the system selects to move a Document to a particular target Category Sub-Database (Folder) indicated as number 20, within any selected Category Database 50, 52, 54 and furthermore within any selected User Web Pages 100a, 100b, 100c the system displays relative meta-data for the user of the system to select for each Document stored in the system so that it is properly defined and may be searched for by using the Search tool 70, which is described later in this document. For example, the Category Sub-Database (Folder) 50c namely IDENTICATION may prompt a Document Type 26 pull-down menu list of "Drivers License" or "Military Identification" where as Category Sub-Database (Folder) 50b namely EDUCATION would prompt a Document Type 26 pull-down list of "Diploma" or "Masters Degree" as appropriate meta-data for the user of the system to associate with the source Document that the user will move to the target Category Sub-Database (Folder) 20.

Figure 4B:
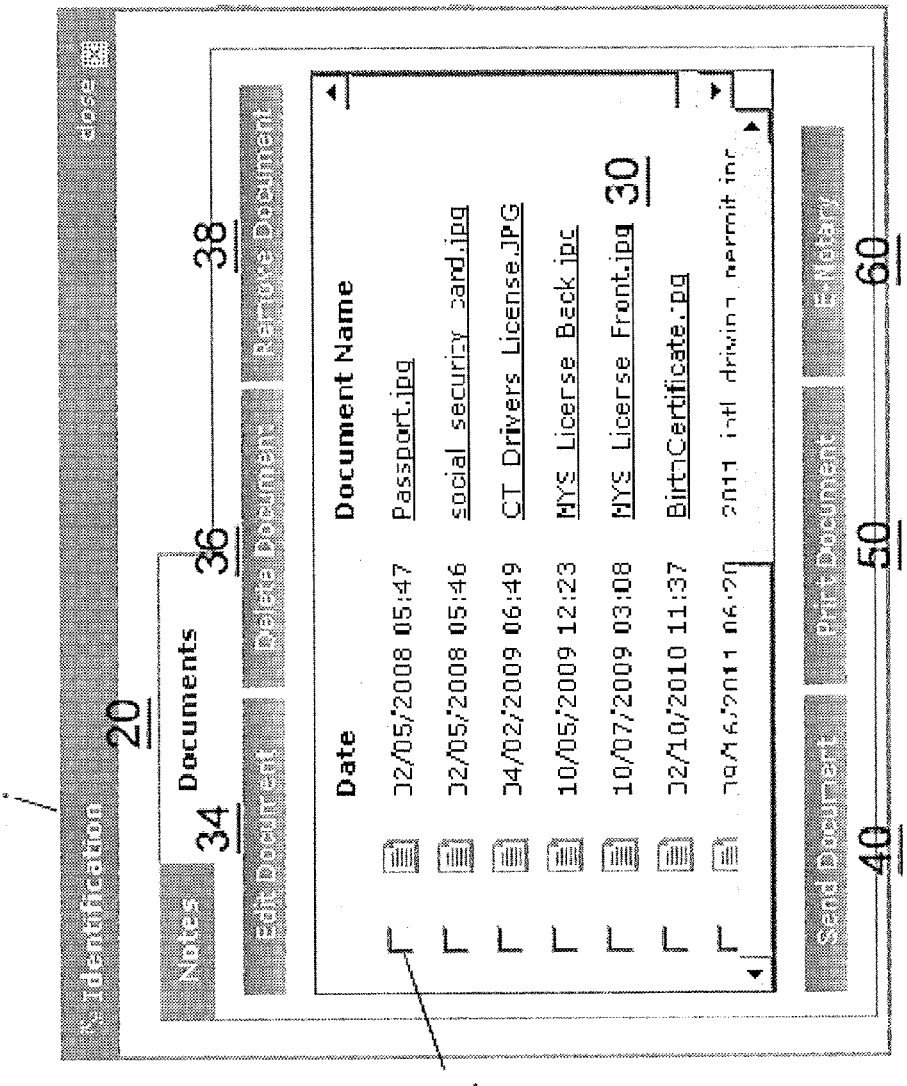
FIG. 4B is a diagram which illustratively depicts a plurality of documents stored within a category sub-database folder of the server system shown in FIG. 1 in accordance with one or more embodiments of the present invention.

FIG. 4B—Typical Category Sub-Database (Folder) View Showing Stored Documents

FIG. 4B is a diagram which illustratively depicts the graphical user interface screen that a user would interact with by using his/her browser 10a or his/her mobile device 10b to view the open Category Sub-Database (Folder) view showing the Documents stored within a typical Category Sub-Database (Folder) in the server system shown in FIG. 1, in accordance with one or more embodiments of the present invention.

As previously described, a user can add Documents to the system and furthermore move a Document into a Category Sub-Database (Folder) and define specific meta-data to be associated with Document before moving the Document to the target Category Sub-Database (Folder) using the proprietary database screen indicated as numeral 22 in FIG. 4A. Once the Document has been moved to the target Category Sub-Database (Folder), FIG. 4B shows a typical Category Sub-Database (Folder) view, in this example, Category Sub-Database (Folder) 50c in FIG. 4A and indicated in numeral 10 in FIG. 4B illustratively depicts the Documents Tab indicated as numeral 20 displays the numerous Documents stored by the user in the target Category Sub-Database (Folder) indicated as numeral 30.

A user of the system may choose to EDIT the meta-data properties of a specific Document, by placing a check in the box indicated as numeral 32 to select the target Document and then use the Edit Document button indicated as numeral 34 which would allow the user to edit the assigned meta-data information that is stored within the proprietary database screen described and illustratively depicted as numeral 22 in FIG. 4A. Any changes that the user makes to the proprietary database screen will ultimately be saved with the Document and be saved in the system.

A user of the system may choose to DELETE the Document from the target Category Sub-Database (Folder) by placing a check in the box indicated as numeral 32 and then by using the Delete Document button indicated as numeral 36 to delete the Document from the Category Sub-Database (Folder) and ultimately purging the Document from the system. A warning message would appear asking the user to confirm the deletion of the Document from the system and once confirmed by the user, the Document and all of the meta-data information stored within the Document properties would be permanently removed from the system.

A user of the system may choose to REMOVE the Document from the target Category Sub-Database (Folder) by placing a check in the box indicated as numeral 32 and then by using the Remove Document button indicated as numeral 38 to remove the Document from the Category Sub-Database (Folder) and place it in the Category Sub-Database known as 'Pending' indicated as numeral 61 in FIG. 4A. A warning message would appear asking the user to confirm the removal of the Document from the target Category Sub-Database (Folder) and once confirmed by the user, the Document would be moved to the Category Sub-Database known as 'Pending' and all of the meta-data information stored within the Document properties would be permanently removed from the Document.

Figure 4D:
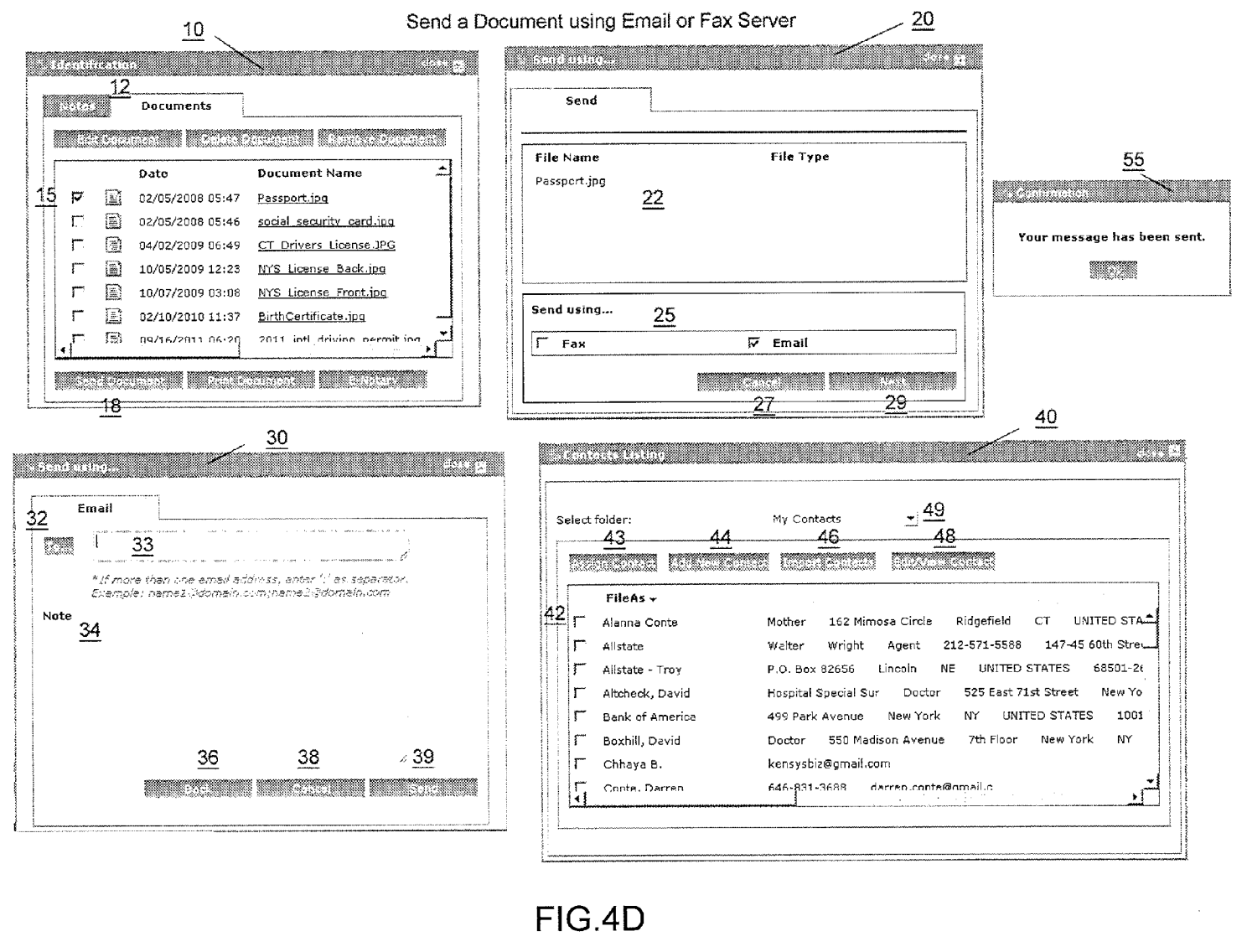

A user of the system may choose to SEND the Document from the target Category Sub-Database (Folder) to a recipient which the user may do so by placing a check in the box indicated as numeral 32 and then by using the Send Document button indicated as numeral 40 to send the Document from the Category Sub-Database (Folder) to an external recipient(s) using the system Email Server—24 or Fax Server—22 indicated in FIG. 1 which is further described in FIG. 4D.

A user of the system may choose to PRINT the Document from the target Category Sub-Database (Folder) to a local connected printer by placing a check in the box indicated as numeral 32 and then by using the Print Document button indicated as numeral 50 to print the Document to a designated printer which may be connected to the user's local computer.

A user of the system may choose to E-NOTARY the Document from the target Category Sub-Database (Folder) by securely routing the Document through the Veroha E-NotaryTrust system for official notarization using the E-Notary Wizard which the user may do so by placing a check in the box indicated as numeral 32 and then by using the E-Notary button indicated as numeral 60 to initiate the E-Notary Wizard and connect to the Veroha E-NotaryTrust system using the system Web Server—20 and the Email Server—24 indicated in FIG. 1 which is further described in FIG. 9, 9A-9G, below.

FIG. 4C—Folder Contents Report Showing Stored Documents

FIG. 4C is a diagram which illustratively depicts the graphical user interface generated by the Folder Contents Report function showing all Document(s) stored within a typical Category Database that which a user would interact with by using his/her browser 10a or his/her mobile device 10b to access the website and its server system shown in FIG. 1, in accordance with one or more embodiments of the present invention.

Indicated as numeral 36 in FIGS. 2E, 2F, 2G, 2H a user can display all Documents stored in all Category Sub-Databases (Folders) while having selected a specific Category Database 50, 52, 54 and selecting any user Web Pages 100a, 100b, 100c using the Folder Contents Report button. Once this Folder Contents Report button 36 is pressed by the user, the system generates a report to display all Documents stored within all Category Sub-Databases (Folders) as indicated as numeral 10 in FIG. 4C for the specific selected Category Database 50, 52, 54. On the Documents Tab of this report indicated as numeral 20 the report would display the meta-data information associated with each Document, that was assigned by the user on the proprietary database screen shown as numeral 22 in FIG. 4A when the Document was moved to the target Category Sub-Databases (Folders). Meta-data such as Document Name indicated as numeral 30, which the user may open the Document in the native application to view the Document by clicking the link indicated as numeral 30. Document Type meta-data indicated as numeral 40 which was assigned by the user using the proprietary database screen 22 in FIG. 4A. The Folder Contents Report also displays the particular Category Sub-Databases (Folders) or location of each stored Document in the system. The location indicates the specific Category Database indicated as numeral 42, followed by the specific User Web Page indicated by numeral 44, followed by the specific Category Sub-Databases (Folders) indicated by numeral 46. The user of the system may browse to the Location of the stored Document by clicking on the link indicated by either 42, 44, 46 to open the Category Sub-Database (Folder) view illustratively illustrated in FIG. 4B where the user can further manage the Document.

A user of the system may choose PRINT the Folder Contents Report by using the PRINT function button indicated as numeral 15.

FIG. 4D—Send a Document Using Email or Fax Server

FIG. 4D is a diagram which illustratively depicts the graphical user interface screen that a user would interact with by using his/her browser 10*a* or his/her mobile device 10*b* to send a Document stored within all Category Sub-Databases (Folders) in the server system using the Email Server—24 or Fax Server—22 shown in FIG. 1, in accordance with one or more embodiments of the present invention.

As previously described, a user can send Documents from a Category Sub-Database (Folder) using the Send Document button indicated as numeral 40 in FIG. 4B and illustratively depicted as number 10 in FIG. 4D. The user of the system would select the Documents Tab indicated as numeral 12 and select a desired Document by placing a check in the box indicated as numeral 15 then clicking the Send Document button 18 to initiate the Send process. Once this Send Document button indicated as number 18 is pressed by the user, the Send wizard screen appears 20 in which the selected Document is carried forward 22 and the user is presented with a choice of sending the Document using either the Fax Server protocol or the Email Server protocol 25. The user of the system can select one protocol by placing a check in the respective check box the clicking Next button 29. If the user of the system decides to cancel the Send wizard at this point, the user may click Cancel button 27.

In this example, the Email protocol is selected and demonstrated and is similar to the Fax protocol process except that the Send wizard will deliver the selected Document using the Email Server—24 to an email address of the desired recipients. When the Fax protocol is selected, the Send wizard will deliver the selected Document using the Fax Server—22 to a facsimile number of the desired recipients.

When Next button 29 is pressed, the next Send wizard screen 30 appears prompting the user of the system to assign a contact recipient(s) 33 to receive the selected Document carried forward and indicated as numeral 22. The user can enter in recipient email address or facsimile number in the space provided 33 or perform a lookup of the recipients email address or facsimile number in Contacts Database 56 by using the To . . . button indicated as numeral 32. If the user needed to return to the previous Send wizard screen, the user may click the Back button indicated as numeral 36. If the user of the system decides to cancel the Send wizard at this point, the user may click the Cancel button 38. By clicking the To . . . button indicated as numeral 32 the Contact Listing screen would appear indicated as numeral 40 which would allow the user of the system to choose the desired recipient(s) to receive the selected Document 22.

The user of the system has many selections to find the desired recipient(s) which the user can do by placing a check in the box 42 to select a Contact recipient(s) then clicking the Assign Contact button indicated as numeral 43. This would automatically populate the desired email address or facsimile number into recipient field indicated as numeral 33. The user may also browse to find other recipients by using the pull-down menu indicated as numeral 49 to browse other Category Sub-Database (Folders) indicated as numeral 30 in FIG. 2H in the Category Database 56 shown in FIG. 1 and also indicated as Contacts 56 in FIG. 2H for all User Web Pages 100*a*, 100*b*, 100*c* indicated as numeral 20 in FIG. 2H.

The user of the system may also click Add a New Contact 44 to dynamically add a new contact to the system and Category Database 56 and then select and assign it as a recipient using numeral 42 and 43 respectively. The system also allows the user to import recipients from other external systems into the Category Database 56 by using the Import Contacts button 46. The Import Contacts wizard allows contact information to be imported from any external system such as an external email program such as Microsoft Outlook, or online services such as Google Contacts. The user of the system may also update an email address or facsimile number dynamically to an existing recipient Contact record stored in the Category Database 56 by using the Edit/View Contact 48 button to update the Contact record before the user selects and assigns it as a recipient using numeral 42 and 43 respectively. As soon as the user of the system selects and assigns a recipients(s) the user of the system would then finalize the Send wizard by clicking the Send button indicated as numeral 39. The system would use the respective Fax Server—22 or the Email Server—24 of the server system 18 indicated in FIG. 1 to send the selected Document 22 to the desired recipient(s) facsimile number or email addresses respectfully. Once completely, the system would display a confirmation screen 55 to the user of the system that the message has been successfully sent by the system of the desired recipient(s) facsimile number or email addresses.

FIG. 5—Search to Manage or Send Stored Notes or Documents Flow Chart

FIG. 5 is a flow diagram which illustratively depicts the process by which the user uses a client system login shown in FIG. 2 to access the website and its server system 18 shown in FIG. 1 to search, access and view stored Note(s) or stored Document(s) in accordance with one or more embodiments of the present invention.

In one illustrative embodiment of this invention, and explained in respect to the flow diagram of FIG. 5, a user can use a plurality of client systems in step 400, which include browser 10*a*, mobile device 10*b* to enter the server system 18 over link 16 as shown in FIG. 1 to search and request that particular Note or Document be retrieved and viewed from Database Server 18D. After securely connecting to the server system 18 the system would automatically begin to generate Access Log File 405 which would record the current session activity and securely store this information within the user account for future reference. For additional security, the session with the system will expire and logoff from the user session if no activity is detected for 30 minutes. The user would be required to log back into the system as described in FIG. 2.

Once the user is connected to the the server system 18 the user would be able to use multiple types of tools or methods to search Database Server 18D and selection of Category Databases 50, 52, 54, 56, User Web Pages 100*a*, 100*b*, 100*c* and Category Sub-Databases (Folders) 50*a*-*c*, 52*a*-*c*, 54*a*-*c*, 56*a*-*c* for a particular Note(s) or Document(s) that the user of the system may then view its contents or properties. The user would have multiple tools or methods available to search the Notes or Documents such as BROWSE, FOLDER CONTENTS REPORT or SEARCH TOOL depending on the preference of the user of the server system 18.

Search by Browse Method

A user connected to the server system 18 using a plurality of client systems such as browser 10*a*, mobile device 10*b* would be able to select Category Databases 50, 52, 54, 56 as shown in step 410 then choose to BROWSE in step 415 to further select the appropriate User Web Page 100*a*, 100*b*, 100*c* in step 425 representing the multiple family member profiles as defined by the user of the system. Once the proper User Web Page 100*a*, 100*b*, 100*c* has been selected, the user would select the appropriate Category Sub-Databases (Folders) 50*a-c*, 52*a-c*, 54*a-c*, 56*a-c* in step 430 then select the desired Notes or Documents in step 460 to view its content or properties. See FIG. 5A for further illustration and description of how to Search to Access or View Notes or Documents by using the Browse Method.

Search by Folder Contents Report

A user connected to the server system 18 using a plurality of client systems such as browser 10*a*, mobile device 10*b* would be able to select Category Databases 50, 52, 54, 56 as shown in step 410 then choose to use the FOLDER CONTENTS REPORT in step 440 to generate a complete listing of all Notes and all Documents stored in a particular the Category Databases 50, 52, 54, 56 as shown in step 410 which would ultimately include of all the Notes and Documents stored for User Web Pages 100*a*, 100*b*, 100*c* in step 425 and all the Notes and Documents stored in the Category Sub-Databases (Folders) 50*a-c*, 52*a-c*, 54*a-c*, 56*a-c* in step 430 within the selected Category Database 50, 52, 54, 56 to produce a FOLDER CONTENTS REPORT in step 440 which can be viewed in alphabetical order, by date created or file size so that the user can select the appropriate Notes or Documents in step 460. See FIG. 5B for further explanation and description of Search to Access or View Notes or Documents by using the Folder Content Report Tool.

Search by Search Tool

A user connected to the server system 18 using a plurality of client systems such as browser 10*a*, mobile device 10*b* would be able to select a particular Category Databases 50, 52, 54, 56 as shown in step 410 then choose to use the SEARCH TOOL in step 450 to easily locate the desired Notes or Documents by entering in meta-data or keywords that best describe and would match the properties and meta-data of the Notes or Documents. The SEARCH TOOL would dynamically search all the Category Databases 50, 52, 54, 56 as shown in step 410 as well as all User Web Pages 100*a*, 100*b*, 100*c* in step 425 and all of the Category Sub-Databases (Folders) 50*a-c*, 52*a-c*, 54*a-c*, 56*a-c* in step 430 to resolve the SEARCH QUERY RESULTS in step 455 so that the user can select the appropriate Notes or Documents in step 460. See FIG. 5C for further explanation and description of Search to Access or View Notes or Documents by using the Search Tool.

Once the user of the system is able to select a desired Note or Document in step 460 the user may perform multiple functions from within the system to manage or send the selected Note or Document to an external recipient(s).

Manage a Note

The user of the system may choose to Edit or Delete the selected Note in step 470 as described above in FIG. 3.

E-Notary a Note or Document

The user of the system may choose to E-Notary the selected Note or Document in step 475 as described above in FIG. 4E.

Manage a Document

The user of the system may choose to Edit, Move or Delete the selected Note in step 480 as described above in FIG. 4.

Print

If the user is connected to the system by Browser 10*a* or Mobile Device 10*b* the user would be able to PRINT the selected Note or Document in step 490. Once the user has chosen to Print the selected Note or Document via PRINT, the system sent the selected Note or Document to a desired printer connected to the user's local computer.

Send by Email

Additionally, if the user is connected to the system by browser 10*a*, and/or mobile device 10*b*, the user can then select to SEND the selected Note or Documents to a particular recipient in step 500. Once the user has chosen to Send the selected Note or Document, the user can further decide to send using the EMAIL protocol in step 510. The user of the system would select the appropriate recipient with a valid email address from the Contacts database 56 in FIG. 1 in step 515 then send the selected Note or Document using the Email Server 24 in FIG. 1 to that particular recipient in step 530.

Send by Fax

Additionally, if the user is connected to the system by browser 10*a*, and/or mobile device 10*b*, the user can then select to SEND the selected Note or Documents to a particular recipient in step 500. Once the user has chosen to Send the selected Note or Document, the user can further decide to send using the FAX protocol in step 520. The user of the system would select the appropriate recipient with a valid facsimile number from Contacts database 56 in FIG. 1 in step 525 then send the selected Note or Document using Fax Server 22 in FIG. 1 to that particular recipient in step 530.

As an additional security, audit and compliance feature, the system is able to generate an Access Log File 405 so that the registered user of the system would have a report showing activity pertaining to searching and sending details within the system under their user account credentials.

Figure 5A:
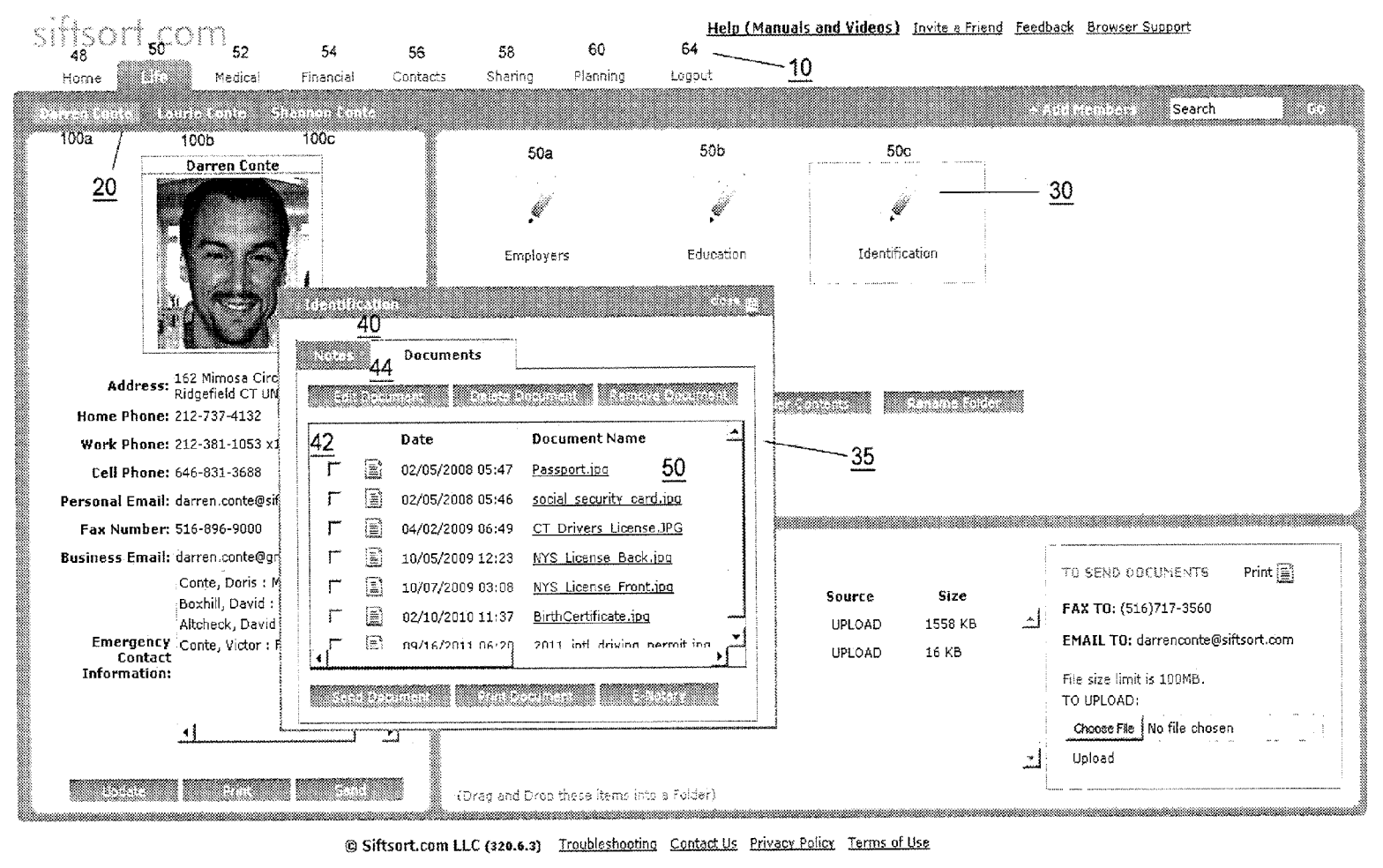

FIG. 5A—Search to Access or View Notes or Documents by Using the Browse Method FIG. 5A is a diagram which illustratively depicts the graphical user interface screen that a user would interact with by using his/her browser 10*a* or his/her mobile device 10*b* to search, select and view a particular Note or Document by browsing within the server system 18 through a particular Category Databases then a particular User Web Pages then a particular Category Sub-Database (Folders), in accordance with one or more embodiments of the present invention.

As previously described, a user can add an unlimited number of Notes and Documents into the server system 18 and can ultimately securely store the Notes and Documents into Category Sub-Category Sub-Databases (Folders) 50*a-c*, 52*a-c*, 54*a-c*, 56*a-c* sorted by User Web Pages. 100*a*, 100*b*, 100*c* with a particular Category Database 50, 52, 54, 56. The user has numerous tools methods available through the system to quickly search and view a particular Note or Document contents or its properties.

After securely accessing the server system 18, the user would choose the desired Category Database indicated a numeral 10 and then select the desired User Web Pages indicated as numeral 20. Then the user would have to choose the desired Category Sub-Database (Folder) indicated as numeral 30 and finally select the desired Notes or Document Tab indicated as numeral 40 from the Open Category Sub-Database (Folder) view indicated as numeral 35. In FIG. 5A, the Documents Tab is selected and displayed. The user of the system can then select the specific Document for viewing its meta-data properties by placing a check in the box indicated as numeral 42 to select the target Document. Once the Document has been selected, the user can click Edit Document button of the Category Sub-Database (Folder) view, indicated as numeral 44 and the properties of the Document would be illustratively displayed by the system within the proprietary database screen described and indicated as numeral 22 in FIG. 4A.

While the user of the system is browsing the Documents Tab indicated as numeral 40 the user may also choose to open the Document in its native application program installed on the users local computer system by clicking the hyperlink indicated as numeral 50 which will instruct the system to open the Document for viewing by launching a native application program such as Microsoft Word or Picture Viewer to view such a Document.

Respectively, the user may choose to select the Notes Tab as indicated as numeral 40 while browsing for a particular Note, and the viewing procedure and functionality would be similar to that previously described to viewing a selected Document as the user would select the desired Note by respectfully placing a check in the box indicated as numeral 42 and respectfully click the Edit Note button of the Category Sub-Database (Folder) view indicated as numeral 44 similar to the Edit Documents button numeral 44. Then the system would respectfully illustratively display the properties of the selected Note using the proprietary database screen described and indicated as numeral 30 in FIG. 3A.

While the system enables the viewing of Documents and its content properties by either the proprietary database screen indicated as numeral 22 in FIG. 4A or a native application program installed on the users local computer, the system only allows the viewing of Notes and its content properties with the proprietary database screen indicated as numeral 30 in FIG. 3A and not with native applications installed on the users local computer.

Figure 5B:
FIG. 5B is a diagram which illustratively depicts a graphical user interface screen by which a user may search, select or view stored documents in accordance with one or more embodiments of the present invention.

FIG. 5B—Search to Access or View Notes or Documents by Using the Folder Content Report Tool FIG. 5B is a diagram which illustratively depicts the graphical user interface screen that a user would interact with by using his/her browser 10*a* or his/her mobile device 10*b* to search, select and view a particular Note or Document by using the Folder Contents Report tool in the server system 18 through a particular Category Databases then any User Web Pages in accordance with one or more embodiments of the present invention.

As previously described, a user can add an unlimited number of Notes and Documents into the server system 18 and can ultimately securely store the Notes and Documents into Category Sub-Category Sub-Databases (Folders) 50*a-c*, 52*a-c*, 54*a-c*, 56*a-c* sorted by User Web Pages. 100*a*, 100*b*, 100*c* with a particular Category Database 50, 52, 54, 56. The user has numerous tools methods available through the system to quickly search and view a particular Note or Document contents or its properties.

After securely accessing the system, the user of the system would select a Category Database indicated as 10 more specifically 50, 52, 54, 56 and then select any User Web Pages 20 and then select the Folder Contents Report tool indicated a numeral 40. The Folder Contents Report tool has the ability to search the selected Category Databases 10, and all the User Web Pages indicated as numeral 20 and all Category Sub-Databases (Folders) indicated as numeral 30 for all Notes and Documents stored within each respective database.

After the tool has compiled its Folder Contents Report Results View indicated as numeral 45, the user would have to option to select the desired Notes or Document Tab indicated as numeral 70 and in FIG. 5B, the Notes Tab is selected and displayed. The user of the system would then select the specific Note, by clicking on the hyperlink indicated in numeral 72 then the system would respectfully illustratively display the properties of the selected Note using the proprietary database screen described and indicated as numeral 30 in FIG. 3A. If the user of the system wanted to view the specific location or Category Sub-Database (Folder) of the desired Note, the user could click on the hyperlink indicated as numeral 75 which would open the Category Sub-Database (Folder) as indicated in FIG. 3C displaying the Notes Tab and subsequently all the Notes stored within the target Category Sub-Database (Folder) referenced in the hyperlink as numeral 75, providing the user with additional functionality for managing the Note.

Respectively, the user may choose to select the Documents Tab as indicated as numeral 70 while browsing for a particular Document, and the viewing procedure and functionality would be similar to that previously described to viewing a selected Note as the user would select the desired Document by respectfully clicking the hyperlink indicated as numeral 72 which would open the Document in its native application program (e.g., Microsoft Word, Picture Viewer) installed on the users local computer system to view such a Document. Additionally, if the user of the system wanted to open the target Category Sub-Database (Folder) where the specific Document is stored in the system, the user can click the hyperlink indicated as numeral 75 which would open the Category Sub-Database (Folder) as indicated in FIG. 4B displaying the Documents Tab and subsequently all the Documents stored within the target Category Sub-Database (Folder) referenced in the hyperlink as numeral 75, providing the user with additional functionality for managing the Document.

If the user of the system wanted to PRINT the Folder Contents Report Results view indicated as numeral 45, the user would click the Print button indicated as numeral 80 to print to a printer installed to their local computer. The Print button indicated as numeral 80 is available to the user of the system on both the Notes and the Documents Tab in the Folder Contents Report Results View indicated as numeral 45.

Figure 5C:
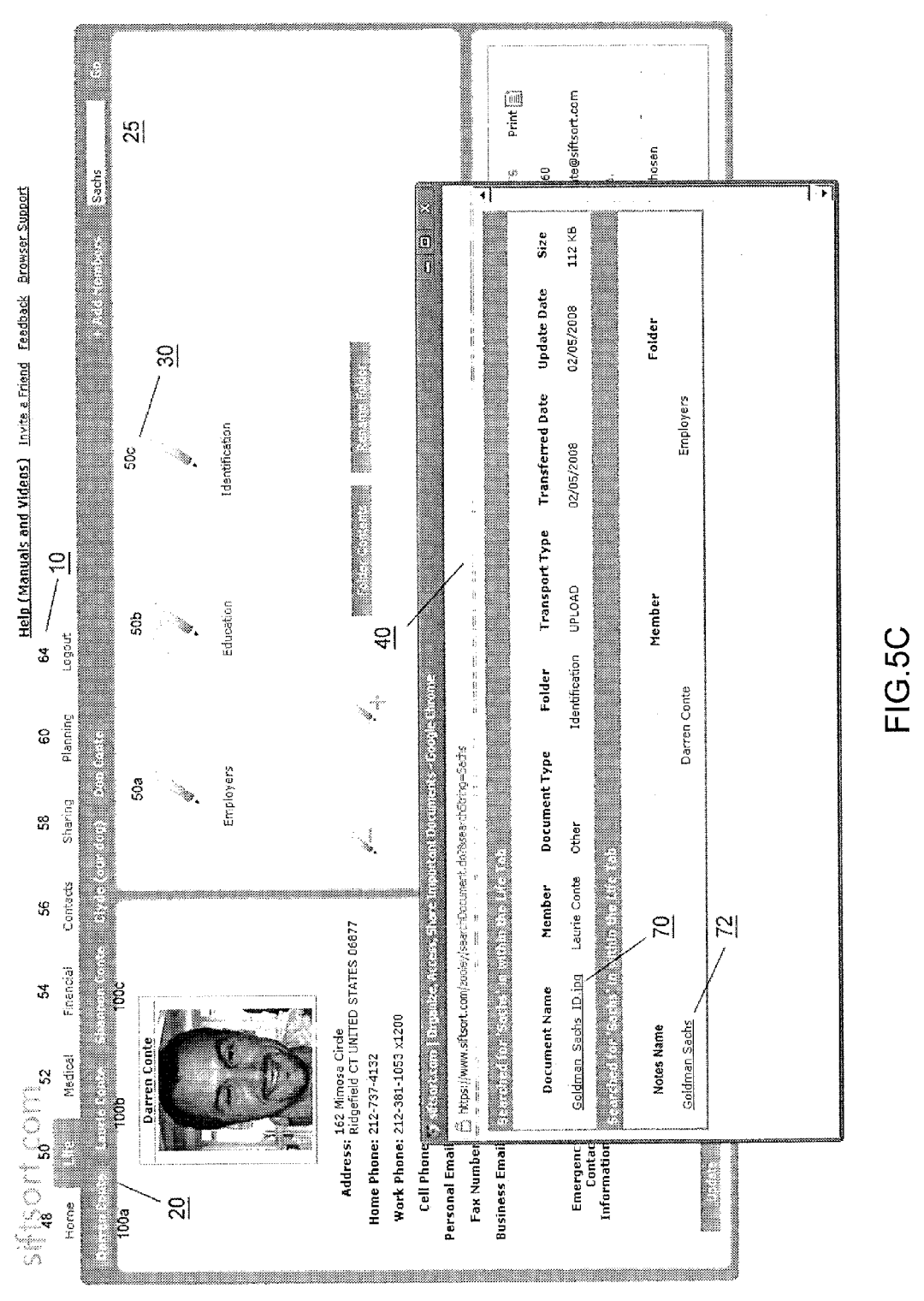

FIG. 5C—Search to Access or View Notes or Documents by using the Search Tool FIG. 5C is a diagram which illustratively depicts the graphical user interface screen that a user would interact with by using his/her browser 10*a* or his/her mobile device 10*b* to search, select and view a particular Note or Document by using the Search tool in server system 18 through a particular Category Databases in accordance with one or more embodiments of the present invention.

As previously described, a user can add an unlimited number of Notes and Documents into the server system 18 and can ultimately securely store the Notes and Documents into Category Sub-Category Sub-Databases (Folders) 50*a-c*, 52*a-c*, 54*a-c*, 56*a-c* sorted by User Web Pages. 100*a*, 100*b*, 100*c* with a particular Category Database 50, 52, 54, 56. The user has numerous tools methods available through the system to quickly search and view a particular Note or Document contents or its properties.

After securely accessing the system, the user of the system would select a Category Database 10 more specifically 50, 52, 54, and 56 and then select the Search tool 25 to enter in a string of meta-data variables that are used to help locate the desired Notes or Documents. In FIG. 5C, the term "Sachs" was entered into the Search Tool. The Search tool has the ability to search selected Category Databases 10, and all the User Web Pages indicated as numeral 20 and all Category Sub-Databases (Folders) indicated as numeral 30 for all Notes and Documents stored within each respective database, that match the meta-data string entered in Search Tool 25.

After the Search tool has finished, the user would choose the specific Note or Document from the Search Report Results view indicated as numeral 40 by clicking on hyperlink 70 or 72 to view the Document or Note respectively. If the user chooses to open the Document by using the hyperlink 70 the Document would open in its native application program installed on the user's local computer system such as Microsoft Word or Picture Viewer. If the user selected the hyperlink 72 then the system would illustratively display the properties of the selected Note using the proprietary database screen described and indicated as numeral 30 in FIG. 3A.

Figure 6:
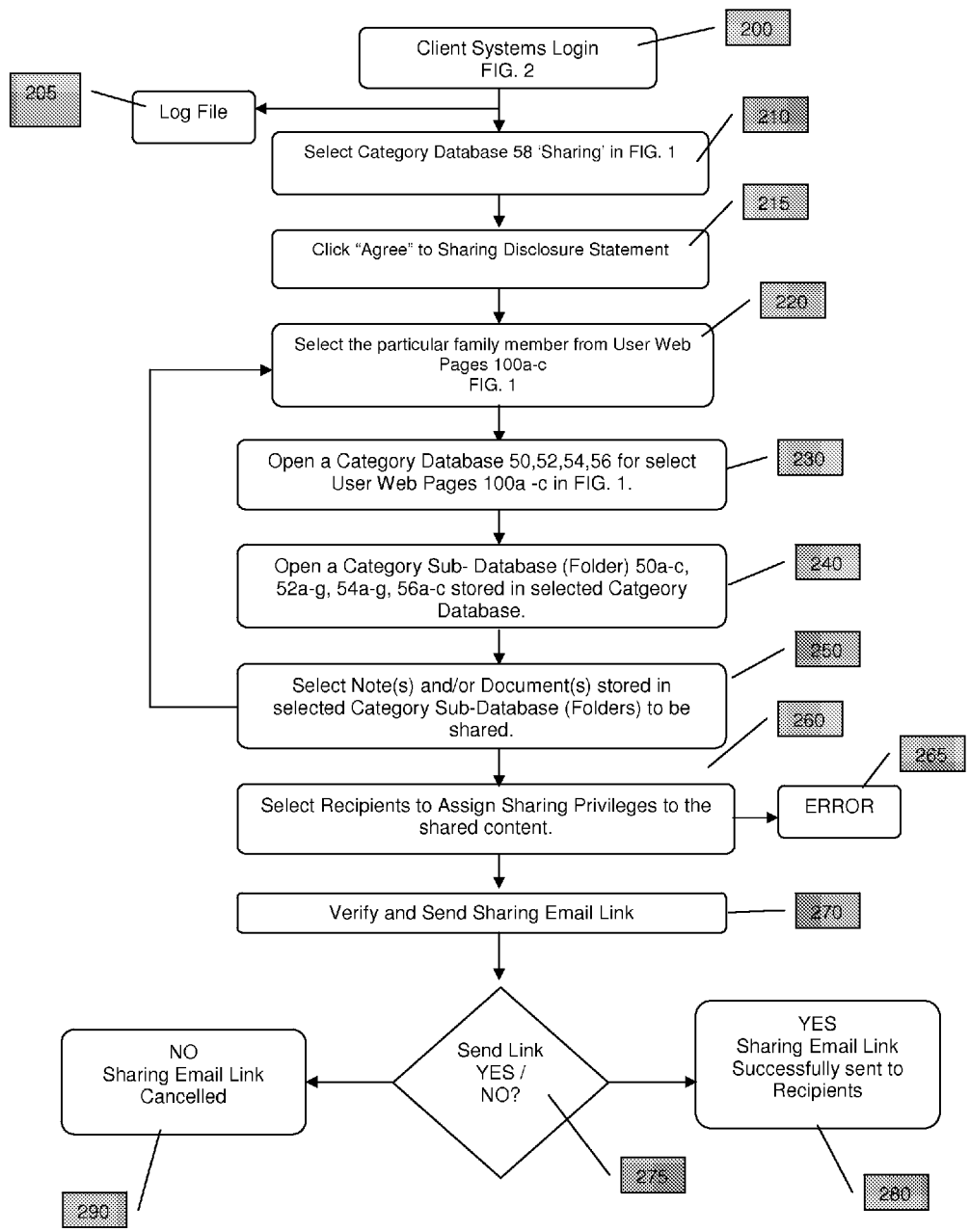
FIG. 6 illustrates a flow diagram depicting the process by which the user uses a client system login shown in FIG. 2 to access the website and its server system shown in FIG. 1 to share particular Note(s) and Document(s) stores within a particular Category Database for a specific User Web Page in accordance with one or more embodiments of the present invention.

FIG. 6—Sharing of Notes and Documents Flow Chart

FIG. 6 is a flow diagram which illustratively depicts the process by which the user uses a client system login shown in FIG. 2 to access the website and server system 18 shown in FIG. 1 to share particular Note(s) and Document(s) stores within a particular Category Databases 50a-c, 52a-g, 54a-g, 56a-b for a specific User Web Pages 100a, 100b, 100c in accordance with the teachings of this invention.

In one illustrative embodiment of the present invention, and explained in respect to flow diagram FIG. 6, a user can use a plurality of client systems in step 200, which include browser 10a, mobile device 10b and facsimile machine 10d to enter the server system 18 over the link 16 as shown in FIG. 1 to share particular Notes or Documents stored in a particular Category Databases 50, 52, 54, 56 for a specific User Web Pages 100a, 100b, 100c as shown in FIG. 1. After securely connecting to the server system 18 the system would automatically begin to generate a Log File 205 which would record current session activity and securely store this information within the system for future reference. For additional security, the session with the system session will expire if no activity is detected for 30 minutes. The user would be required to log back into the system as described in FIG. 2. Continuing, the user would select the Category Databases 58 known as 'Sharing' 210. To enable the sharing feature, the user would have to "Agree" to the Sharing Disclosure Statement 215 which would activate the sharing capabilities for the users account. Once the sharing capabilities have been activated, the user would then be able to select the specific family member in step 220 or User Web Pages 100a, 100b, and 100c as shown in FIG. 1. Once a specific family member or User Web Pages 100a, 100b, 100c has been selected, the user would then have to select and open in step 230 a specific Category Database 50, 52, 54, 56 in FIG. 1 for that family member or User Web Pages 100a, 100b, 100c. The user would then have to select and open 240 a specific Folder or Category Sub-Database 50a-c, 52a-g, 54a-g or 56a-b in FIG. 1 stored within the selected Category Databases 50, 52, 54, 56 in FIG. 1. The user would then have to select the specific Notes and/or Documents 250 that are stored within the selected Category Sub-Database 50a-c, 52a-g, 54a-g or 56a-b to be shared. As these Notes and Documents are selected to be shared, the Notes and Documents are placed in a sharing queue awaiting a recipient(s) to be assigned and granted sharing privileges to them. The user could then repeat steps 220-250 and add or remove Notes and Documents to the sharing queue, which awaits recipients to be assigned sharing privileges.

As explained previously in FIG. 3B, a user has the ability to store personal contact information of family, friends and colleagues in the system, specifically in Category Database 56 known as 'Contacts'. Within these contact records the user would store email addresses specific to each contact. If a valid email address is not present in the contact record after the user has selected the contact 260, an alarm 265 would sound warning the user that the sharing feature requires a valid email address to be present for all intended sharing recipients. The user would then have the opportunity to add a valid email address by going directly to the Category Database 56 known as 'Contacts' and adding the email address to the record of any intended sharing recipient. Once all intended sharing recipients have at least one valid email address, the user may then assign sharing privileges to the specific Notes and Documents that he/she wishes to share with the intended recipients 250. Once the user has selected all the specific Notes and Documents in the User Web Pages 100a, 100b, 100c, the user would then have to Verify and Send a sharing email link 270. This process allows the user to review the contact names who have been assigned sharing privileges before the sharing email link is sent to the intended recipients. If the user chooses to send the email link 275, then an encrypted sharing email link would be successfully sent by the system to the intended contact records email addresses 280. If the user does not wish to send the sharing email link 290, no sharing email link would be sent by the system.

FIG. 6.1—Accessing Shared Notes and Documents Flow Chart

FIG. 6.1 is a flow diagram which illustratively depicts the process by which an intended sharing recipient uses a client system login shown in FIG. 2 to access the website and server system 18 shown in FIG. 1 to securely access the shared Notes or Documents stored in particular Category Sub-Databases (Folders) for specific family members in accordance with one or more embodiments of the present invention.

In one illustrative embodiment of the present invention, as depicted by FIG. 6.1, intended sharing recipients can use a plurality of client systems in step 10, which include browser 10a, mobile device 10b to enter the server system 18 over link 16 as shown in FIG. 1 to access shared Notes or Documents stored in the Category Databases 50, 52, 54, 56 as depicted in FIG. 1. Once the intended sharing recipient has received the encrypted email link from step 270 in FIG. 6, the recipient can click the encrypted email link to securely connect to the system 20. When attempting to access the system, the intended sharing recipient would be presented with two authentication levels of security. First level of security 30 would require the intended sharing recipient to answer a specific question regarding the user who had sent the encrypted email link. The correct answer to this question is listed and hidden within a list of twenty false answers that the intended sharing recipient must select from. The recipient would proceed to the Sharing Authentication Level 2 security question 40 which would require the intended sharing recipient to answer another specific question regarding the user who had sent the encrypted email link. The correct answer to this question is listed and hidden within a list of twenty false answers that the intended sharing recipient must select from. If both Sharing Authentication Level 1 and Sharing Authentication Level 2 question are not correctly answered, an alarm 45 would sound and warn the intended sharing recipient that the encrypted link will expire if the answer to the Sharing Authentication Level 1 and Sharing Authentication Level 2 security question are not properly answered by the third attempt and ultimately lock out the intended sharing recipient from using the system. The intended sharing recipient would then be instructed by the system 48 to contact the user who had sent the encrypted email link and ask them to generate a new encrypted email link by repeating the steps in FIG. 6. If the intended sharing recipient correctly answers the Sharing Authentication Level 1 and Sharing Authentication Level 2 security questions within three attempts the intended sharing recipient would be allowed securely into the system and have read only access to the Folder Report 50 showing the particular shared Notes and Documents within the specifically shared Category Database 50, 52, 54, 56. As an additional security, audit and compliance feature, the system is able to generated a Log File 55 so that the registered user of the system would have a report showing access details pertaining to the all the visitors of the system who accessed the shared Notes and Documents. For additional security, the session with the system will expire and logoff from the user session if no activity is detected for 30 minutes. The user would be required to log back into the system as described in FIG. 2.

FIG. 6A—Typical Sharing Email Message

FIG. 6A is a diagram which illustratively depicts the graphical user interface screen that an intended sharing recipient would interact with by using his/her browser 10a or his/her mobile device 10b to receive an encrypted email link instructing the recipient to access any shared Notes and Documents within all Category Databases 50, 52, 54, 56 in the server system shown in FIG. 1, in accordance with one or more embodiments of the present invention.

As previously described in FIG. 6 and FIG. 2I, a user can send an encrypted email link to a recipient 10 name stored in the Category Database 56 known as 'Contacts' in to allow secure sharing of Notes and Documents stored within the system. FIG. 6A shows a typical email communication letter sent instructing the intended sharing recipient how to securely access the system using encrypted sharing link 20. The intended recipient would use their browser to click on this link to securely access the system and view the shared Notes or Documents.

FIG. 6B—Accessing Shared Notes and Documents

FIG. 6B is a diagram which illustratively depicts the graphical user interface screen that an intended sharing recipient would interact with by using his/her browser 10a or his/her mobile device 10b to securely authenticate in order to access the shared Notes and Documents stored within particular Category Sub-Databases (Folders) in the server system shown in FIG. 1, in accordance with one or more embodiments of the present invention.

Once the intended sharing recipient has received the encrypted email link, the recipient can click the encrypted email link to securely connect to the system. When attempting to access the system, the intended sharing recipient would be presented with two authentication levels of security. First level of security 10 requires the intended sharing recipient to answer a specific question regarding the user who had sent the encrypted email link. The correct answer to this question is listed and hidden within a list of twenty false answers that the intended sharing recipient must select from. Then he/she would proceed to the Sharing Authentication Level 2 security question 20 which would require the intended sharing recipient to answer another specific question regarding the user who had sent the encrypted email link. The correct answer to this question is listed and hidden within a list of twenty false answers that the intended sharing recipient must select from. By clicking Verify Details 30 button, system would authenticate the security and if answered correctly, the intended recipient would enter securely into the system and have read only access to the Folder Report showing the shared Notes and Documents for the specifically shared Category Database 50, 52, 54, 56.

FIG. 6C—Typical Shared Folder Report

FIG. 6C is a diagram which illustratively depicts the graphical user interface screen that an intended sharing recipient would interact with by using his/her browser 10a or his/her mobile device 10b to securely view read only access the shared Notes and Documents stored within particular Category Sub-Databases (Folders) in the server system shown in FIG. 1, in accordance with one or more embodiments of the present invention.

As previously described, an intended recipient who has been sent an encrypted email link may access the system after successfully answering the authentication security questions as shown in FIG. 6B. After the questions have been successfully answered, the recipient would be granted secure access to the system and presented with Folder Report 10 showing all the shared Notes and Documents for the intended Category Databases 50, 52, 54, 56 shared by the user of the system. The recipient can choose to view Notes TAB 20 or Documents TAB 30 which show all shared Notes and Documents 40 respectively. The recipient may click on the records or document links 45 to view each Note or Document. When the recipient is finished viewing shared content 40 the user can logoff the system 50 to end the session.

FIG. 7—Toll Free Customer Center Access Flow Chart

FIG. 7 is a flow diagram which illustratively depicts the process by which a user does not have access to client system Browser 10a and Mobile Browser 10b shown in FIG. 1 to access the website and server system 18 shown in FIG. 1 and described in FIG. 2. Such a user may access server system 18 by requesting Toll-Free Customer Assistance Center 10c in FIG. 1 to send user Notes or Documents on his/her behalf in accordance with one or more embodiments of the present invention.

In one illustrative embodiment of the present invention, as explained by FIG. 7, a user with the ability to use other client systems as shown in FIG. 1 such as browser 10a, mobile device 10b to access the server system 18 can use the client system in step 10 in FIG. 7. Client system may be accessed via Toll-Free Customer Center 10c in FIG. 1 and a request that the Toll-Free Customer Center securely access the server system 18 on his/her behalf over link 16. Protocols are inherent in the system which would secure the connection to the server system 18 in the form of encrypted keys that are generated by the system and provided to the Toll-Free Customer Center during the initial communication link. A user requesting Toll-Free Customer Center accessing the server system 18 cannot do so unless they are an existing subscriber to the server system 18 and have completed the New User Process in step 180 as shown in FIG. 2. If the user is existing to the system, the New User Process allowed the user to setup a personal account on the system and store pertinent information such as identification and billing information as well as define user credentials and security challenge questions which will be used to securely access the server system 18 by Toll-Free Customer Center 10c. When accessing the server system 18 using the Toll-Free Customer Center 10c the Toll-Free Customer Center in step 20 will be presented with the Customer Representative Authentication Level 1 procedure to ensure proper identification and secure login to the server system 18 over communication link 16 shown in FIG. 1. This step will identify the representative attempting to login to the system and once successfully authentication is established, a Log File 22 will begin to record the session of the Customer Center representative, for security purposes.

In step 30 the User Authentication Level 1 will prompt the Toll-Free Customer Center representative to ask the user accessing the server system 18 to provide specific credentials that were defined in the New User Process in step 180 in FIG. 2, specifically last name. The Toll-Free Customer Center representative will use the SEARCH TOOL 40 to search the entire system database for all users who have an identical match for that specific last name. Once the closest match is found by the Toll-Free Customer Center representative, the user will be asked to further identify them self by providing their current billing address that is stored in the system. This will help the Toll-Free Customer Center representative properly identify the user if a duplicate last name is found. If the last name provided by the user in step 30 does not exist in the system, then an alarm will sound in step 45 prompting the Toll-Free Customer Center representative to ask the user to provide the for the correct spelling of the last name. This will be repeated until a valid last name is identified that match an account in the system database. The Toll-Free Customer Center representative will verify the credentials with the system and if the credentials are accurately defined in step 30, then the operator will select and use the identified account and proceed to step 50 which is the User Authentication Level 2. The system will prompt the Toll-Free Customer Center representative in step 50 to ask the user for more specific information defined in the New User Process in step 180 in FIG. 2, such as login identification and email address on file in the system. The Toll-Free Customer Center representative would use the LOOKUP TOOL 60 to search the account of the user to match the login identification and email address provided by the user and if successful, the system will retrieve three of the ten random security challenge questions from the user account, which were established during the New User Process in step 180 in FIG. 2. If the credentials provided by the user in step 50 are incorrect, then an alarm will sound in step 65 asking the Toll-Free Customer Center representative to repeat step 50. This will be repeated until the login identification and email address are properly identified. Once the system has successfully verified the credentials using the LOOKUP TOOL 60, the Toll-Free Customer Center representative will ask the user to properly answer the three security challenge questions using the ADVANCED VERIFICATION TOOL 70. If these security challenge questions are not correctly answered by the user, the Toll-Free Customer Center representative can retrieve three additional security challenge questions from the user account using the MORE LOOKUP 75. This will be repeated until the user has properly answered all ten security challenge questions. Once the security challenge questions are correctly answered by the user in step 70, the Toll-Free Customer Center representative will be granted viewing capabilities to the Notes and Documents displayed in a User Content Report 80 on behalf of the user.

The system is intentionally designed and programmed so that the Toll-Free Customer Center representative can not read any sensitive data stored within the users Notes and Documents in the system. Viewing capabilities will permit the Toll-Free Customer Center representative to view Note and Document names and descriptions that would help the Toll-Free Customer Center representative properly identify Notes and Documents that the user is requesting having sent by the Toll-Free Customer Center representative on their behalf via Fax Server—22 or Email Server—24 in step 90. This is to ensure proper security measures are in place to protect highly sensitive user data stored within the system. Should the user require the Toll-Free Customer Center representative to open a Note or Document to read its sensitive data, the Toll-Free Customer Center representative would be required to use the ACTIVATE TOOL 85 to have the user answer a specific security challenge question defined in the New User Process in step 180 in FIG. 2 which if answered correctly, would unlock all the Notes and Documents in the user account and display in a Content Report 95 with reading and viewing capabilities for the Toll-Free Customer Center representative. With this Content Report 95, the user can instruct the Toll-Free Customer Center representative to open up and read the specific personal contents of any Note or Document that is stored in the user account and securely send via Fax Server—22 or Email Server—24 in step 90. After the Toll-Free Customer Center representative has successfully sent all the Notes and Documents requested by the user, he/she would logoff and locks the user account 100 for security purposes and return to the Customer Representative Authentication Login screen 20 and either wait for another call from another user or logoff the system entirely 25.

Figure 7A:
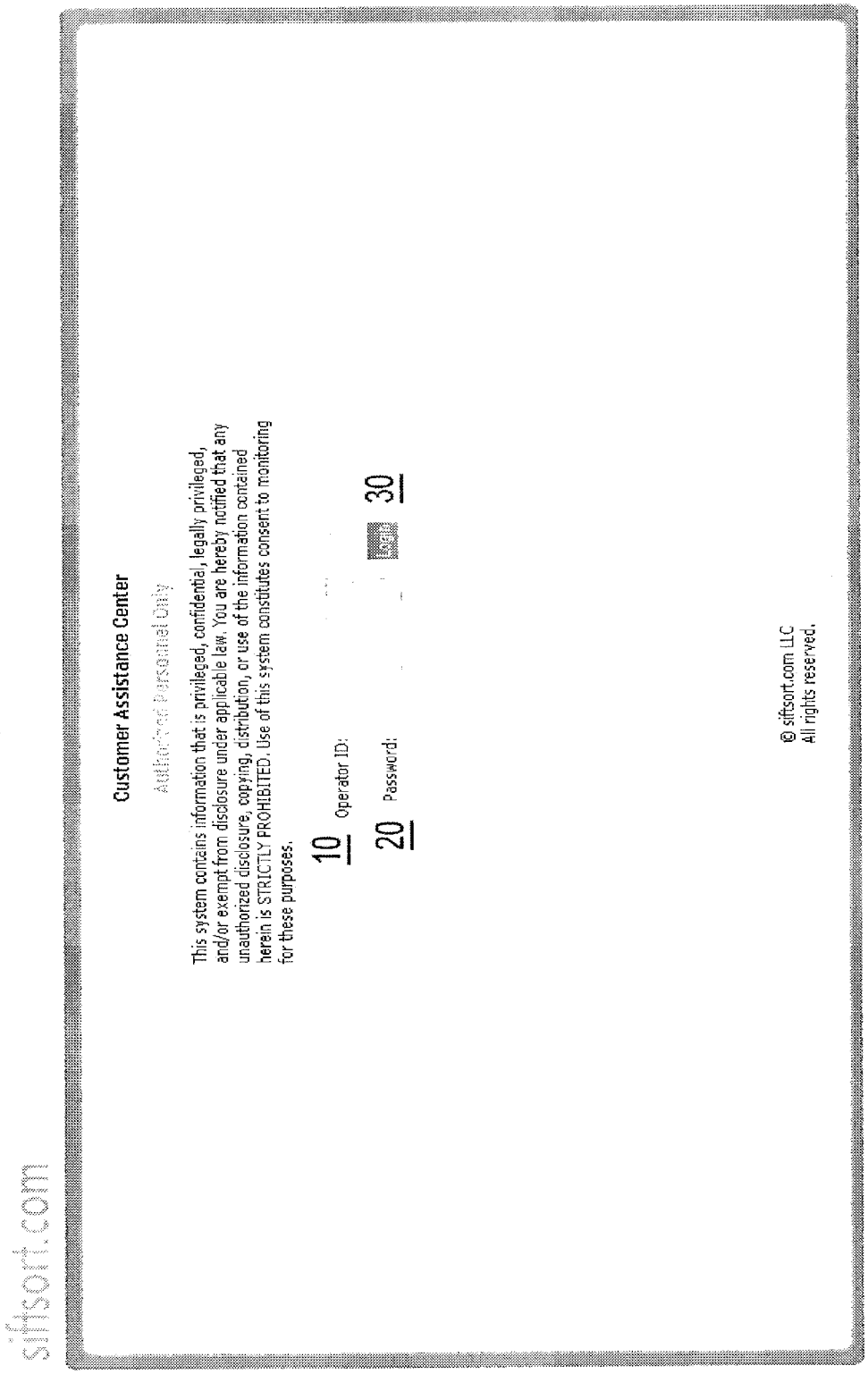
FIG. 7A is the graphical user interface which depicts a toll free customer center access screen in accordance with one or more embodiments of the present invention.

FIG. 7A—Toll Free Customer Center Access Screen

FIG. 7A is the graphical user interface which illustratively depicts the process by which a user does not have access to the a client system Browser 10a and Mobile Browser 10b shown in FIG. 1 to access the website and its server system 18 shown in FIG. 1 and described in FIG. 2 but can access the server system 18 by requesting the Toll-Free Customer Assistance Center 10c in FIG. 1 to access the server system 18 and the stored Notes and Documents on behalf of the user, in accordance with one or more embodiments of the present invention.

In one illustrative embodiment of the present invention, as represented by flow diagram of FIG. 7, a user with the access to use other client systems as shown in FIG. 1 such as browser 10a, mobile device 10b to access the server system 18 can use the client system known as a Toll-Free Customer Center 10c in FIG. 1 and request that the Toll-Free Customer Center securely access the server system 18 on his/her behalf. Before an authorized Toll-Free Customer Center representative can access the user account, for security and monitoring purposes, the authorized Toll-Free Customer Center representative would be required to logon to the system using an assigned Operator Identification number 10 which would be a unique identifier that would authenticate the Toll-Free Customer Center representative as an authorized user of the system and allow the system to monitor the use of the Toll-Free Customer Center representative after it is accessed. This unique identifier would be assigned by his/her supervisor. Once the Operator Identification number has been entered into the system, the Toll-Free Customer Center representative would then have to enter his/her unique password 20 assigned to his/her account. After the Toll-Free Customer Center representative has entered his/her credentials, the can use the Login button 30 to access the system. Once the Toll-Free Customer Center representative has successfully logged into the system, the system will then begin to monitor in a log file the actions of the Toll-Free Customer Center representative. Details such as login date and time and which user had requested the Toll-Free Customer Center representative to access their account on their behalf would be captured in the log file. Then after the Toll-Free Customer Center representative had accessed the user account, the log file would capture which Notes and Documents where viewed, accessed or sent using Fax Server—22 or Email Server—24 protocols during the session. The system would continue to monitor the Toll-Free Customer Center representative actions until he/she has successfully logged out of the system, in which the log file would be stored on the system for security and future auditing purposes.

FIG. 7B—Toll Free Customer Center User Search Screen

FIG. 7B is the graphical user interface which illustratively depicts the process by which a user does not have access to the a client system Browser 10*a* and Mobile Browser 10*b* shown in FIG. 1 to access the website and its server system 18 shown in FIG. 1 and described in FIG. 2 but can access the server system 18 by requesting the Toll-Free Customer Assistance Center 10*c* in FIG. 1 to access the server system 18 and the stored Notes and Documents on behalf of the user, in accordance with one or more embodiments of the present invention.

In one illustrative embodiment of the present invention, and explained in respect to the flow diagram of FIG. 7, a user with the absent to use other client systems as shown in FIG. 1 such as a browser 10*a*, a mobile device 10*b* to access the server system 18 can use the client system known as a Toll-Free Customer Center 10*c* in FIG. 1 and request that the Toll-Free Customer Center securely access the server system 18 on his/her behalf to send Notes or Documents stored within his/her account without compromising the security to their account by having to provide logon credentials that would be used to access the system through a browser 10*a*, mobile device 10*b* like username and password. This process will leverage the security challenge questions setup by the user during the New User Process in step 180 in FIG. 2. When a user calls the Toll-Free Customer Center, the representative would ask the caller to identify themselves by asking for their last name and then entering their last name 10 into the system. Once entered into the search field, the Toll-Free Customer Center representative would use the search tool 20 to search the entire system for accounts that closely match that of the caller's last name. Once the system returns the complete listing 30 of all accounts that include the same last name of the caller, the Toll-Free Customer Center representative would ask the caller to further identify themselves by providing the current billing address associated with their account, which is viewable in the search results shown in numeral 30. Once an exact match is located in the results 30, the Toll-Free Customer Center representative would select that particular account by using the select box 35 and clicking the USE tool 40 to enter the user account. At any time, the Toll-Free Customer Center representative can completely disconnect from the system and end of his/her session by clicking the LOGOFF SYSTEM tool 50 which would securely logoff the representative and end the monitoring session as explained in FIG. 7A and shown as the Log File as numeral 22 in FIG. 7.

Figure 7C:
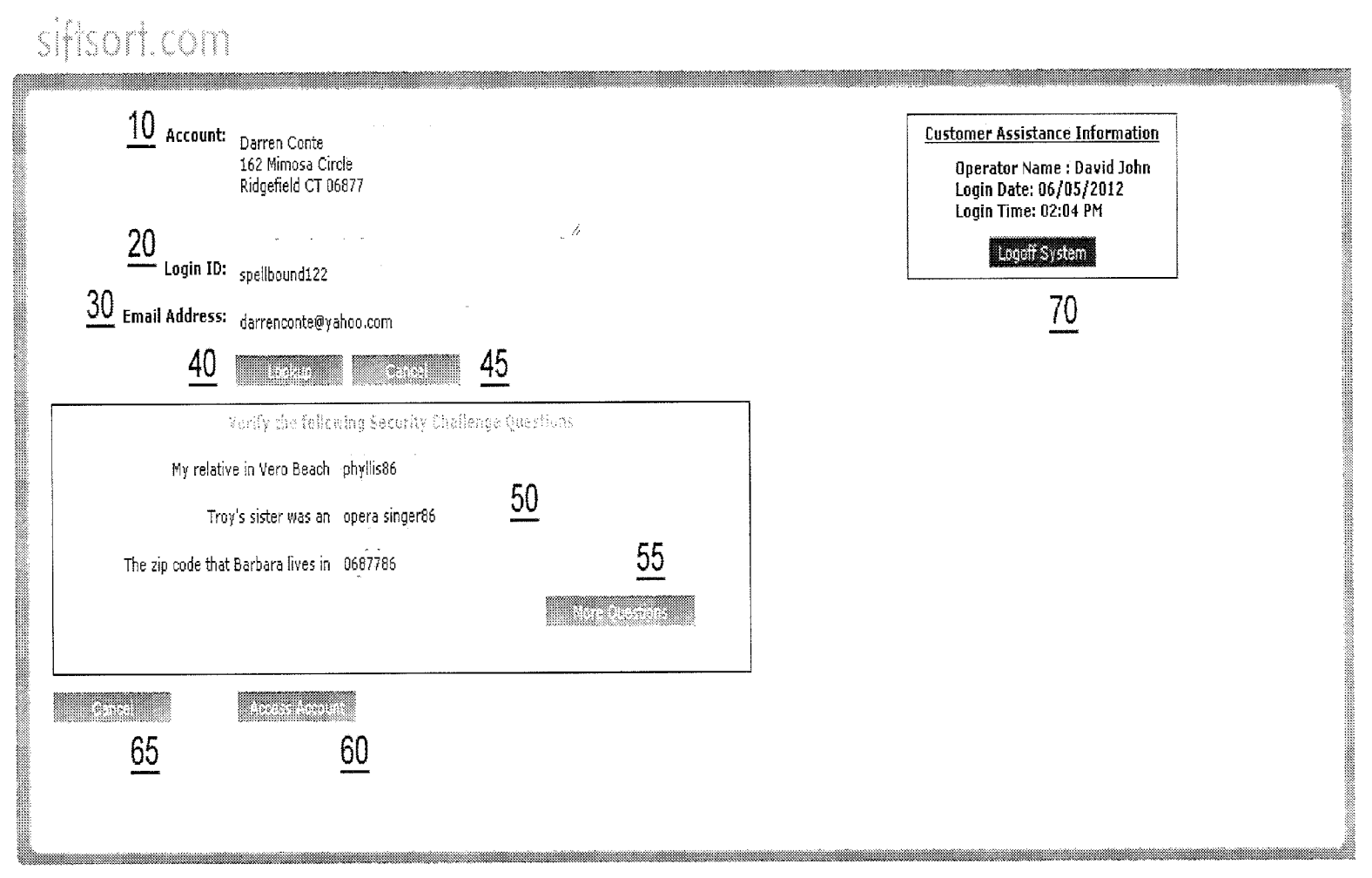

FIG. 7C—Toll Free Customer Center User Authentication Screen

FIG. 7C is the graphical user interface which illustratively depicts the process by which a user does not have access to the a client system Browser 10*a* and Mobile Browser 10*b* shown in FIG. 1 to access the website and its server system 18 shown in FIG. 1 and described in FIG. 2 but can access the server system 18 by requesting Toll-Free Customer Assistance Center 10*c* in FIG. 1 to access the server system 18 and the stored Notes and Documents on behalf of the user, in accordance with one or more embodiments of the present invention.

In one illustrative embodiment of the present invention, and explained in respect to the flow diagram of FIG. 7, a user with the ability to use other client systems as shown in FIG. 1 such as a browser 10*a*, a mobile device 10*b* to access the server system 18 can use the client system known as a Toll-Free Customer Center 10*c* in FIG. 1 and request that the Toll-Free Customer Center securely access the server system 18 on his/her behalf to send Notes or Documents stored within his/her account without compromising the security to their account by having to provide logon credentials that would be used to access the system through a browser 10*a*, mobile device 10*b* like username and password. This process will leverage the security challenge questions setup by the user during the New User Process in step 180 in FIG. 2. After the Toll-Free Customer Center representative successfully selects the correct user account from FIG. 7B, the system would pull account information 10 from the previous screen and then prompt the Toll-Free Customer Center representative to ask the caller to identify Login ID 20 and email address 30 on file so that the Toll-Free Customer Center representative can use to lookup tool 40 to pull three random security challenge questions 50 from the user account. At any time, the Toll-Free Customer Center representative can cancel the lookup of user information to start over or clear the values entered in numeral 20 and 30 by clicking Cancel button 45.

After a successful lookup in numeral 40 the Toll-Free Customer Center representative will now ask the caller to answer the three security challenge questions 50 that were retrieved from the system, in order to securely access the user account. If the caller does not properly answer the three security challenge questions, the Toll-Free Customer Center representative would be able to pull three more random security challenge questions from the user account by using the MORE QUESTIONS tool 55 to further validate the caller identification before accessing the user account. Once the user has successfully answered the security challenge questions, the Toll-Free Customer Center representative can then access the account using the ACCESS ACCOUNT tool 60. At any time, the Toll-Free Customer Center representative can cancel the lookup of user information to start over or clear the values entered in numeral 20 and 30 by clicking the Cancel button 65.

Once ACCESS ACCOUNT tool 60 is used by the Toll-Free Customer Center representative, the system will generate a Folder Content Report listing all Notes and Documents for this specific user account which will be explained in FIG. 7D. At anytime, the Toll-Free Customer Center representative can completely disconnect from the system and end of his/her session by clicking the LOGOFF SYSTEM tool 70 which would securely logoff the representative and end the monitoring session as explained in FIG. 7A and shown as the Log File as numeral 22 in FIG. 7.

FIG. 7D—Toll Free Customer Center Viewing Notes and Documents

FIG. 7D is the graphical user interface which illustratively depicts the process by which a user does not have access to the a client system Browser 10*a* and Mobile Browser 10*b* shown in FIG. 1 to access the website and its server system 18 shown in FIG. 1 and described in FIG. 2 but can access the server system 18 by requesting the Toll-Free Customer Assistance Center 10*c* in FIG. 1 to access the server system 18 and the stored Notes and Documents on behalf of the user, in accordance with one or more embodiments of the present invention.

In one illustrative embodiment of the present invention, and explained in respect to the flow diagram of FIG. 7, a user with the ability to use other client systems as shown in FIG. 1 such as browser 10*a*, mobile device 10*b* to access the server system 18 can use the client system known as Toll-Free Customer Center 10*c* in FIG. 1 and request that the Toll-Free Customer Center securely access the server system 18 on his/her behalf to send Notes or Documents stored within his/her account without compromising the security to their account. The user's logon credentials would be used to access the system through browser 10*a*, mobile device 10*b*, similar to a username and password. This process will leverage the security challenge questions setup by the user during the New User Process in step 180 in FIG. 2.

After the caller has successfully answered the security challenge questions shown as numeral 50 in FIG. 7C, a Folder Content Report would be generated for the Toll-Free Customer Center representative shown at numeral 5 in FIG. 7D. The Folder Content Report would list all Notes and Documents stored within the user account for each specific Category Database 50, 52, 54, 56 shown in FIG. 1, and listed in a pull-down menu 10, which can be selected by the Toll-Free Customer Center representative and the user or caller may then instruct the Toll-Free Customer Center representative to select the specific Notes Tab or Document Tab 15 from the Folder Contents Report Results view illustratively illustrated as numeral 20, which would be stored within a specific Category Database 10 selected. The Toll-Free Customer Center representative would then select the specific Note or Document requested by the user of the system, by clicking on the select box 25 to have the Note or Document sent over a secure transmission using the SEND tool 30 to a designated recipient using either the Fax Server—22 or the Email Server—24 protocols as shown in FIG. 1. Sending functions indicated as numeral 30 will be further described in FIG. 7F.

As an additional security precaution, the system would monitor the Toll-Free Customer Center representative activities while assisting the user or caller, and the Toll-Free Customer Center representative would not have the ability to read any personal information stored within the specific Notes or Documents. If the caller instructs the Toll-Free Customer Center representative to open a specific Note or Document and read its personal contents or properties, the Toll-Free Customer Center representative would be required to ask the user of the system, or the caller to answer a random security challenge question from a pull-down menu 40. The security challenge questions were established by the user of the system during the New Registration Process indicated in FIG. 2B2 and are stored in the system. After selecting a random security challenge question from the pull-down menu 40, the Toll-Free Customer Center representative would then ask the user of the system, or the caller, to properly answer the question, in which the Toll-Free Customer Center representative would type in the answer in case-sensitive letter in the Answer box, indicated as numeral 50. The Toll-Free Customer Center representative would validate the answer provided by the caller by clicking the Activate Viewing button indicated as numeral 55 which would attempt to validate the answer against what is stored in the system.

If the security question is correctly answered by the caller, the Activate Viewing button 55 would activate special viewing privileges for the Toll-Free Customer Center representative showing the contents and properties of all the Notes and Documents stored in all Category Database 50, 52, 54, 56 listed in pull-down menu 10, associated with the specific user account.

If the security question was not correctly answered by the caller, the Activate Viewing button 55 would not activate special viewing privileges for the Toll-Free Customer Center representative and would require the Toll-Free Customer Center representative to choose another security challenge question from the pull-down menu 40 and re-enter the answer in the Answer box 55 and click the Activate Viewing button 55 to attempt to activate special viewing privileges showing the contents and properties of all the Notes and Documents stored in all Category Database 50, 52, 54, 56 listed in pull-down menu 10, associated with the specific user account.

Once the Toll-Free Customer Center representative has completed sending any Notes or Documents that have been requested by the caller, the Toll-Free Customer Center representative would then logout of the caller account 60 which would systematically secure the personal Notes and Documents by locking the customer account, and return the Toll-Free Customer Center representative to the access screen illustratively illustrated in FIG. 7B. A log file which records the activity within the customer account by the Toll-Free Customer Center representative would be stored on the system for security and future auditing purposes, as described as numeral 22 in FIG. 7.

If the user of the system, or the caller, requests the Toll-Free Customer Center representative to send an Alert Message to specific contact recipients stored within the Category Database 56 for the user of the system, the Toll-Free Customer Center representative would use the Send Alert Message tool indicated as numeral 70 which would use the Fax Server—22 or the Email Server—24 protocols of the system to send a communication to the desired contact recipients in the user account. This functionality would be similar to the Blast Alert Message Tool described in FIG. 8C, except that this function would be performed by the Toll-Free Customer Center representative on behalf of the user of the system, or the caller using the Toll-Free Customer Center 10c indicated in FIG. 1.

If the user of the system, or the caller, has locked their account by failing to correctly answer the three random security challenge questions during the Client System access as described in numeral 140 in FIG. 2 and further illustrated FIG. 2C, with three unsuccessful attempts, the Toll-Free Customer Center representative could unlock and reset the user account by using the Unlock and Reset the Password button indicated as numeral 80 which is a tool which would replace the users established password with a random generated password and also purge all existing answers to all ten security challenge questions for the user account, listed in the pull-down menu 40, and replace each one with a random generated answer provided by the system. A secure email communication would then be sent to the user email addresses stored in the system to notify the user of what the random generated password and security challenge questions answers are and how to access the system using these temporary credentials, which is further described and illustrative illustrated in FIG. 7D1.

At anytime, the Toll-Free Customer Center representative can completely disconnect from the system and end of his/her session by clicking the LOGOFF SYSTEM tool 90 which would securely logoff the representative and end the monitoring session as explained in FIG. 7A and shown as the Log File as numeral 22 in FIG. 7.

FIG. 7D1—Unlock and Reset Password Email Notification

FIG. 7D1 is the graphical user interface which illustratively depicts the process by which a user does not have access to the a client system Browser 10a and Mobile Browser 10b shown in FIG. 1 to access the website and its server system 18 shown in FIG. 1 and described in FIG. 2 but can access the server system 18 by requesting the Toll-Free Customer Assistance Center 10c in FIG. 1 to access the server system 18 and the stored Notes and Documents on behalf of the user, in accordance with the teachings of this invention.

In one illustrative embodiment of the present invention, and explained in respect to the flow diagram of FIG. 7D, a user with the ability to use other client systems as shown in FIG. 1 such as browser 10a, mobile device 10b to access the server system 18 can use the client system known as a Toll-Free Customer Center 10c in FIG. 1 and request that the Toll-Free Customer Center unlock and reset the user account after the user of the system, or the caller, has locked their account by failing to correctly answer the three random security challenge questions during the Client System access as described in numeral 140 in FIG. 2 and further illustrated FIG. 2C, with three unsuccessful attempts. The Toll-Free Customer Center representative could unlock and reset the user account by using the Unlock and Reset the Password button indicated as numeral 80 in FIG. 7D which is a tool which would replace the users established password with a random generated password and also purge all existing answers to all ten security challenge questions for the user account and replace each one with a random generated answer provided by the system.

A secure email communication would then be sent to the user email addresses stored in the system indicated as numeral 10 to notify the user of what the random generated password 15 and the random generated security challenge questions answer 25 are and how to access the system using these temporary credentials, which is further described in the email communication.

Figure 7E:
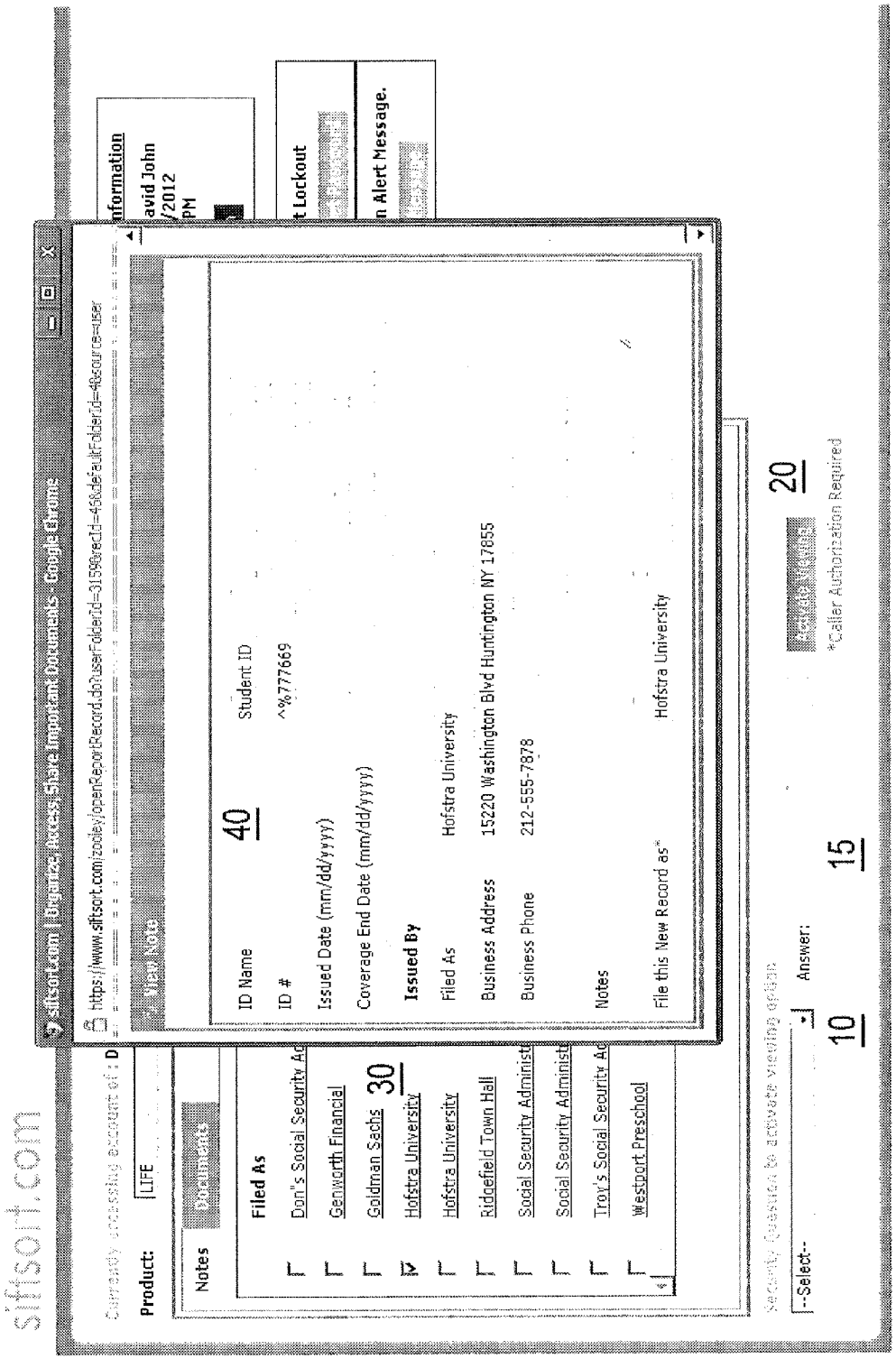
FIG. 7E is the graphical user interface which depicts a toll free customer center access screen in accordance with one or more embodiments of the present invention.

FIG. 7E—Toll Free Customer Center Viewing Notes and Documents

FIG. 7E is the graphical user interface which illustratively depicts the process by which a user does not have access to client system Browser 10a and Mobile Browser 10b shown in FIG. 1 to access the website and its server system 18 shown in FIG. 1 and described in FIG. 2 but can access the server system 18 by requesting the Toll-Free Customer Assistance Center 10c in FIG. 1 to access the server system 18 and the stored Notes and Documents on behalf of the user, in accordance with one or more embodiments of the present invention.

In one illustrative embodiment of this invention, and explained in respect to the flow diagram of FIG. 7, a user without access to other client systems as shown in FIG. 1 such as browser 10a, mobile device 10b to access the server system 18 can use the client system known as a Toll-Free Customer Center 10c in FIG. 1 and request that the Toll-Free Customer Center securely access the server system 18 on his/her behalf to view or send Notes or Documents stored within his/her account without compromising the security to their account by having to provide logon credentials that would be used to access system through browser 10a, mobile device 10b like username and password. As previously explained, a caller may request that the Toll-Free Customer Center representative open a specific Note or Document within the account of the caller. If the caller instructs the Toll-Free Customer Center representative to open a specific Note or Document and read its contents or properties, the Toll-Free Customer Center representative would be required to ask the caller to answer a random security challenge question from the pull-down menu 10, the Toll-Free Customer Center representative would then ask the user of the system, or the caller, to properly answer the question, in which the Toll-Free Customer Center representative would type in the answer in case-sensitive letter in the Answer box, indicated as numeral 15. The Toll-Free Customer Center representative would validate the answer provided by the caller by clicking the Activate Viewing button indicated as numeral 20 which would attempt to validate the answer against what is stored in the system.

If the security question is correctly answered by the caller, the Activate Viewing button 20 would activate special viewing privileges for the Toll-Free Customer Center representative by activating hyperlinks to all the Notes and Documents 30 and when these hyperlinks are clicked by the Toll-Free Customer Center representative, the system would display the contents and properties of all the selected Notes or Documents stored in all Category Database 50, 52, 54, 56 and illustratively depicted by numeral 40.

If the security question was not correctly answered by the caller, the Activate Viewing button 20 would not activate special viewing privileges or active hyperlinks 30 for the Toll-Free Customer Center representative and would require the Toll-Free Customer Center representative to choose another security challenge question from the pull-down menu 10 and re-enter the answer in the Answer box 15 and click the Activate Viewing button 20 to attempt to activate special viewing privileges showing the contents and properties of all the Notes and Documents stored in all Category Database 50, 52, 54, 56 associated with the specific user account.

Figure 7F:
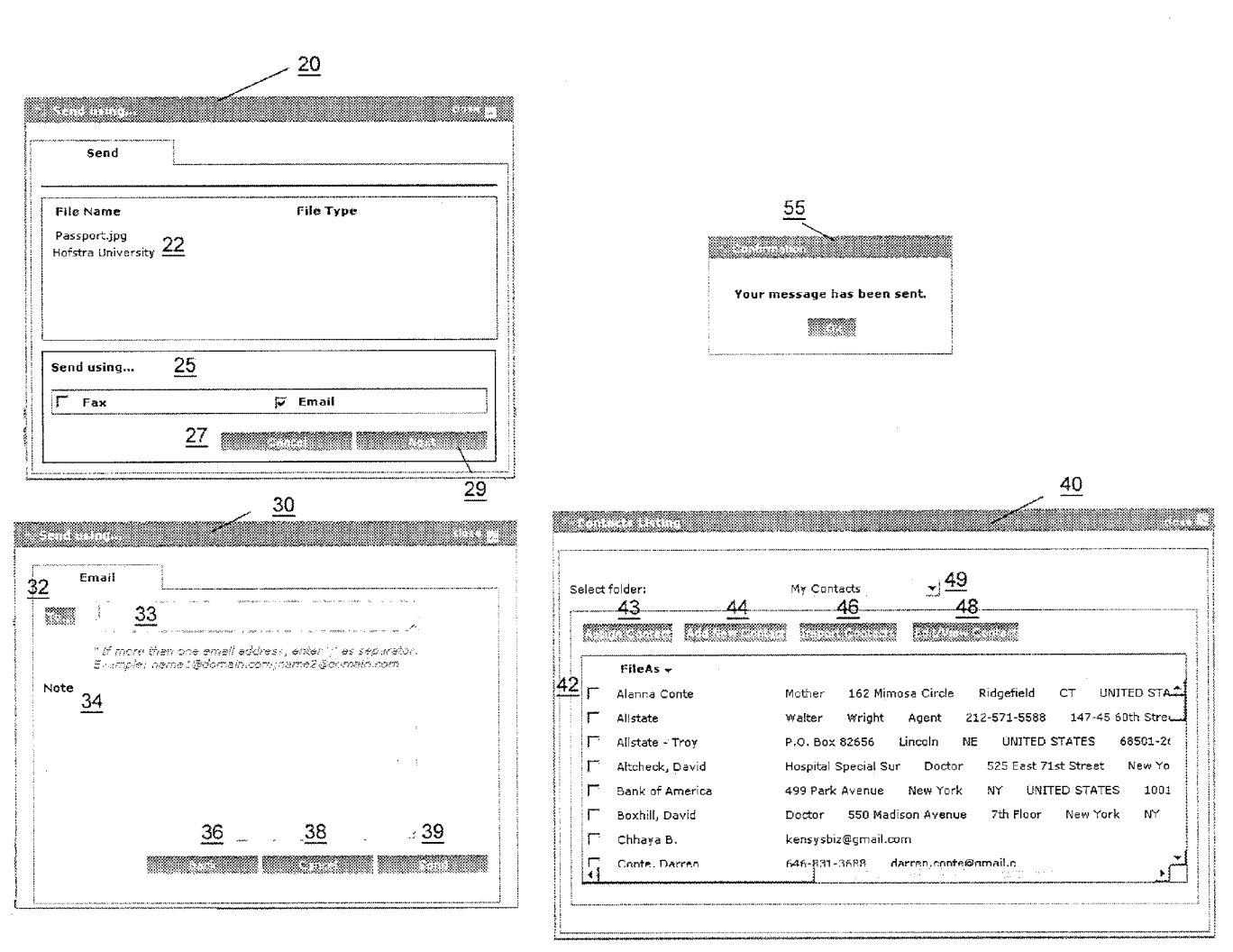

FIG. 7F—Toll Free Customer Center Sending Tools

FIG. 7F is a diagram which illustratively depicts the graphical user interface screen that is used by the Toll-Free Customer Center representative 10c to securely logon to the server system 18 to send Notes and Documents on behalf of the user as shown in FIG. 1, within all Category Sub-Databases (Folders) in the server system using the Email Server—24 or Fax Server—22 shown in FIG. 1, in accordance with the teachings of this invention.

As previously described, a user can request a Toll-Free Customer Center representative to send Note or a Document from a Category Sub-Database (Folder) using the Send button indicated as numeral 30 in FIG. 7D. The Toll-Free Customer Center representative would then select the specific Note or Document requested by the user of the system, by clicking on the select box 25 in FIG. 7D to have sent over a secure transmission using the SEND tool 30 in FIG. 7D to a designated recipient using either the Fax Server—22 or the Email Server—24 protocols as shown in FIG. 1. After the Toll-Free Customer Center representative has pressed the Send button indicated as 30 in FIG. 7D the Toll-Free Customer Center representative would be presented with the Send wizard screen indicated as numeral 20 in which the selected Note is carried forward 22 and the Toll-Free Customer Center representative is presented with a choice of sending the Note using either the Fax Server protocol or the Email Server protocol 25, according to the user of the system, or the caller instructions. The Toll-Free Customer Center representative of the system can select one protocol by placing a check in the respective check box the clicking the Next button 29. If the user of the system decides to cancel the Send wizard at this point, the Toll-Free Customer Center representative may click the Cancel button 27.

In this example, the Email protocol is selected and demonstrated and is similar to the Fax protocol process except that the Send wizard will deliver the selected Note using Email Server—24 to an email address of the desired recipients. When the Fax protocol is selected, the Send wizard will deliver the selected Note using Fax Server—22 to a facsimile number of the desired recipients.

When Next button 29 is pressed, next Send wizard screen 30 appears prompting the Toll-Free Customer Center representative to assign a contact recipient(s) 33 to the receive the selected Note carried forward and indicated as numeral 22. The Toll-Free Customer Center representative can enter in recipient email address or facsimile number in the space provided 33 or perform a lookup of the recipients email address or facsimile number in the Contacts Database 56 by using the To . . . button indicated as numeral 32, as instructed by the user of the system. If the Toll-Free Customer Center representative needed to return to the previous Send wizard screen, the user may click the Back button indicated as numeral 36. If the user of the system decides to cancel the Send wizard at this point, the Toll-Free Customer Center representative may click the Cancel button 38. By clicking the To . . . button indicated as numeral 32 the Contact Listing screen would appear indicated as numeral 40 which would allow the Toll-Free Customer Center representative to choose the desired recipient(s) to receive the selected Note 22.

The Toll-Free Customer Center representative has many selections to find the desired recipient(s) which the Toll-Free Customer Center representative can do by placing a check in the box 42 to select a Contact recipient(s) then clicking the Assign Contact button indicated as numeral 43, as instructed by the user of the system or the caller. This would automatically populate the desired email address or facsimile number into the recipient's field indicated as numeral 33. The Toll-Free Customer Center representative may also browse to find other recipients by using the pull-down menu indicated as numeral 49 to browse other Category Sub-Database (Folders) indicated as numeral 30 in FIG. 2H in the Category Database 56 shown in FIG. 1 and also indicated as Contacts 56 in FIG. 2H for all User Web Pages 100*a*, 100*b*, 100*c* indicated as numeral 20 in FIG. 2H, on behalf of the user.

The Toll-Free Customer Center representative may also click Add a New Contact 44 to dynamically add a new contact to the system and Category Database 56 and then select and assign it as a recipient using numeral 42 and 43 respectively, as instructed by the user of the system or the caller. The system also allows the Toll-Free Customer Center representative to import recipients from other external systems into the Category Database 56 by using the Import Contacts button 46, if instructed by the user of the system, or the caller. The Import Contacts wizard allows contact information to be imported from any external system such as an external email program such as Microsoft Outlook, or online services such as Google Contacts. The Toll-Free Customer Center representative, if instructed by the user of the system may also update an email address or facsimile number dynamically to an existing recipient Contact record stored in the Category Database 56 by using the Edit/View Contact 48 button to update the Contact record before the user selects and assigns it as a recipient using numeral 42 and 43 respectively. As soon as the Toll-Free Customer Center representative of the system selects and assigns a recipients(s) the Toll-Free Customer Center representative of the system would then finalize the Send wizard by clicking the Send button indicated as numeral 39. The system would use respective Fax Server—22 or Email Server—24 of the server system 18 indicated in FIG. 1 to send the selected Note 22 to the desired recipient(s) facsimile number or email addresses respectfully, as instructed by the user of the system or the caller. Once completely, the system would display a confirmation screen 55 to the user of the system that the message has been successfully sent by the system of the desired recipient(s) facsimile number or email addresses.

Figure 8:
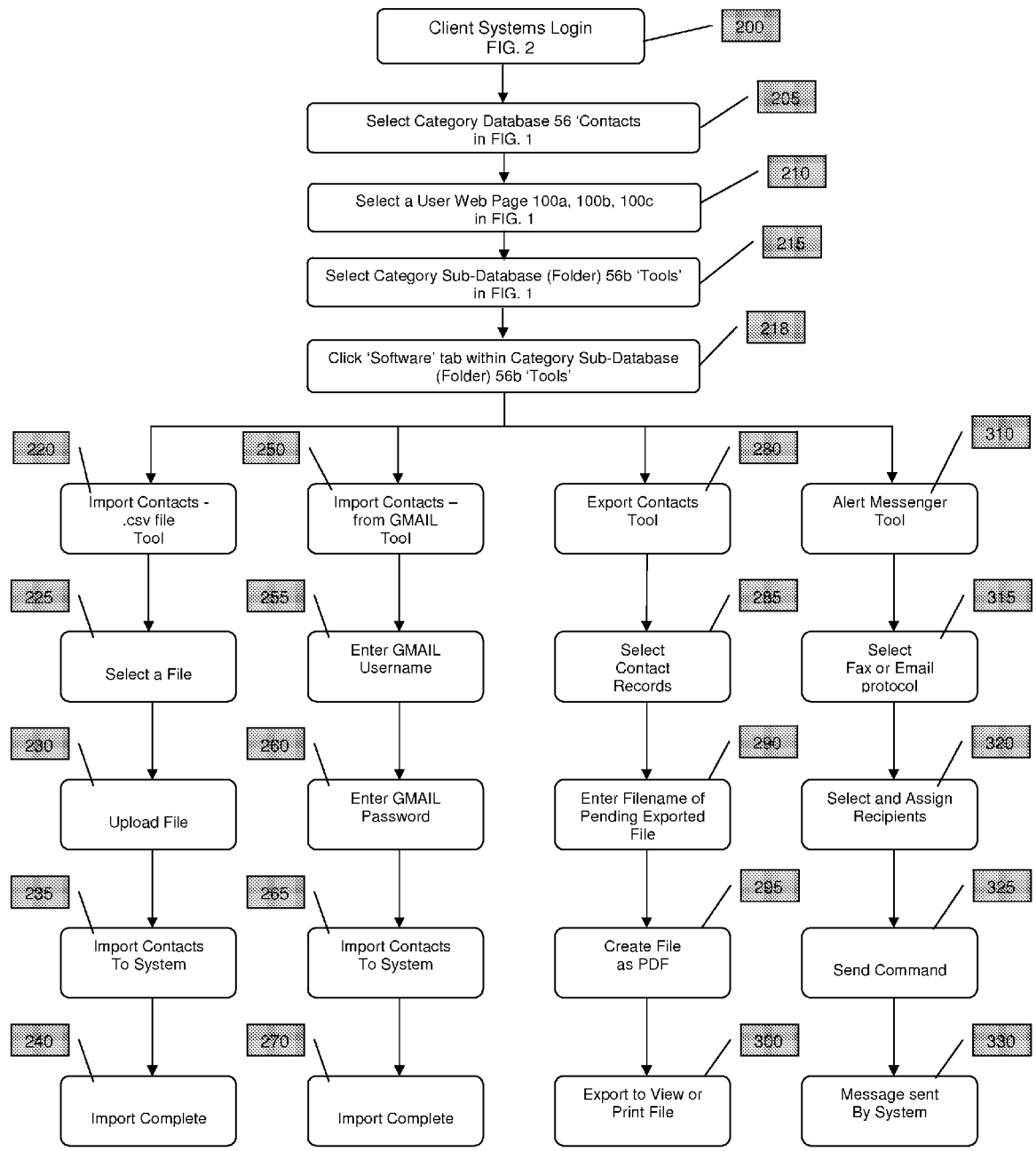
FIG. 8 illustrates a diagram depicting the process flow that a user would interact with by using his/her browser or his/her mobile device after successfully accessing the server system shown in FIG. 1, to access a proprietary software tools embedded within the system in accordance with the teachings of this invention.

FIG. 8—Contact Tools: Flow Chart

FIG. 8 is a diagram which illustratively depicts the process flow that a user would interact with by using his/her browser 10*a* or his/her mobile device 10*b* after successfully accessing the server system shown in FIG. 1, to access a proprietary software tools embedded within the system in accordance with one or more embodiments of the present invention.

In one illustrative embodiment of the present invention, and explained in respect to the flow diagram of FIG. 2, a user would use client systems as shown in FIG. 1 such as a browser 10*a*, a mobile device 10*b* to access the server system 18 as shown in step 200. Once the user has securely entered the system, the user would select Category Database 56 'Contacts' in step 205 and then select the desired User Web Page 100*a*, 100*b*, 100*c* in step 210, then open up the Category Sub-Database (Folder) 56*b* named 'Tools' in step 215.

Category Sub-Database (Folder) 56*b* namely 'Tools' has two tabs included within it, and the user of the system would select the tab named 'Software' in step 218 to view a suite of software applications embedded into the system. The user of the system can select a particular software application to perform specific tasks embedded within Category Database 56 known as Contacts.

A software application tool "Import Contacts from .csv file" 220 is embedded in the system which would allow the user of the system to Select a File 225 from their computer and then Upload 230 the selected file to the system. In step 235, the system would format and import the contact records stored in the selected file 230 to the system and place them in Category Database 56 'Contacts' specifically for the active User Web Page 100*a*, 100*b*, 100*c* selected in step 210 and finally in Category Sub-Database (Folder) 56*a* named 'My Contacts', or any custom Category Sub-Database (Folder) subsequently created by the user of the system. The user of the system would be able to view or browse the imported Contact records from within the Category Sub-Database (Folder) 56*a* named 'My Contacts' after the Import process had been completed in step 240.

A software application tool named "Import Contacts from GMAIL" 250 is embedded in the system which would permit the user of the system to remotely logon to their existing GMAIL system by entering in a valid email address, known as "Username" in step 255 then the system would prompt the user for a valid password 260 which the GMAIL system would attempt to match the Username 255 in the external GMAIL system. If the GMAIL system locates and successfully matches the provided Password 260 to the provided Username 255, the GMAIL system would initiate an IMPORT command of all the existing Contact records stored in the external GMAIL system by the user of the system and would format and place them in the Category Database 56 'Contacts' specifically for the active User Web Page 100*a*, 100*b*, 100*c* selected in step 210 and finally in the Category Sub-Database (Folder) 56*a* named 'My Contacts', or any custom Category Sub-Database (Folder) subsequently created by the user of the system in step 265. The user of the system would be able to view or browse the imported Contact records from within the Category Sub-Database (Folder) 56*a* named 'My Contacts' after the Import process had been completed in step 270.

A software application tool named "Export Contacts" 280 is embedded in the system which would permit the user of the system to select multiple Contact records stored in any Category Sub-Database (Folder) 56*a* named 'My Contacts', or any custom Category Sub-Database (Folder) subsequently created by the user of the system in step 285, for all User Web Pages 100*a*, 100*b*, 100*c*. Once the user has selected the desired Contact records in step 285, the system would prompt the user to name the file in step 290. After the file name has been defined by the user of the system, the system formats and creates a file in Portable Digital Format, known as PDF, and places the file in the Category Database 56 'Contacts' specifically for the active User Web Page 100*a*, 100*b*, 100*c* selected in step 210 and finally in the Category Sub-Database (Folder) 56*b* named 'Tools', in the tab called 'Tools' step 295. The user of the system would be able to export or open the file in a native program such as Adobe Acrobat Reader to view or print the newly generated file in step 300 after the system process had been completed in step 295.

A software application tool named "Alert Message" 310 is embedded in the system which will prompt the user to select the Fax Server—22 or Email Server—24 protocol to send a communication to in step 315 then select Contact records or recipients stored in the system to send the communication to in step 320 from any Category Sub-Database (Folder) 56*a* named 'My Contacts', or any custom Category Sub-Database (Folder) subsequently created by the user of the system, for all User Web Pages 100*a*, 100*b*, 100*c*. Once the user of the system has completed selecting Contact records or recipients 320, the user may send the communication by clicking a Send button, to initiate a send command to the system in step 325, which the system would then display a confirmation message that the communication has been sent in step 330 over the respective Fax Server—22 or Email Server—24 protocol in FIG. 1 selected in step 315.

Figure 8A:
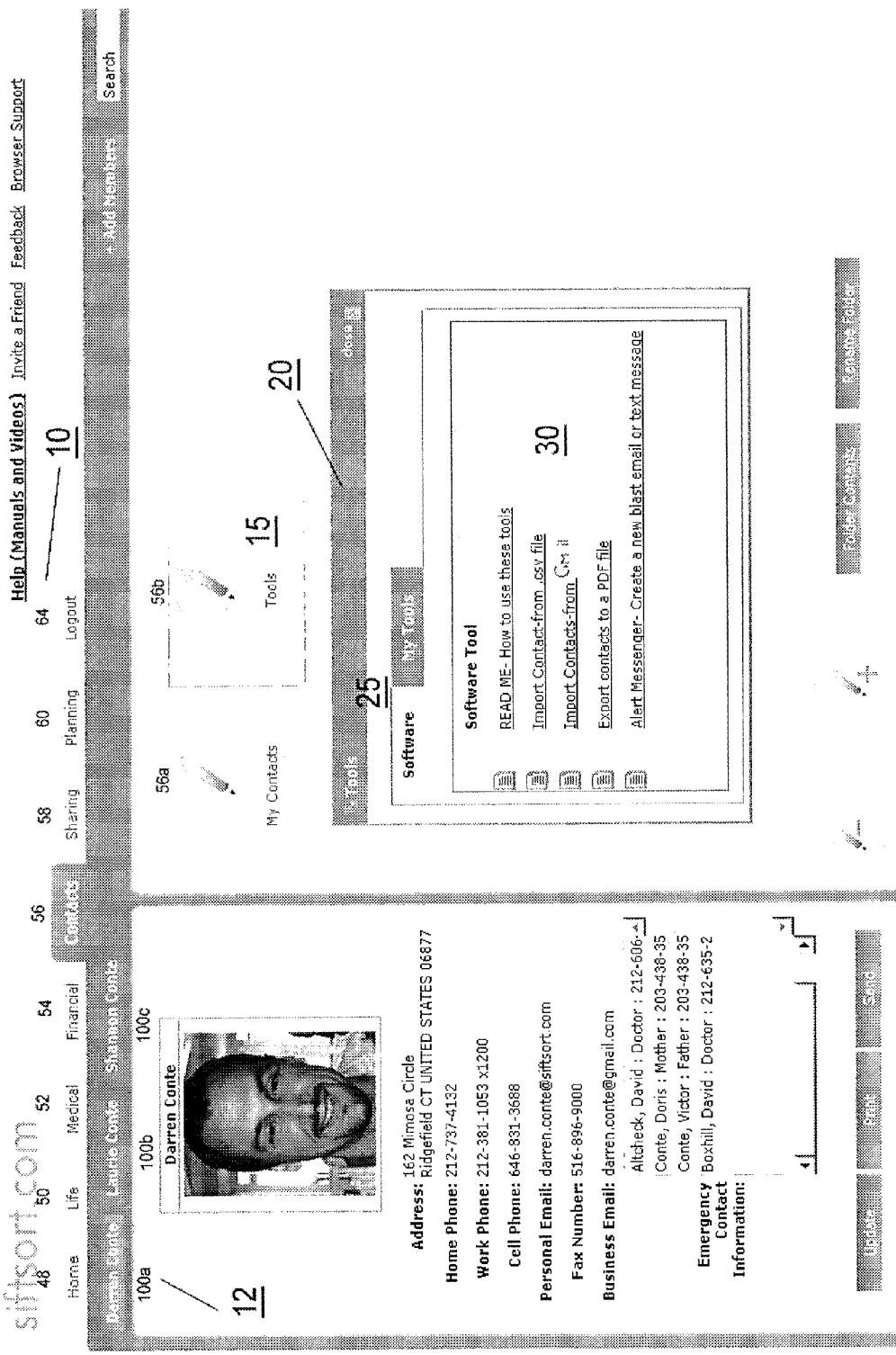
FIG. 8A is a diagram which illustratively depicts the graphical user interface screen after successfully accessing the server system shown in FIG. 1 in accordance with one or more embodiments of the present invention.

FIG. 8A—Planning Tools: Software Tools

FIG. 8A is a diagram which illustratively depicts the graphical user interface screen that a user would interact with by using his/her browser 10*a* or his/her mobile device 10*b* after successfully accessing the server system shown in FIG. 1, to access a proprietary software tools embedded with the system in accordance with one or more embodiments of the present invention.

In one illustrative embodiment of the present invention, and explained in respect to the flow diagram of FIG. 8, a user can use multiple client systems as shown in FIG. 1 such as browser 10*a*, mobile device 10*b* to access the server system 18 to access the proprietary software tools embedded in the system to perform specific tasks that would manipulate the Contact records stored in the Category Database 56, Contacts and more specifically, the Category Sub-Database (Folder) 56*a* named 'My Contacts', or any custom Category Sub-Database (Folder) subsequently created by the user of the system, for all User Web Pages 100*a*, 100*b*, 100*c* in FIG. 1.

After securely accessing the system, the user of the system would click on Category Database 56 named 'Contacts' from a selection of all Category Databases indicated as numeral 10. The user of the system would then select a desired User Web Pages 100*a*, 100*b*, 100*c* indicated as numeral 12. The user of the system would then find the Category Sub-Database (Folder) 56*b* named 'Tools' 15 and open this folder to view the embedded software applications 20 that are located the tab named 'Software' 25 where they are illustratively illustrated and indicated as numeral 30. The user would have the option to select any of the proprietary software tools shown in the view, specifically "READ ME—How to use these tools", "Import Contacts—from .csv file", "Import Contacts—from GMAIL", "Export contacts to a PDF file" and "Alert Messenger—Create a new blast email or fax message". Each tool is described further below in FIG. 8B through FIG. 8E, respectively below.

FIG. 8B—Contact Tools: Import Contacts from .Csv File

FIG. 8B is a diagram which illustratively depicts the graphical user interface screen that a user would interact with by using his/her browser 10*a* or his/her mobile device 10*b* after successfully accessing the server system shown in FIG. 1, to access a proprietary software tools embedded with the system, namely Import Contacts From .csv File, in accordance with one or more embodiments of the present invention.

In one illustrative embodiment of the present invention, and explained in respect to the flow diagram of FIG. 8, a user can use multiple client systems as shown in FIG. 1 such as browser 10*a*, mobile device 10*b* to access the server system 18 to access the proprietary software tools embedded in the system to perform specific tasks that would manipulate the Contact records stored in the Category Database 56 namely, Contacts, more specifically, the Category Sub-Database (Folder) 56*a* named 'My Contacts', or any custom Category Sub-Database (Folder) subsequently created by the user of the system, for the actively selected one or more embodiments of the present invention 100*a*, 100*b*, 100*c* in FIG. 1.

After securely accessing the system, the user would have the option to Import contacts from an external file by using the "Import Contacts—from .csv file" software tool indicated as numeral 30 in FIG. 8A. The user of the system would select Category Database 56 namely, Contacts, more specifically, the desired User Web Pages 100*a*, 100*b*, 100*c* then find the Category Sub-Database (Folder) 56*b* named 'Tools' 10 and open this folder to view the embedded software applications that are located the tab named 'Software' 15 where they are illustratively illustrated and indicated as numeral 20. The user would have the option to select any of the proprietary software tools shown in the view, specifically the "Import Contact—from .csv file", indicated as numeral 22 to import contact records that are external to the server system 18 and import and store them in the in the Category Database 56 namely, Contacts, more specifically, the Category Sub-Database (Folder one or more embodiments of the present invention 56*a* named 'My Contacts', or any custom Category Sub-Database (Folder) subsequently created by the user of the system, for the actively selected User Web Pages 100*a*, 100*b*, 100*c* in FIG. 1.

When the user of the system clicks on the hyperlink "Import Contact—from .csv file", indicated as numeral 22 the tool is activated and the Import Contact wizard is launched and illustrative illustrated in numeral 25. On this wizard screen, the user would have the choice to import Contact records in multiple methods, either from an external GMAIL account 30 or by an external file or email program 40. FIG. 8B will illustratively illustrate the method of importing from an external source or email program indicated as numeral 40.

To import Contacts from an external source, the user of the system would click the Choose File 45 button to browse their computer for the source file which contains the Contact records and once located, the user would click the Upload 50 button to import the Contact records stored in the source file to the server system 18 and ultimately store them to the Category Database 56 'Contacts' and specifically the Category Sub-Database (Folder) 56*a* 'My Contacts' or any custom Category Sub-Database (Folder) subsequently created by the user of the system for the actively selected User Web Pages 100*a*, 100*b*, 100*c* in step 210 in FIG. 8A.

At anytime, the user may view detail instructions of how to successfully import contact records by clicking the Find out how hyperlink 55 for further instructions.

Figure 8C:
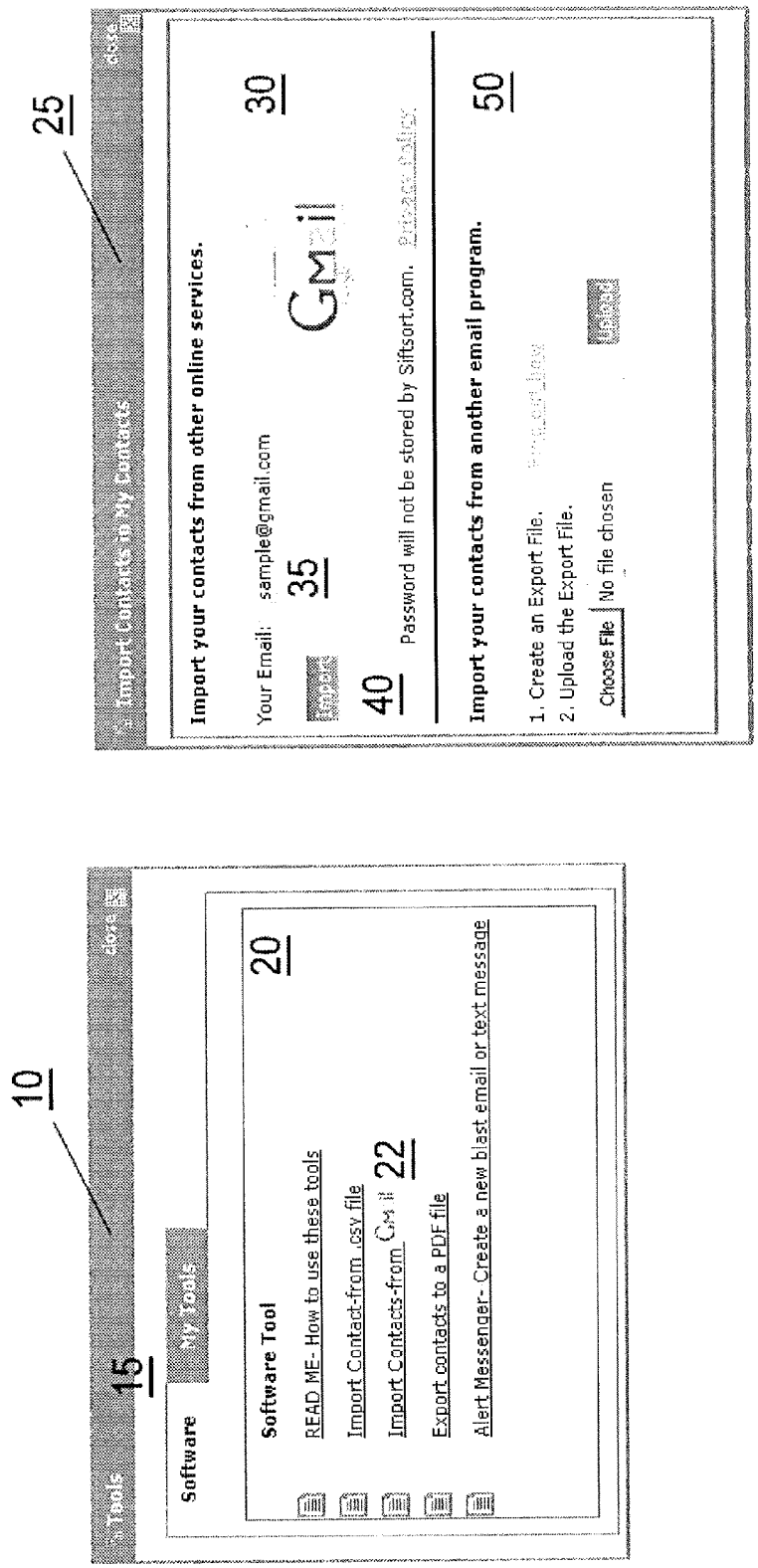
FIG. 8C is a diagram which illustratively depicts proprietary software tools embedded within the server system shown in FIG. 1 in accordance with one or more embodiments of the present invention.

FIG. 8C—Contact Tools: Import Contacts from GMAIL

FIG. 8C is a diagram which illustratively depicts the graphical user interface screen that a user would interact with by using his/her browser 10*a* or his/her mobile device 10*b* after successfully accessing the server system shown in FIG. 1, to access a proprietary software tools embedded with the system, namely Import Contacts From GMAIL, in accordance with one or more embodiments of the present invention.

In one illustrative embodiment of this invention, and explained in respect to the flow diagram of FIG. 8, a user can use multiple client systems as shown in FIG. 1 such as a browser 10*a*, a mobile device 10*b* to access the server system 18 to access the proprietary software tools embedded in the system to perform specific tasks that would manipulate the Contact records stored in the Category Database 56 namely, Contacts, more specifically, the Category Sub-Database (Folder) 56*a* named 'My Contacts', or any custom Category Sub-Database (Folder) subsequently created by the user of the system, for the actively selected User Web Pages 100*a*, 100*b*, 100*c* in FIG. 1.

After securely accessing the system, the user would have the option to Import contacts from an external source by using the "Import Contacts—from GMAIL" software tool indicated as numeral 30 in FIG. 8A. The user of the system would select Category Database 56 namely, Contacts, more specifically, the desired User Web Pages 100*a*, 100*b*, 100*c* then find the Category Sub-Database (Folder) 56*b* named 'Tools' 10 and open this folder to view the embedded software applications that are located the tab named 'Software' 15 where they are illustratively illustrated and indicated as numeral 20. The user would have the option to select any of the proprietary software tools shown in the view, specifically the "Import Contact—from GMAIL", indicated as numeral 22 to import contact records that are external to the server system 18 and import and store them in the in the Category Database 56 namely, Contacts, more specifically, the Category Sub-Database (Folder) 56*a* named 'My Contacts', or any custom Category Sub-Database (Folder) subsequently created by the user of the system, for the actively selected User Web Pages 100*a*, 100*b*, 100*c* in FIG. 1.

When the user of the system clicks on the hyperlink "Import Contact—from GMAIL", indicated as numeral 22 the tool is activated and the Import Contact wizard is launched and illustrative illustrated in numeral 25. On this wizard screen, the user would have the choice to import Contact records in multiple methods, either from an external GMAIL account 30 or by an external file or email program 50. FIG. 8C will illustratively illustrate the method of importing from the external source, known as the GMAIL platform, indicated as numeral 30. To import Contacts from a GMAIL account, the user of the system would enter in a valid GMAIL email address indicated as numeral 35 then click the Import button 40. The system will prompt the user for a valid password associated with the GMAIL email address provided in numeral 35. The system would securely send the credentials provided by the user to the GMAIL platform, and attempt to match the credentials with the GMAIL system. If the credentials match, the system will invoke an export command to the GMAIL system and then an import command to extract and place the Contact records that are stored in the respective GMAIL system to be copied and imported to the server system 18 and ultimately store them to the Category Database 56 'Contacts' and specifically the Category Sub-Database (Folder) 56*a* 'My Contacts' or any custom Category Sub-Database (Folder) subsequently created by the user of the system for the actively selected User Web Pages 100*a*, 100*b*, 100*c* in step 210 in FIG. 8A.

If the credential provided by the user are found to be invalid after the user presses the Import button 40, the system will display and Error message, prompting the user to repeat steps 35 and 40.

Figure 8D:
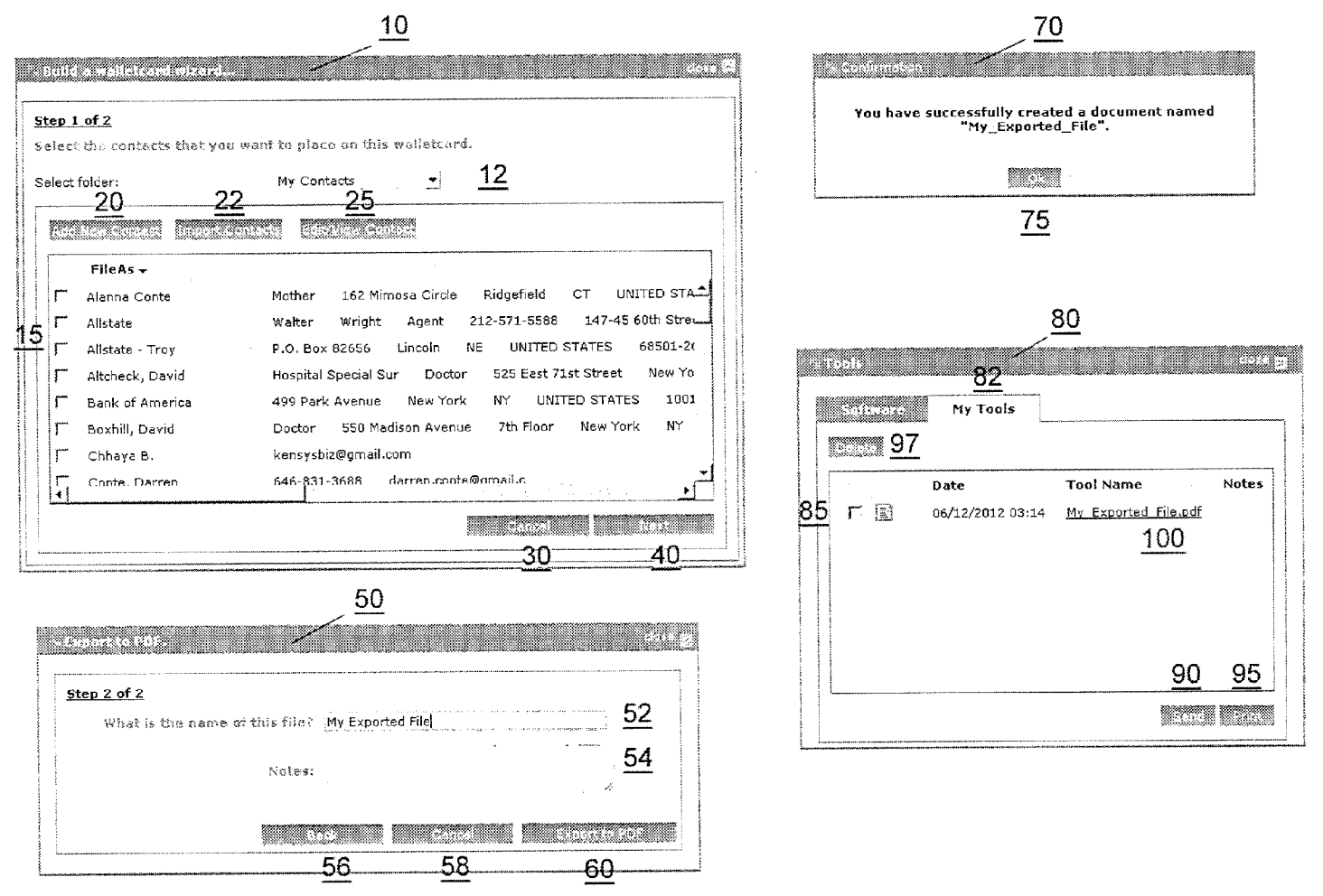

FIG. 8D—Contact Tools: Export Contacts to a PDF file

FIG. 8D is a diagram which illustratively depicts the graphical user interface screen that a user would interact with by using his/her browser 10*a* or his/her mobile device 10*b* after successfully accessing the server system shown in FIG. 1, to access a proprietary software tools embedded with the system, namely Export Contacts to a PDF file, in accordance with one or more embodiments of the present invention.

In one illustrative embodiment of the present invention, and explained in respect to the flow diagram of FIG. 8, a user can use multiple client systems as shown in FIG. 1 such as a browser 10*a*, a mobile device 10*b* to access the server system 18 to access the proprietary software tools embedded in the system to perform specific tasks that would manipulate the Contact records stored in the Category Database 56 namely, Contacts, more specifically, the Category Sub-Database (Folder) 56*a* named 'My Contacts', or any custom Category Sub-Database (Folder) subsequently created by the user of the system, for the actively selected User Web Pages 100*a*, 100*b*, 100*c* in FIG. 1.

After securely accessing the system, the user would have the option to Export contacts to a PDF file by using the "Export contacts to a PDF file" software tool indicated as numeral 30 in FIG. 8A. After launching the wizard, the 'Build a walletcard wizard' screen 10 would appear and the user would choose any of the Contact records stored in the Category Database 56 namely, Contacts, more specifically, the Category Sub-Database (Folder) 56*a* named 'My Contacts', or any custom Category Sub-Database (Folder) subsequently created by the user of the system, for the actively selected User Web Pages 100*a*, 100*b*, 100*c* by using the pulldown menu indicated as numeral 12. The user would select the desired Contact records to add to the exported file by placing a check in the appropriate checkboxes indicated as numeral 15. If a Contact record does not exist in the system, the user may create and add a new Contact record to the system by using the Add New Contact button 20 as previously described as numeral 46 in FIG. 3B. Since it is important that all Contacts records placed in the exported file have accurate contact information, the user may choose to select a particular contact by using the checkbox 15 and then edit the Contact record information by using the Edit/View Contact tool 25 which would edit the Contact record, as previously described as numeral 48 in FIG. 3B. Once all the desired contacts have been selected the user would continue the wizard by clicking the Next button 40. At any time the user could Cancel the wizard by clicking the Cancel button 30.

After continuing the wizard 40, the final step would be displayed in a screen 50 which would require the user to provide a name of the exported file 52 and provide any Notes 54 that should be associated with the exported file. If the user has discovered that user of the system has made a mistake and would like to alter the list of Contact records added to the list, the user could use the Back button 56 to return to previous screen, "Export contacts to a PDF file" indicated as numeral 10. Or the user may cancel the entire process by using the Cancel button 58. If the user of the system does not need to make any other changes to the exported file, the user of the system can export the file to a Portable Digital Format, also known as PDF by using the "Export to PDF" button indicated as numeral 60.

The system will process and format the selected Contact records in a PDF format, and then display a confirmation screen indicated as numeral 70 and once the user of the system clicks the "OK" button 75, the system would place the newly exported file in the Category Database 56 'Contacts' as shown in FIG. 1, specifically in the Category Sub-Database (Folder) 56*b* named 'Tools', indicated as numeral 80 and specifically in the tab within this window named "My Tools" 82 for the actively selected User Web Pages 100*a*, 100*b*, 100*c*.

A user may then select the exported file by placing a check in the appropriate checkbox 85 and perform a host of commands such as Send 90 which would allow the user to send the exported file using the Fax Server—22 or the Email Server—24 in FIG. 1 and previously described in FIG. 4D. The user of the system may also choose to select the exported file by placing a check in the appropriate checkbox 85 and perform a host of commands such as Print 95 which would allow the user to print the exported file to an installed printer device attached to the user local computer. The user of the system may also choose to select the exported file by placing a check in the appropriate checkbox 85 and perform a host of commands such as Delete 97 which would allow the user to delete the exported file from the system. The user of the system may also choose to Open the exported file in a native application, such as Adobe Acrobat, by clicking the hyperlink 100 associated with the stored exported file in the server system 18.

Figure 8E:
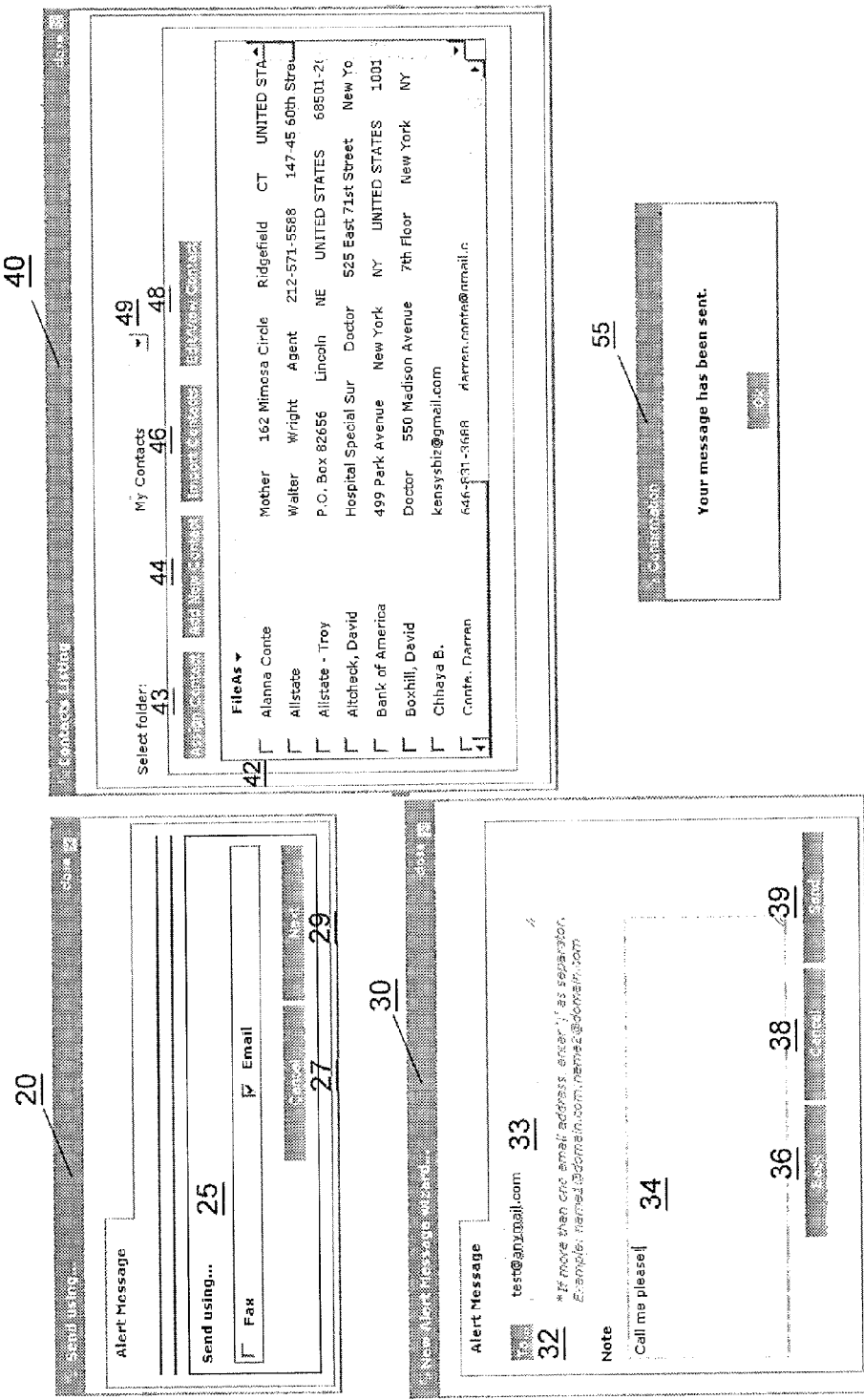
FIG. 8E is a diagram which illustratively depicts proprietary software tools embedded within the server system shown in FIG. 1 in accordance with one or more embodiments of the present invention.

FIG. 8E—Contact Tools: Alert Messenger

FIG. 8E is a diagram which illustratively depicts the graphical user interface screen that a user would interact with by using his/her browser 10a or his/her mobile device 10b after successfully accessing the server system shown in FIG. 1, to access a proprietary software tools embedded with the system, namely Alert Messenger, in accordance with one or more embodiments of the present invention.

FIG. 8E is a diagram which illustratively depicts the graphical user interface screen that a user would interact with by using his/her browser 10a or his/her mobile device 10b to send an electronic communication message using the Email Server—24 or Fax Server—22 shown in FIG. 1, in accordance with one or more embodiments of the present invention.

In one illustrative embodiment of the present invention, and explained in respect to the flow diagram of FIG. 8, a user can use multiple client systems as shown in FIG. 1 such as a browser 10a, a mobile device 10b to access the server system 18 to access the proprietary software tools embedded in the system to perform specific tasks that would manipulate the Contact records stored in the Category Database 56 namely, Contacts, more specifically, the Category Sub-Database (Folder) 56a named 'My Contacts', or any custom Category Sub-Database (Folder) subsequently created by the user of the system, for the actively selected User Web Pages 100a, 100b, 100c in FIG. 1.

As previously described, after securely accessing the system, the user of the system would have the option to send an electronic communication by using the "Alert Messenger—Create a new blast email or text message" software tool indicated as numeral 30 in FIG. 8A, and once launched, the system would initiate the Send wizard screen 20 in which the user is presented with a choice of sending the electronic communication using either the Fax Server protocol or the Email Server protocol 25. The user of the system can select one protocol by placing a check in the respective check box the clicking the Next button 29. If the user of the system decides to cancel the Send wizard at this point, the user may click the Cancel button 27.

In this example, the Email protocol is selected and demonstrated and is similar to the Fax protocol process except that the Send wizard will deliver the electronic communication using the Email Server—24 to an email address of the desired recipients. When the Fax protocol is selected, the Send wizard will deliver the electronic communication using the Fax Server—22 to a facsimile number of the desired recipients.

When the Next button 29 is pressed, the next Send wizard screen 30 appears prompting the user of the system to assign a contact recipient(s) 33 to receive the electronic communication. The user can enter in recipient email address or facsimile number in the space provided 33 or perform a lookup of the recipients email address or facsimile number in the Contacts Database 56 by using the To . . . button indicated as numeral 32. If the user needed to return to the previous Send wizard screen, the user may click the Back button indicated as numeral 36. If the user of the system decides to cancel the Send wizard at this point, the user may click the Cancel button 38. By clicking the To . . . button indicated as numeral 32 the Contact Listing screen would appear indicated as numeral 40 which would allow the user of the system to choose the desired recipient(s) to receive the electronic communication.

The user of the system has many selections to find the desired recipient(s) which the user can do by placing a check in the box 42 to select a Contact recipient(s) then clicking the Assign Contact button indicated as numeral 43. This would automatically populate the desired email address or facsimile number into recipients field indicated as numeral 33. The user may also browse to find other recipients by using the pull-down menu indicated as numeral 49 to browse other Category Sub-Database (Folders) indicated as numeral 30 in FIG. 2H in the Category Database 56 shown in FIG. 1 and also indicated as Contacts 56 in FIG. 2H for all User Web Pages 100a, 100b, 100c indicated as numeral 20 in FIG. 2H.

The user of the system may also click Add a New Contact 44 to dynamically add a new contact to the system and Category Database 56 and then select and assign it as a recipient using numeral 42 and 43 respectively. The system also allows the user to import recipients from other external systems into the Category Database 56 by using the Import Contacts button 46. The Import Contacts wizard allows contact information to be imported from any external system such as an external email program such as Microsoft Outlook, or online services such as Google Contacts. The user of the system may also update an email address or facsimile number dynamically to an existing recipient Contact record stored in the Category Database 56 by using the Edit/View Contact 48 button to update the Contact record before the user selects and assigns it as a recipient using numeral 42 and 43 respectively. As soon as the user of the system selects and assigns a recipients(s) the user of the system would then finalize the Send wizard by clicking the Send button indicated as numeral 39. The system would use the respective Fax Server 22 or Email Server 24 of the server system 18 indicated in FIG. 1 to send the electronic communication to the desired recipient(s) facsimile number or email addresses respectfully. Once completely, the system would display a confirmation screen 55 to the user of the system that the message has been successfully sent by the system of the desired recipient(s) facsimile number or email addresses.

Figure 9:
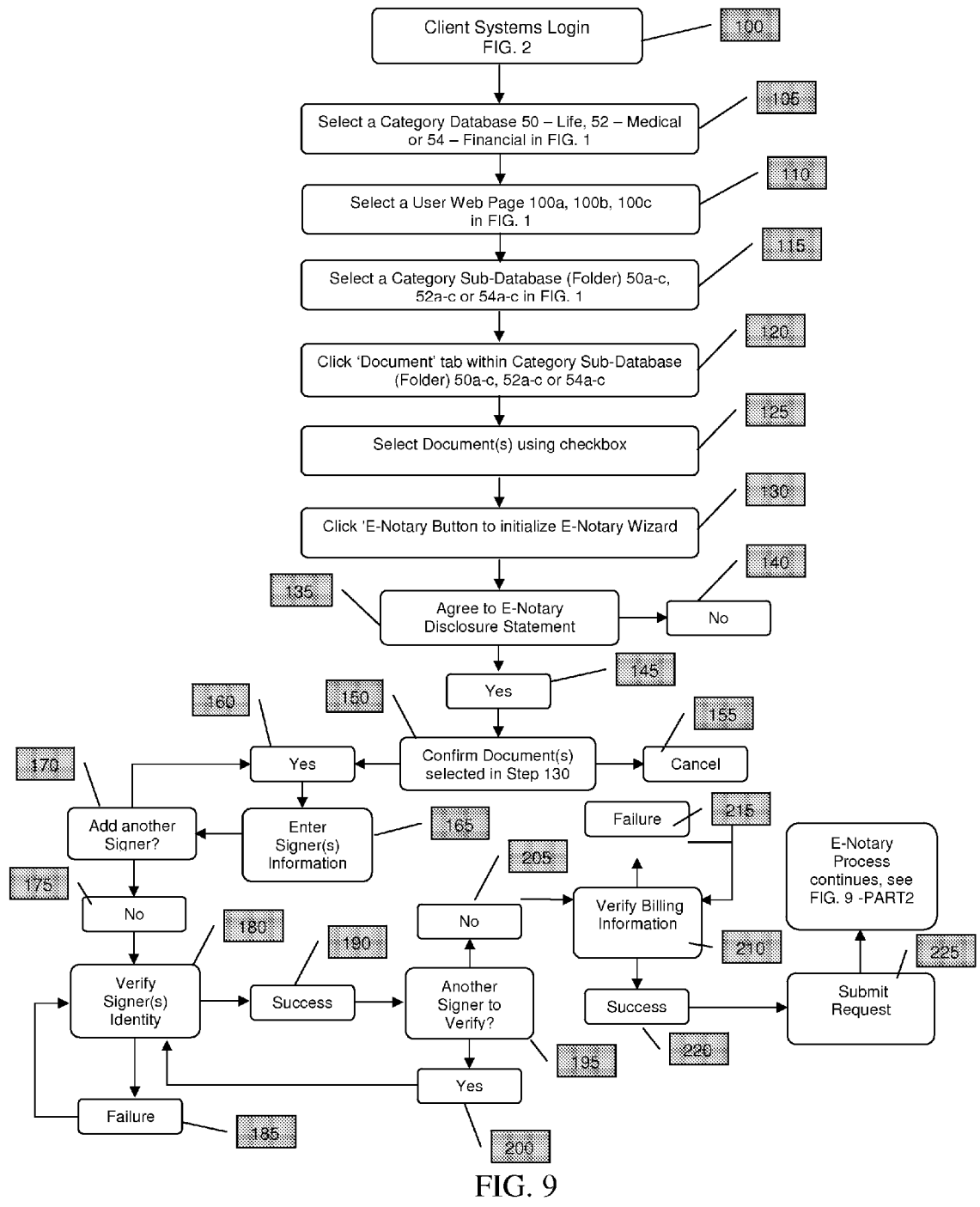
FIG. 9 illustrates a flow diagram, which is provided for on two sheets, when put directly on top of each other, accurately depicts the process by which the user uses a client system login shown in FIG. 2 to access the website and its server system show in FIG. 1 to search, access and view a Document(s) and notarize the Document using electronic methods, herein known as 'E-Notary' or 'E-Notarized' or 'E-Notarization' in accordance with one or more embodiments of the present invention.

FIG. 9—E-Notary a Document(s) Flow Chart—PART 1

FIG. 9 is a flow diagram which illustratively depicts the process by which the user uses a client system login shown in FIG. 2 to access the website and its server system 18 shown in FIG. 1 to search, access and select a stored Document(s) to notarize the Document using electronic methods, herein known as 'E-Notary' or 'E-Notarized' or 'E-Notarization' in accordance with one or more embodiments of the present invention.

In one illustrative embodiment of the present invention, and explained in respect to the flow diagram of FIG. 9, a user can use a plurality of client systems in step 100, which include browser 10a, mobile device 10b to enter the server system 18 over link 16 as shown in FIG. 1 to search and request that particular Document be retrieved and viewed from Database Server 18D. After securely connecting to the server system 18 the user would be able to use multiple types of tools or methods to search Database Server 18D and selection of Category Databases 50, 52, 54 in step 105, then select a specific User Web Pages 100a, 100b, 100c in step 110 and Category Sub-Databases (Folders) 50a-c, 52a-c, 54a-c in step 115 for a particular Document(s) that the user of the system may have stored in that selected Category Sub-Database (Folder) by selecting the Documents TAB in step 120. The user would then select the desired Document(s) to be E-Notarized by selecting the Document(s) in step 125. Once the desired Document(s) have been selected, the user of the system would click the E-Notary button in step 130 to initiate the E-Notary Wizard.

Once the user of the system has initiated the E-Notary Wizard, the user must agree to the E-Notary Disclosure Statement 135 to continue the E-Notary Wizard, at which time the user of the system may select NO 140 to abort the E-Notary Wizard or click YES 145 to continue. The user would then be asked to Confirm the Document(s) that were selected in step 130 to ensure that the Document(s) selected are in fact, the desired Document(s) to be E-Notarized. The user may at this point select Cancel 155 to abort the E-Notary Wizard or click YES 160 to continue.

The next step of the E-Notary Wizard would be to enter in the details of the Signer(s) of the Document(s) 165, as this would be the person(s) who would be placing an electronic signature onto the selected Document(s) 130 ultimately to verify their acknowledgement of E-Notarization procedure that will take effect as part of the E-Notary Wizard. In step 165 the system would offer a selection of Family Members from the User Web Pages 100*a*, 100*b*, 100*c* in the Database Server 18D, and by selecting a particular Family Member details, the system would automatically populate the details as the default Signer, to avoid the user from having to manually type in Signer information. The user of the system may edit or add information to these details if needed. Then, the system would prompt the user if there will be another Signer 170, and the user would either select Yes 160 and repeat step 165 to select or enter in the additional details of each Signer(s), and repeat these steps 165, 170, 160 as many times as are needed. When there are no more Signer(s) to enter into the system, the user would select No 175 to continue with the E-Notary Wizard.

After the user of the system has entered in the Signer(s) information 165, the E-Notary Wizard would then prompt the user to verify the identity of each of the Signer(s) entered in step 165 using an electronic verification system in step 180. For each Signer(s), the system would allow them to select a financial institution that they currently have an online account with and enter in the logon credentials of that account and the 5-digit zip code associated with that account. The system would then utilize a proprietary verification script to effectively verify the logon credentials and 5-digit zip code provided by the user in step 180, including the first name, last name, address provided in 165 by remotely connecting over a secure network to the selected financial institution verification system tool and attempt to compare the logon credentials and 5-digit zip code provided, including the first name, last name, address provided in 165 with what is stored on the remote system of the financial institution selected in step 180. This transmission encrypts the information being sent to the remote financial institution and occurs securely through the Web Server—20 of the server system 18 in FIG. 1. If the verification fails, a warning message will be displayed 185 and prompt the user of the system to re-enter the credentials and 5-digit zip code and re-verify the process again, repeating step 180. If the verification successfully competes, a message will be displayed 190 and prompt the user of the system to verify the identity of any additional Signer(s) 195 entered during step 165. If the user selects Yes 200, the user would then repeat steps 180 for the additional Signer(s). If there are no more Signer(s) that require identification verification, the user of the system will select No 205 to continue the E-Notary Wizard. Any credentials provided in step 180 are then purged from the the server system 18 for security purposes.

The system would then prompt the user of the system for verification of billing information to pay for the E-Notary service. The system would lookup any existing billing information stored in the Category Database Home 48; specifically 48*b* named Settings stored in the Database Server 18D for the user of the server system 18. The user can edit this billing information, if needed, and then select to process the E-Notary request. The system would securely connect to the credit card authorization system and attempt to verify and charge the credit card provided in step 210. If the verification fails, a warning message will be displayed 215 and prompt the user of the system to re-enter the billing information credentials and try again, repeating step 210. If the verification successfully competes, a message will be displayed to the user 220 and the system will initiated to submit the request to the proprietary notarization service in step 225. This process will securely connect via the Internet to the Veroha E-NotaryTrust system and encrypt and route the Document(s) and credentials collected in steps 130, 165, 180 and request for a notarization submission, further described in FIG. 9—E-Notary a Document(s) Flow Chart—PART 2 below.

FIG. 9—E-Notary a Document(s) Flow Chart—PART 2

FIG. 9 is a flow diagram which illustratively depicts the process by which the system processes a E-Notarization Request to connect to the Veroha E-NotaryTrust system and ultimately the Secretary of State of Delaware Authority notarization system after the user of the system has completed the E-Notary Wizard using to ultimately notarize the Document(s) using electronic methods with the Web Server 20 and the Email Server 24 shown in FIG. 1, herein known as 'E-Notary' or 'E-Notarized' or 'E-Notarization' in accordance with one or more embodiments of the present invention.

As previously described in FIG. 9—E-Notary a Document(s) Flow Chart—PART 1, a user can submit the request to complete the E-Notary Wizard after entering in billing information 210, and after the system successfully verifies and charges the provided billing information, a confirmation receipt is displayed 220 and after this confirmation receipt is displayed, the E-Notary Wizard continues to execute in the server system 18 to submit the request to the proprietary notarization service, herein called 'Veroha E-NotaryTrust' system 225, shown in FIG. 9—E-Notary a Document(s) Flow Chart—PART 1 and FIG. 9—E-Notary a Document(s) Flow Chart—PART 2.

After the system has compiled the submitted request, the server system 18 will encrypt the request and securely connect via the Internet using Web Server 20, shown as step 230, and send to the Veroha E-NotaryTrust system 235, the Document(s) and information collected during the E-Notary Wizard procedure described in FIG. 9—E-Notary a Document(s) Flow Chart—PART 1 to initiate a formal request for a notarization submission.

The Veroha E-NotaryTrust system, 235 is a proprietary system authorized to accept notarization requests from approved commissioned electronic notary agents, namely Siftsort.com. Upon connecting to the Veroha E-NotaryTrust system, 235 the server system 18 would send logon credentials such as digital certificate with encrypted key credentials to the Veroha E-NotaryTrust system, and the Veroha E-NotaryTrust system would verify the digital certificate with encrypted key credentials to ensure that the request is from an authorized commissioned electronic notary agent, as part of step 235.

If system 230 or Web Server 20 receives a 'failed' response from the Veroha E-NotaryTrust system 235, after sending the digital certificate with encrypted key credentials, a warning message will be received from the Veroha E-NotaryTrust system, and request the system 230, or Web Server 20 to initializing the request again.

If system 230, or Web Server 20 receives a 'success' response from the Veroha E-NotaryTrust system 235, after sending the digital certificate with encrypted key credentials, the Veroha E-NotaryTrust system will process and format the request and its content, and assign a unique multi-digit serial number to the request and record it in the Veroha E-NotaryTrust system database, as a Stage 1 request, in step 235. Once the Stage 1 request is prepared by the Veroha E-NotaryTrust system, the Veroha E-NotaryTrust system will encrypt the Stage 1 request and its content and securely connect via the Internet to the Secretary of State of Delaware Authority system, in step 240 and send the formatted Stage 1 request to the Secretary of State of Delaware Authority system for official notarization.

The Secretary of State of Delaware Authority notarization system, in step 240 is a proprietary system that only accepts notarization requests from the Veroha E-NotaryTrust system, shown in step 235. This system would process the Veroha E-NotaryTrust system Stage 1 request generated in step 235 and the content provided within it including the unique multi-digit serial number and records it in the Secretary of State of Delaware Authority notarization system database. The Secretary of State of Delaware Authority notarization system would then generate an official digital copy of the Stage 1 request and its content, by embedding on the digital copy of the Document(s) the following pieces of information, including but not limited to; a notary public stamp, timestamp, date, unique multi-digit serial number matching the unique multi-digit serial number provided by the Veroha ENotary Trust system and the official State of Delaware Secretary of the State seal, in step 240.

Once the Secretary of State of Delaware Authority notarization system has generated and embedded the official pieces of information onto the Stage 1 request, the Secretary of State of Delaware Authority notarization system records it in the Secretary of State of Delaware Authority notarization system database and converts the Stage 1 request to a Stage 2 request, in step 240. Then, encrypts the Stage 2 request and its content and securely connects over the Internet to the Veroha E-NotaryTrust system, and delivers the Stage 2 request and its content as officially notarized, in step 245.

The Veroha E-NotaryTrust system upon receiving the completed Stage 2 request, in step 245, would accept the content and record the transaction and the data in the Veroha ENotary system database, searching for the original Stage 1 request by matching the unique multi-digit serial number contained within Stage 2 request, with its former Stage 1 request, from step 235 and records it as a Stage 2 request, in step 245, in the Veroha E-NotaryTrust system database.

Finally, the Veroha E-NotaryTrust system will encrypt the Stage 2 request content, and securely connect via the Internet to the system, in step 250 specifically the Email Server 24 and deliver the formatted Stage 2 request and its content to users secure email address provided as part of Siftsort.com E-Notary Wizard described above in step 165 of FIG. 9—E-Notary a Document(s) Flow Chart—PART 1 so that the official Document(s) can be stored in the Database Server 18D for the user who generated the original request.

The user of the system may then store the official digital copy of the Document(s) in a particular Category Sub-Databases (Folders) 50a-c, 52a-c, 54a-c by performing Add a Document to a Category Sub-Database (Folder) described in FIG. 4A.

FIG. 9A—E-Notary a Document(s) using E-Notary Wizard—STEP 1

FIG. 9A is a diagram which illustratively depicts the graphical user interface screen that a user would interact with by using his/her browser 10a or his/her mobile device 10b to browse to select a Document(s) stored within any Category Sub-Databases (Folders) in the server system 18 and connect to the Veroha E-NotaryTrust system using the E-Notary Wizard to ultimately notarize the Document(s) using electronic methods with the Web Server 20 and the Email Server 24 shown in FIG. 1, herein known as 'E-Notary' or 'E-Notarized' or 'E-Notarization' in accordance with one or more embodiments of the present invention.

As previously described, a user can add Documents to the system and furthermore move a Document into a Category Sub-Database (Folder) and define specific meta-data to be associated with Document before moving the Document to the target Category Sub-Database (Folder) using the proprietary database screen indicated as numeral 22 in FIG. 4A. Once the Document has been moved to the target Category Sub-Database (Folder), FIG. 9A shows a typical Category Sub-Database (Folder) view, in this example, Category Sub-Database (Folder) 50c IDENTIFICATION and indicated in numeral 10 in FIG. 9A and illustratively illustrating the Documents Tab indicated as numeral 20 displays the numerous Documents stored by the user in the target Category Sub-Database (Folder) indicated as numeral 30.

A user of the system may choose to E-NOTARY the Document from the target Category Sub-Database (Folder) by securely routing the Document through the Veroha E-NotaryTrust system for official notarization using the E-Notary Wizard which the user may do so by placing a check in the box indicated as numeral 40 for each desired Document and then by using the E-Notary button indicated as numeral 50 to initiate the E-Notary Wizard and connect to the Veroha E-NotaryTrust system using the system Web Server 20 and the Email Server 24 indicated in FIG. 1 which is further described in FIGS. 9B-9G.

FIG. 9B—E-Notary a Document(s) using E-Notary Wizard—STEP 2

Figure 9B:
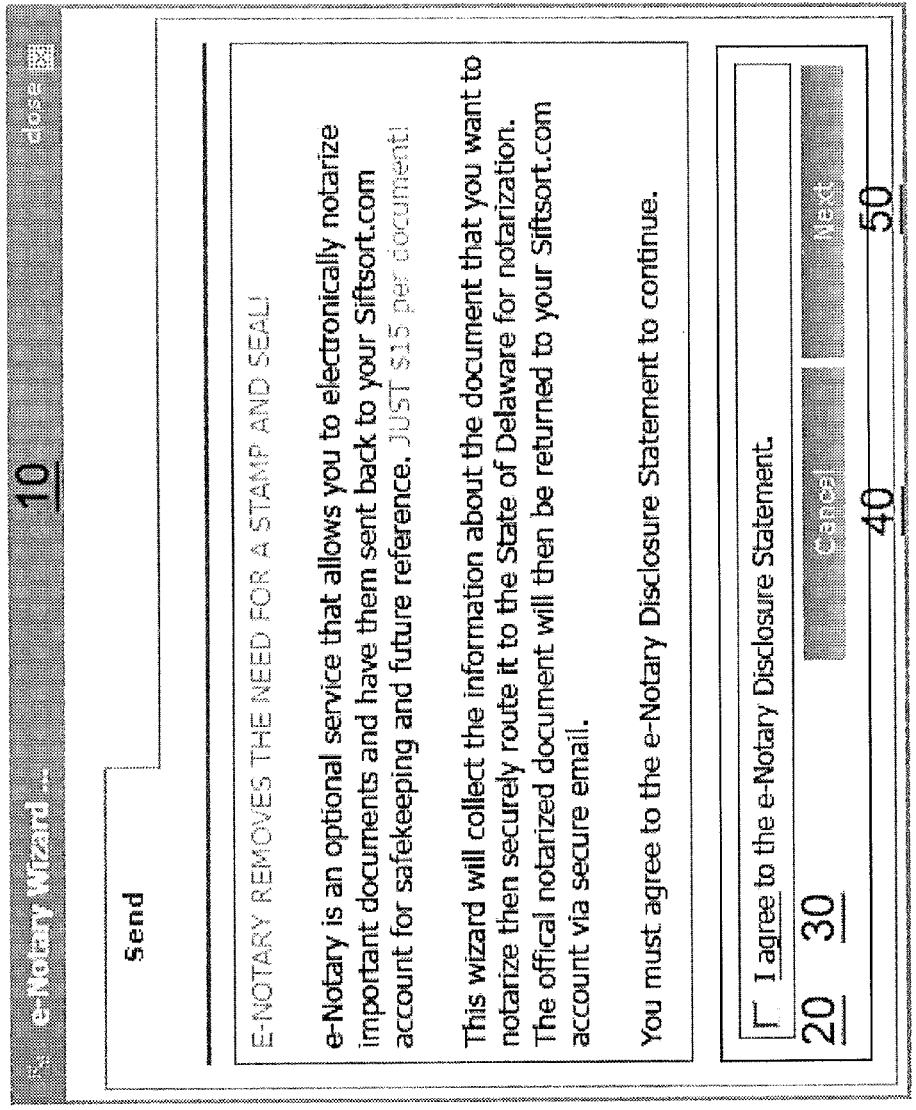
FIG. 9B illustrates a visual depiction of the E-Notary platform in accordance with one or more embodiments of the present invention.

FIG. 9B is a diagram which illustratively depicts the graphical user interface screen that a user would interact with by using his/her browser 10a or his/her mobile device 10b to browse to select a Document(s) stored within any Category Sub-Databases (Folders) in the server system 18 and connect to the Veroha E-NotaryTrust system using the E-Notary Wizard to ultimately notarize the Document(s) using electronic methods with the Web Server 20 and the Email Server 24 shown in FIG. 1, herein known as 'E-Notary' or 'E-Notarized' or 'E-Notarization' in accordance with one or more embodiments of the present invention.

As previously described IN FIG. 9A, a user can choose to E-NOTARY a Document(s) from the target Category Sub-Database (Folder) by securely routing the Document through the Veroha E-NotaryTrust system for official notarization using the E-Notary Wizard using the E-Notary button shown as numeral 50 in FIG. 9A.

Once the user of the system has initiated the E-Notary Wizard which is illustratively illustrated as numeral 10, the user must agree to the E-Notary Disclosure Statement by clicking the checkbox 20 or clicking the "I agree" hyperlink 30 which the system would illustratively display the E-Notary Disclosure Statement so that the user of the system can thoroughly read the E-Notary Disclosure Statement. If the user of the system does not choose to agree with the details of the E-Notary Disclosure Statement, the user of the system can click the Cancel button 40 which would abort the E-Notary Wizard. If the user of the system choose to accept the terms of the E-Notary Disclosure Statement and has placed a check in the box 20 the user of the system can continue the E-Notary Wizard by clicking the Next button 50, which is further described in FIGS. 9C-9G.

Figure 9D:
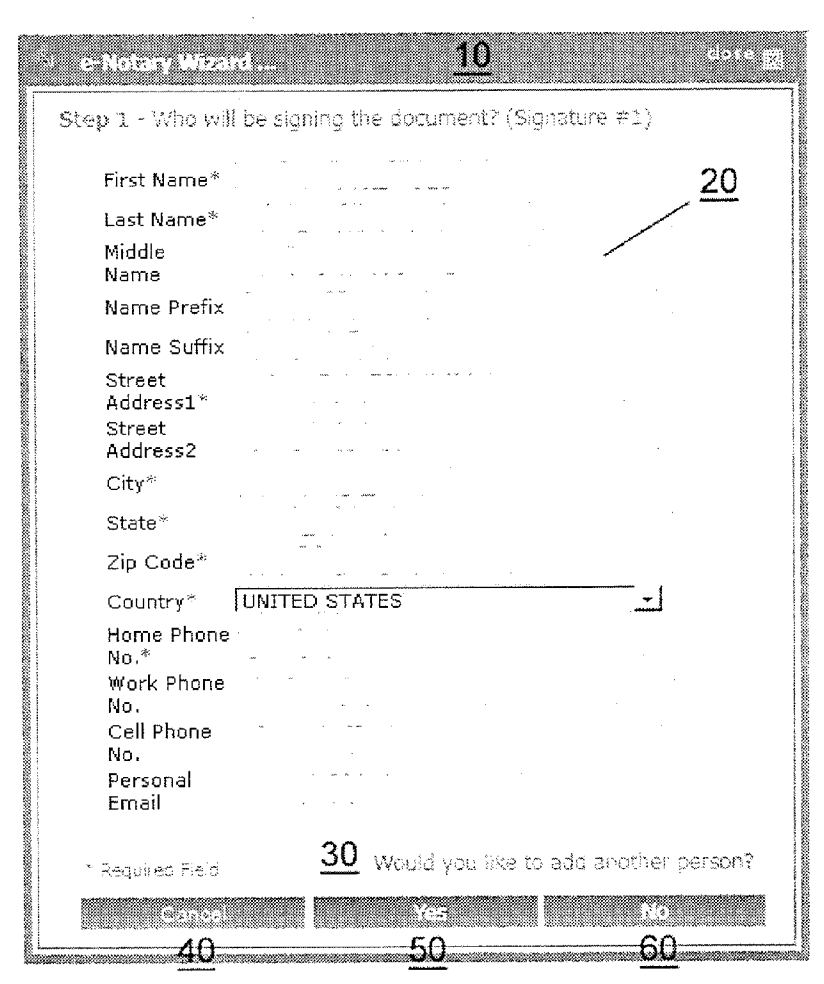
Figure 9E:
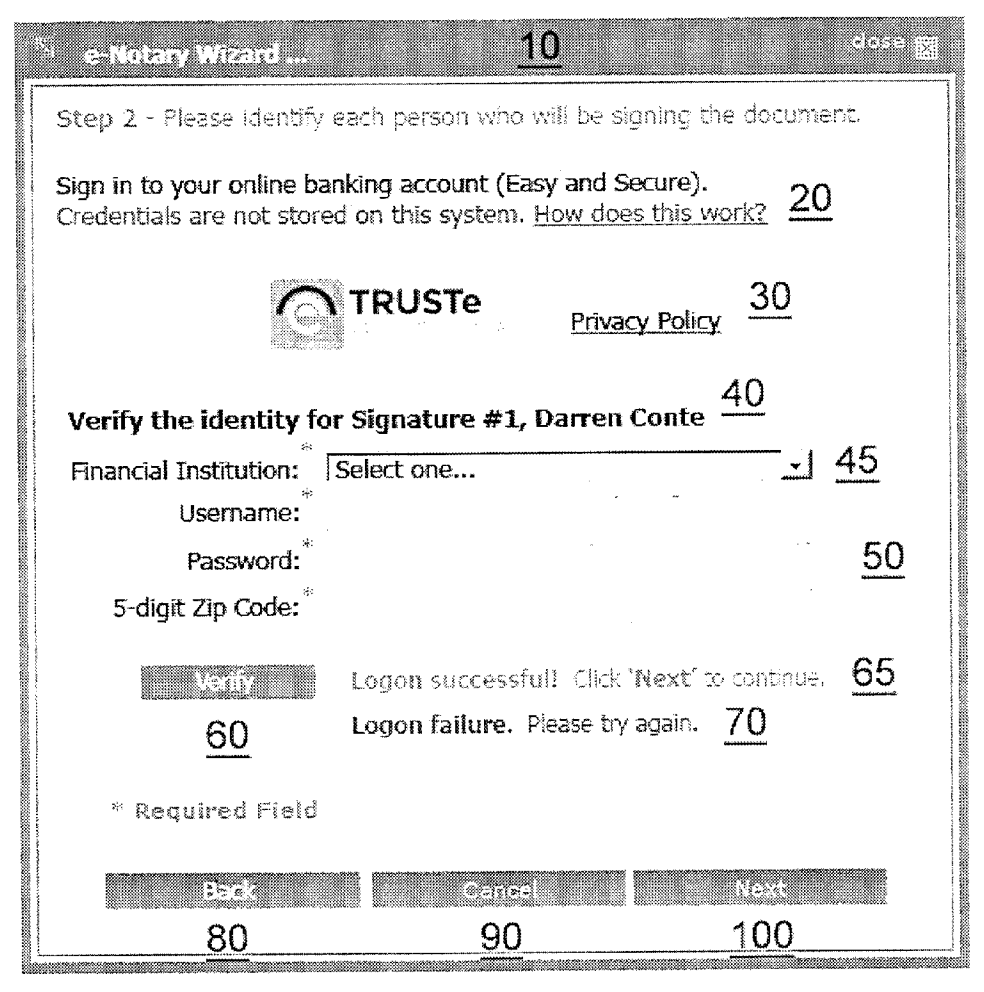

FIG. 9C—E-Notary a Document(s) using E-Notary Wizard—STEP 3

FIG. 9C is a diagram which illustratively depicts the graphical user interface screen that a user would interact with by using his/her browser 10*a* or his/her mobile device 10*b* to browse to select a Document(s) stored within any Category Sub-Databases (Folders) in server system 18 and connect to the Veroha E-NotaryTrust system using the E-Notary Wizard to ultimately notarize the Document(s) using electronic methods with Web Server 20 and the Email Server 24 shown in FIG. 1, herein known as 'E-Notary' or 'E-Notarized' or 'E-Notarization' in accordance with one or more embodiments of the present invention.

As previously described IN FIG. 9B, a user can choose to agree to the E-Notary Disclosure Statement and continued the E-Notary Wizard using the Next button shown as numeral 50 in FIG. 9B.

Once the user of the system continues the E-Notary Wizard, the system will prompt the user with a screen 10 to confirm the Document(s) 20 that were selected in FIG. 9A to ensure that the Document(s) selected are in fact, the desired Document(s) to be E-Notarized. The user may at this point select Cancel 30 to abort the E-Notary Wizard or click the Next button 40 to continue the E-Notary Wizard, which is further described in FIGS. 9D-9G.

FIG. 9D—E-Notary a Document(s) using E-Notary Wizard—STEP 4

FIG. 9D is a diagram which illustratively depicts the graphical user interface screen that a user would interact with by using his/her browser 10*a* or his/her mobile device 10*b* to browse to select a Document(s) stored within any Category Sub-Databases (Folders) in server system 18 and connect to the Veroha E-NotaryTrust system using the E-Notary Wizard to ultimately notarize the Document(s) using electronic methods with the Web Server 20 and the Email Server 24 shown in FIG. 1, herein known as 'E-Notary' or 'E-Notarized' or 'E-Notarization' in accordance with one or more embodiments of the present invention.

As previously described in FIG. 9C, a user can choose to continue the E-Notary Wizard after acknowledgment that the Document(s) selected in FIG. 9A are indeed the Document(s) intended to be E-Notarized, by clicking the Next button shown as numeral 40 in FIG. 9C.

Once the user of the system continues the E-Notary Wizard, the system prompt the user with a screen 10 to enter in the details of the Signer(s) or executors of the Document(s) 20, as this would be the person(s) who would be placing an electronic signature onto the selected Document(s) shown as numeral 20 selected in FIG. 9C. The system would display the primary Family Member information and populate these details, shown as numeral 20 from the User Web Pages 100*a* fields stored in the Database Server 18D, to avoid the user from having to manually enter or type in Signer information details into these various fields, illustrative illustrated as numeral 20. The user of the system may edit or add information to these details if needed, which would override and be saved in the Database Server 18D, ultimately updated the information from User Web Pages 100*a* fields. Once the user of the system has entered in the information for Signer #1, the system would prompt the user if there will be another Signer 30, and the user would may select Yes 50 in which the system would save the details 20 for Signer #1 in the Database Server 18D and then repeat E-Notary Wizard—STEP 4. The system would then display the next Family Member information, if any, and populate the details 20 from the User Web Pages 100*b* in the Database Server 18D, to avoid the user from having to manually enter or type in Signer information details into these various fields, illustrative illustrated as numeral 20. Again, after the user of the system has entered in the information for Signer #2, the system would prompt the user if there will be another Signer 30, ultimately allowing the user to repeat the E-Notary Wizard—STEP 4 as many times as is needed, by clicking the Yes button 50. If there are no more Signer(s) to enter into the system, the user would select No 60 to continue with the E-Notary Wizard, which is further described in FIGS. 9E-9G. At anytime, the user of the system may abort the E-Notary Wizard by clicking the Cancel button shown as numeral 40.

FIG. 9E—E-Notary a Document(s) using E-Notary Wizard—STEP 5

FIG. 9E is a diagram which illustratively depicts the graphical user interface screen that a user would interact with by using his/her browser 10*a* or his/her mobile device 10*b* to browse to select a Document(s) stored within any Category Sub-Databases (Folders) in the server system 18 and connect to the Veroha E-NotaryTrust system using the E-Notary Wizard to ultimately notarize the Document(s) using electronic methods with the Web Server 20 and the Email Server 24 shown in FIG. 1, herein known as 'E-Notary' or 'E-Notarized' or 'E-Notarization' in accordance with one or more embodiments of the present invention.

As previously described in FIG. 9D, a user can choose to continue the E-Notary Wizard after entering in the details of the Signer(s), and by clicking the No button shown as numeral 60 in FIG. 9D.

After the user of the system has entered in the information for the Signer(s), the E-Notary Wizard would then prompt the user of the system with a screen 10 to verify the identity of each of the Signer(s) entered in E-Notary Wizard—STEP 4 using a proprietary electronic verification system, in which the credentials provided are not permanently stored in the Database Server 18D. The system will explain the method it does this when the user of the system clicks the 'How does this work?' hyperlink shown as numeral 20. For further security, the user of the system can display the 'Privacy Policy' by using the hyperlink shown as numeral 30 to display the company terms and conditions shown in the Privacy Policy Statement, as available and shown during the New User Process previously described in FIG. 2B. For each Signer(s) entered in the system in E-Notary Wizard—STEP 4, the system would require the user to verify the identity of each Signer, but one at a time. The system will begin by asking the user to verify the identity of Signer #1, shown as numeral 40, and prompt the user to select a financial institution 45 in which Signer#1 currently has an online account with. After doing so, the user would be prompted to enter in the logon credentials, username and password and the 5-digit zip code 50 associated with that online account, for the financial institution selected in numeral 45.

Once the required logon credentials and 5-digit zip code is entered into the system 50, the user would click the Verify button 60 and the system would then utilize a proprietary verification script which will attempt to verify the logon credentials and 5-digit zip code provided by the user in numeral 50, including the first name, last name, address provided in E-Notary Wizard—STEP 4 and illustratively illustrated as numeral 20 in FIG. 9D by remotely connecting over a secure network to a verification system tool provided by the selected financial institution selected previously, shown as numeral 45. This proprietary application program interface will securely connect over the Internet to the selected financial institution verification tool and present the logon credentials and 5-digit zip code provided 50, including the first name, last name, address provided in E-Notary Wizard—

STEP 4 shown as numeral 20 in FIG. 9D and compare it with what is stored on the remote verification system of the financial institution selected in step 45. This proprietary application programming interface transmission encrypts the information being sent from the server system 18 and received by the remote financial institution by securely transmitting through the Web Server 20 of the server system 18 in FIG. 1.

If the proprietary application programming interface verification receives a 'failed' response from the remote verification system of the financial institution, after sending the logon credentials, 5-digit code and the first name, last name, address provided in E-Notary Wizard—STEP 4 shown as numeral 20 in FIG. 9D, a warning message will be displayed, shown as numeral 70 which will prompt the user of the system to re-enter the logon credentials and 5-digit zip code 50 and initiate the process again, by clicking the Verify button 60.

If the proprietary application programming interface verification receives a 'success' response from the remote verification system of the financial institution, after sending the logon credentials, 5-digit code and the first name, last name, address provided in E-Notary Wizard—STEP 4 shown as numeral 20 in FIG. 9D, a success message will be displayed, shown as numeral 65 and prompt the user of the system to click the Next button 100 to continue the E-Notary Wizard, and the system would automatically purge the logon credentials and 5-digit zip code previously provided by the user 50, for that particular Signer, for example, Signer #1.

If the user of the system had entered in more than one Signer in E-Notary Wizard—STEP 4, by clicking Yes 50 in FIG. 9D, when the user of the system clicks the Next button 100 to continue the E-Notary Wizard, the system would automatically repeat E-Notary Wizard—STEP 5 by asking the user to verify the identity of Signer #2, indicated as numeral 40, in which the user of the system would have to select a financial institution 45 in which Signer #2 currently has an online account with. After doing so, Signer #2 would be prompted to enter in the logon credentials, username and password and the 5-digit zip code 50 associated with that online account, for the financial institution selected in numeral 45 and clicking the Verify button 60 to repeat the verification process described above, using the newly entered logon credentials and 5-digit zip code provided for Signer #2 including the first name, last name, address provided in E-Notary Wizard—STEP 4 and illustratively illustrated as numeral 20 in FIG. 9D for Signer #2.

This process, and the proprietary application programming interface verification tool described above will repeat until all Signer(s) provided in E-Notary Wizard—STEP 4, have been successfully completed and a 'success' message, shown as numeral 65 is displayed for each of the Signer(s) provided in E-Notary Wizard—STEP 4.

If for any reason, the user of the system needs to edit the details provided in the previous screen, the E-Notary Wizard—STEP 4, the user can click the Back button 80 which would return the user to the previous screens, caching all the data in the server system 18 provided for each of the Signer(s) in E-Notary Wizard—STEP 4 and illustratively illustrated as numeral 20 in FIG. 9D so that the information provided can be edited by the user of the system.

Figure 9G:
FIG. 9G illustrates a visual depiction of the E-Notary platform in accordance with one or more embodiments of the present invention.

When there are no more Signer(s) that require identity verification, the E-Notary Wizard will continue, as further described in FIGS. 9F-9G by clicking the Next button 100. Once the Next button 100 is clicked, the system will automatically purge the logon credentials and 5-digit zip code previously provided by the user, shown in numeral 50, for a particular Signer. At anytime, the user of the system may abort the E-Notary Wizard by clicking the Cancel button 90, and the system will automatically purge all information provided during the E-Notary Wizard.

FIG. 9F—E-Notary a Document(s) using E-Notary Wizard—STEP 6

FIG. 9F is a diagram which illustratively depicts the graphical user interface screen that a user would interact with by using his/her browser 10a or his/her mobile device 10b to browse to select a Document(s) stored within any Category Sub-Databases (Folders) in the server system 18 and connect to the Veroha E-NotaryTrust system using the E-Notary Wizard to ultimately notarize the Document(s) using electronic methods with the Web Server 20 and the Email Server 24 shown in FIG. 1, herein known as 'E-Notary' or 'E-Notarized' or 'E-Notarization' in accordance with one or more embodiments of the present invention.

As previously described in FIG. 9E, a user can choose to continue the E-Notary Wizard after verifying the identity of all the Signer(s) provided in the E-Notary Wizard—STEP 4, by clicking the Next button shown as numeral 100 in FIG. 9E.

After the user of the system has verified the identity for all of the Signer(s), the E-Notary Wizard would then prompt the user of the system 10 to verify the billing information of the user of the system to complete the transaction, and pay for the E-Notary service for the Document(s) shown in numeral 20, as selected in numeral 40 in FIG. 9A1.

The server system 18 would lookup any existing billing information stored in the Category Database Home 48, specifically 48b named Settings: Billing Information stored in the Database Server 18D for the user of the server system 18, and display this billing information in the E-Notary Wizard screen shown as numeral 30 and 40. If there is no billing information currently stored in the server system 18, the user can add new billing information shown in numeral 30 and 40 which would saved to the Category Database Home 48, specifically 48b named Settings: Billing Information stored in the Database Server 18D. If the user of the system wanted to abort the E-Notary Wizard, the user can do so by clicking Cancel 50 to purge all information provided in the E-Notary Wizard up to this point.

When the user has entered in the required billing information, the user can complete the E-Notary Wizard by clicking the Submit Request button 60 to process the E-Notary request. The system would securely connect to the remote credit card authorization system over the Internet using the Web Server 20 and attempt to verify and charge the credit card for the tallied amount, shown as numeral 25 by encrypting and sending to the remote credit card authorization system the information provided in numeral 30 and 40.

If the system receives a 'failed' response from the remote credit card authorization system, after sending the information provided in numeral 30 and 40, a warning message will be displayed, shown as numeral 45 which will prompt the user of the system to verify the billing information and try again, by clicking the Submit Request button 60.

If the system receives a 'success' response from the remote credit card authorization system, after sending the information provided in numeral 30 and 40, a receipt of the transaction will be displayed to the user, as shown and described in FIG. 9G namely E-Notary Wizard—STEP 7, below. Although this receipt is displayed, the E-Notary Wizard continues to execute in the server system 18 by submitting the request to the proprietary notarization service, further described in FIG. 9G.

FIG. 9G—E-Notary a Document(s) using E-Notary Wizard—STEP 7

FIG. 9G is a diagram which illustratively depicts the graphical user interface screen that a user would interact with by using his/her browser 10a or his/her mobile device 10b to browse to select a Document(s) stored within any Category Sub-Databases (Folders) in server system 18 and connect to the Veroha E-NotaryTrust system using the E-Notary Wizard to ultimately notarize the Document(s) using electronic methods with the Web Server 20 and the Email Server 24 shown in FIG. 1, herein known as 'E-Notary' or 'E-Notarized' or 'E-Notarization' in accordance with one or more embodiments of the present invention.

As previously described in FIG. 9F, a user can submit the request to complete the E-Notary Wizard after verifying billing information of the user of the system, by clicking the Submit Request button shown as numeral 60 in FIG. 9F.

When the billing verification script successfully competes and charges the credit card for service amount, shown as numeral 25 in FIG. 9F a receipt of the transaction will be displayed to the user shown in screen 10, and displays a message to the user that their request is being processed and that the official E-Notarized Document(s) will be securely sent back to the system using their secure email address, including instructions of how to retrieve the official Document(s), as shown in numeral 20. In addition, the Order Number 30 and Transaction Number 35 which has been generated by the server system 18 and saved in the Database Server 18D are also displayed on this receipt 10. In addition, a specific details of the transaction shown are numeral 40 are displayed including instructions on how to contact the Toll-Free Customer Center 10c in the event that the official Document(s) are not received within a 30-minute time period of the transaction, shown as numeral 50. The user may print the receipt 10 and all of its details by clicking the Print Receipt button 60 which would send the receipt to a local installed printer attached to the user's computer.

When this confirmation receipt is displayed, the E-Notary Wizard continues to execute in the server system 18 to submit the request to the proprietary notarization service, further described in FIG. 9 E-Notary a Document(s) Flow Chart—PART 2, above.

It should again be emphasized that the above-described embodiments of the invention are presented for purposes of illustration only. Many variations and other alternative embodiments may be used. For example, although described in the context of particular system and device configurations, the techniques are applicable to a wide variety of other types of information processing systems and processing devices. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a server system for securely organizing, sharing, accessing and storing valuable information related to a family or individual in conjunction with a computer-based platform, the server system comprising a processor and a non-transitory computer readable storage medium storing a plurality of user data, when executed by the processor cause the server system to perform the method, the method comprising:

receiving, in a network platform on a transmitter computing device, requests to add documents from a plurality of client systems wherein the request is communicated to a plurality of client access servers which include Web Server, Fax Server, Email Server, FTP Server and SMS, MMS, TEXT TO VOICE Gateway over a communication link;

automatically parsing, in the network platform, on the transmitter computing device, data received into specific actions from the request handler module;

populating, in the network platform, on the transmitter computing device, the data received from the parse incoming request module which provides pending actions (category sub-database) with specific data that was respectfully identified for that particular action;

executing, in the network platform, on the transmitter computing device, the data received from the populate action with obtained data module;

converting, in the network platform, on the transmitter computing device, the received request to a logical request as a means to direct a request to the related sub-category database to provide a logical response to the received request;

sending, in the network platform, on the transmitter computing device, data via email or fax to a third party on behalf of an authorized user; and storing, in the network platform, on the transmitter computing device, user data in online folders (category database), for each family member labeled specifically under multiple categories such as Life, Medical, Financial, Contacts, Sharing and Planning;

wherein, the receiving, parsing, populating, processing, executing, converting, sending and storing steps are initiated upon confirmation of the user's client identifier;

a search tool to locate the document or a note or a contact in a category database and all sub-category databases;

an encrypted communication link that is shared during the communication session instructing a recipient to answer two security challenge questions, by automatically scrambling the mailing address and phone number of sender, which the server system has provided a layer of authentication to access shared documents and notes;

wherein the server system further comprises an electronic notary platform used to further authenticate a user of the server system without the need of third-party human intervention by using logon credentials, so that the server system can ensure the sender is properly identified, and the electronic signature to be placed on a said document, is authentic; and wherein said server system further provides a tool to upload, capture and 'freeze' the said document into a 'static' state, ensuring that said document is final in nature and cannot be amended or altered in anyway after it is securely transmitted by said server system to a third-party platform where it will be ingested, recorded, serialized with a unique hash string, stamped with watermark seal, then returned to said server system for automatically parsing into the users account, to notarize said document.

2. The method of claim 1, wherein family members are associated with a single client identification number.

3. The method of claim 1, wherein the user data further comprising notes and documents that can be sent by e-mail or facsimile.

4. The method of claim 3, wherein the notes further comprising custom information files created by the user via a proprietary database template provided by the system.

5. The method of claim 3, wherein the documents, further comprising:

a pre-existing file created by a software program, a pre-existing file on the user's device, and a hard copy;

wherein the documents are stored, shared and accessible to a user upon confirmation of user's client identifier.

6. The method of claim 1, wherein the request handler module accepts the initial communication request between the requesting user and client system and all data requesting the system to perform.

7. The method of claim 1, wherein the parse incoming request module examines the data from the request handler module and packages data to the target destination as a means to resolve the request sent to the system by the user.

8. The method of claim 1, wherein data packaged by the parse incoming request module is provided with the data requested for the requested action.

9. The method of claim 1, wherein the execution of the request populated by the populating module wherein the data is sent over a communication link to the business logic processing module wherein the business logic processing module process and convert the requests into a logical request wherein the logical request is communicated to the data access module and respective category sub-databases thereof.

10. The method of claim 1, further comprising a plurality of search functions wherein the search function facilitates location of user data within the database.

11. The method of claim 1, wherein the client identifier authorizes a user to access, send, or retrieve user data to an external recipient using a plurality of communication links in accordance with the method of claim 1.

12. The method of claim 1, further comprising a validation step wherein the user is prompted with a series of authentication questions from an answer bank consisting of at least ten answers as a means to validate the user's access to user's account.

13. The method of claim 1, wherein the user shares user data in a read-only format with select recipients comprising the steps of:
   providing, the select recipient, an email communication consisting of an encrypted sharing link, wherein the select recipient is prompted with a plurality of security questions; and
   providing, the select recipient, access to shared files upon verification of answers provided for security questions.

14. The method of claim 13, wherein the select recipients consist of physicians, insurance representatives, financial representatives, legal representatives, government officials, and acquaintances.

15. The method of claim 1, wherein, in the absence of access to a web browser or mobile device, the user accesses user account via toll-free customer center comprising the steps of:
   initiating, a communication link with a customer service representative;
   answering, level one authenticating questions; and
   answering, level two authenticating questions.

16. The method of claim 15, wherein the user communicates with a customer service representative.

17. The method of claim 16, wherein the customer service representative provides a plurality of authenticating questions to the user as a means to ensure user account information is not compromised.

18. The method claim 1, wherein a user's session terminates upon thirty minutes of user inactivity.

19. A server system for securely organizing, sharing, accessing and storing valuable information related to a family or individual in conjunction with a computer-based platform, comprising:
   a client system having a communications link for a plurality of messages to be exchanged using a web browser, a mobile device, a toll-free customer center or a facsimile and a user having a client identifier, wherein a user enters and sends said user's client identifier, which is stored in a client ID file, to client system to access said client system through a secure connection in the form of encrypted keys generated by the server system, which opens a communication session and said user's client identifier is included with all messages sent through said web browser, said mobile device, said toll-free customer center or said facsimile to database server by an encrypted sharing link allowing said server systems to identify the user that sent a message;
   an application server having a request handler module, a parse incoming request module, a populate action with an obtained data module, an execute action, a business logic processing module, and a data access designed to handle communication sessions between said user and said client system,
   wherein said request handler module accepts an initial communication request for an action between said user and said client system and receives a packet of raw information for said action that said user requests the client system to perform, said packet of raw information is then passed by said application server to said parse incoming request module to examine the particular details of said packet, provide the best action required to resolve each request sent to said client system by said user and automatically parse said raw information into specific actions and parsed raw information is then sent to said populate action with said obtained data module process that provides the pending actions with a set of specific data that is identified for each specific action, once parsed all the actions are executed by said execute action process and then these actions are sent to said business logic processing module to process the actions and convert the actions into a logical request to the data access process, which access said database server and a particular sub-category database for each family member of the user;
   sending, in the network platform, on the transmitter computing device, data via email or fax to a third party on behalf of an authorized user; and
   storing, in the network platform, on the transmitter computing device, user data in online folders (category database), for each family member labeled specifically under multiple categories such as Life, Medical, Financial, Contacts, Sharing and Planning;
   wherein, the receiving, parsing, populating, processing, executing, converting, sending and storing steps are initiated upon confirmation of the user's client identifier;
   a user authentication system having multiple layers which includes a unique identifier, a unique password that is of minimum alpha-numeric combination, and a set of ten security challenge questions created by the user so the client system can select a set of three security challenge questions at random that a user answers to authenticate access to the client system;
   a search tool to locate a document or a note or a contact in a category database and all sub-category databases;
   an encrypted communication link that is shared during the communication session instructing a recipient to answer two security challenge questions, by automatically scrambling the mailing address and phone number of sender, which the server system has provided a layer of authentication to access shared documents and notes;
   an electronic notary platform to further authenticate a user without the need of third-party human intervention by using logon credentials, so that the server system can ensure the sender is properly identified, and the electronic signature to be placed on a said document, is authentic; and wherein said server system further provides a tool to upload, capture and 'freeze' the said document into a 'static' state, ensuring that said document is final in nature and cannot be amended or altered in anyway after it is securely transmitted by said server system to a third-party platform where it will be ingested, recorded, serialized with a unique hash string, stamped with watermark seal, then returned to said server system for automatically parsing into the users account, to notarize said document.

\* \* \* \* \*